United States Patent
Mitamura et al.

(10) Patent No.: US 6,646,805 B2
(45) Date of Patent: Nov. 11, 2003

(54) APPARATUS FOR VARIABLE WAVELENGTH DISPERSION AND WAVELENGTH DISPERSION SLOPE

(75) Inventors: Nobuaki Mitamura, Sapporo (JP); Yuichi Kawahata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/939,566

(22) Filed: Aug. 28, 2001

(65) Prior Publication Data

US 2002/0122256 A1 Sep. 5, 2002

(30) Foreign Application Priority Data

Mar. 2, 2001 (JP) .......................................... 2001-058947

(51) Int. Cl.⁷ .......................... G02B 27/00; H01J 14/02
(52) U.S. Cl. ........................ 359/578; 359/615; 359/124
(58) Field of Search .................................. 359/577, 578, 359/579, 615

(56) References Cited

U.S. PATENT DOCUMENTS

| | | | | |
|---|---|---|---|---|
| 5,285,255 A | * | 2/1994 | Baranne et al. | 356/328 |
| 5,796,479 A | * | 8/1998 | Derickson et al. | 356/326 |
| 5,838,849 A | | 11/1998 | Shirasaki | 385/31 |
| 5,930,045 A | | 7/1999 | Shirasaki | 359/577 |
| 5,969,865 A | | 10/1999 | Shirasaki | 359/577 |
| 5,969,866 A | | 10/1999 | Shirasaki | 359/577 |
| 5,973,838 A | | 10/1999 | Shirasaki | 359/577 |
| 5,982,488 A | | 11/1999 | Shirasaki | 356/352 |
| 5,999,320 A | | 12/1999 | Shirasaki | 359/577 |
| 6,296,361 B1 | * | 10/2001 | Shirasaki et al. | 359/868 |
| 6,301,048 B1 | * | 10/2001 | Cao | 359/558 |
| 6,332,689 B1 | * | 12/2001 | Shirasaki et al. | 359/868 |
| 6,343,866 B1 | * | 2/2002 | Cao et al. | 359/868 |
| 6,392,807 B1 | * | 5/2002 | Barbarossa et al. | 359/161 |
| 6,441,959 B1 | * | 8/2002 | Yang et al. | 359/495 |
| 2002/0012374 A1 | * | 1/2002 | Basting et al. | 372/55 |

FOREIGN PATENT DOCUMENTS

| | | | |
|---|---|---|---|
| JP | 03-294815 A | * | 12/1991 |
| JP | 06-331850 A | * | 12/1994 |

* cited by examiner

Primary Examiner—John Juba
(74) Attorney, Agent, or Firm—Staas & Halsey LLP

(57) ABSTRACT

Rays of light having respective wavelengths angular-dispersed and output from a VIPA plate are collected by a lens, and diffracted by a grating pair which is an optical path shift generation unit and optical path shift amount variation unit, and have a shift in a path of rays having different wavelengths. When the rays are reflected by a dispersion leveling three-dimensional mirror and input into the VIPA plate again, they are received by portions having different dispersion compensation amount of the three-dimensional mirror, thereby realizing different amounts of wavelength dispersion for respective wavelengths, and independently adjusting an amount of wavelength dispersion of the entire wavelengths of the WDM rays and the wavelength dispersion slope.

20 Claims, 43 Drawing Sheets

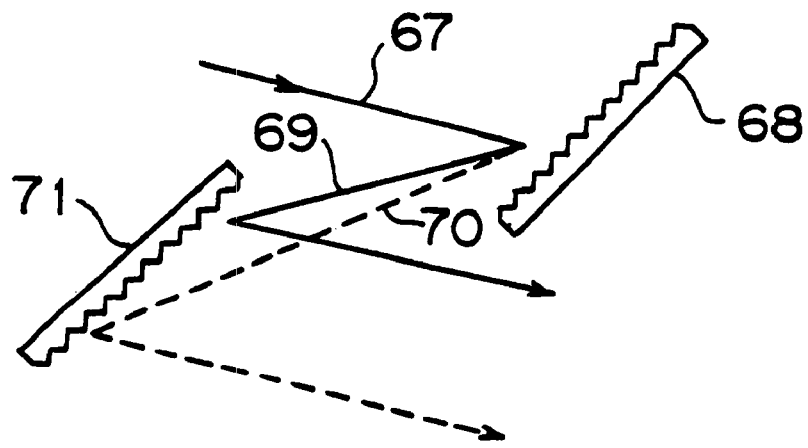
F I G. 3A
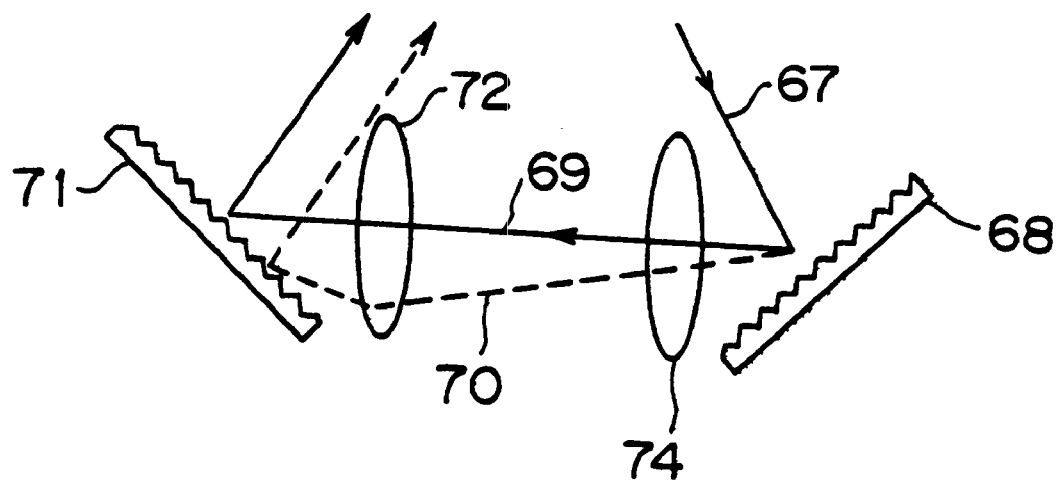
F I G. 3B

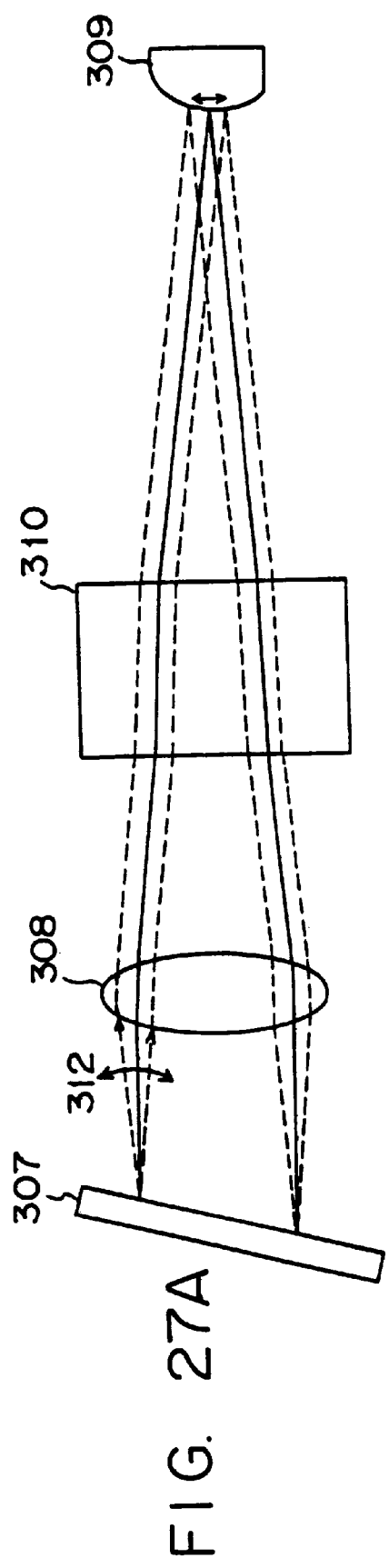
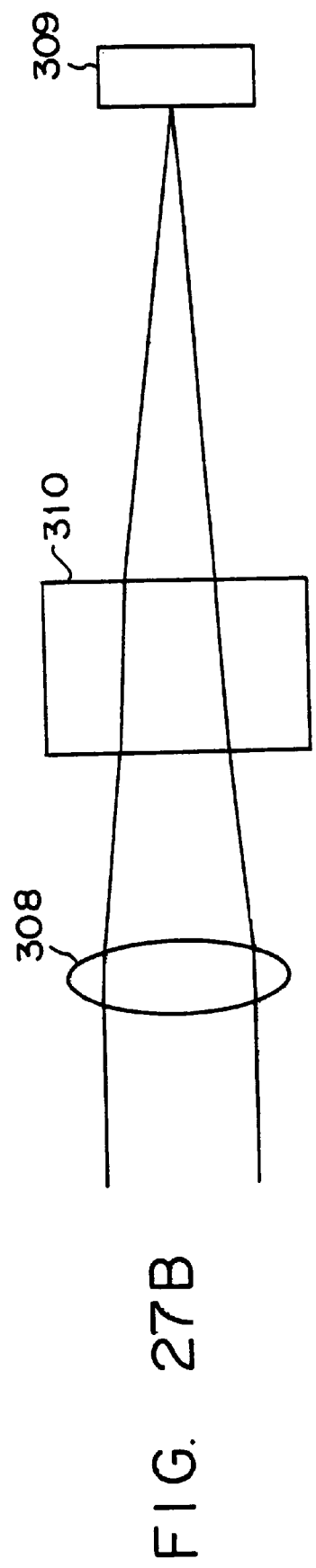
FIG. 27A
FIG. 27B

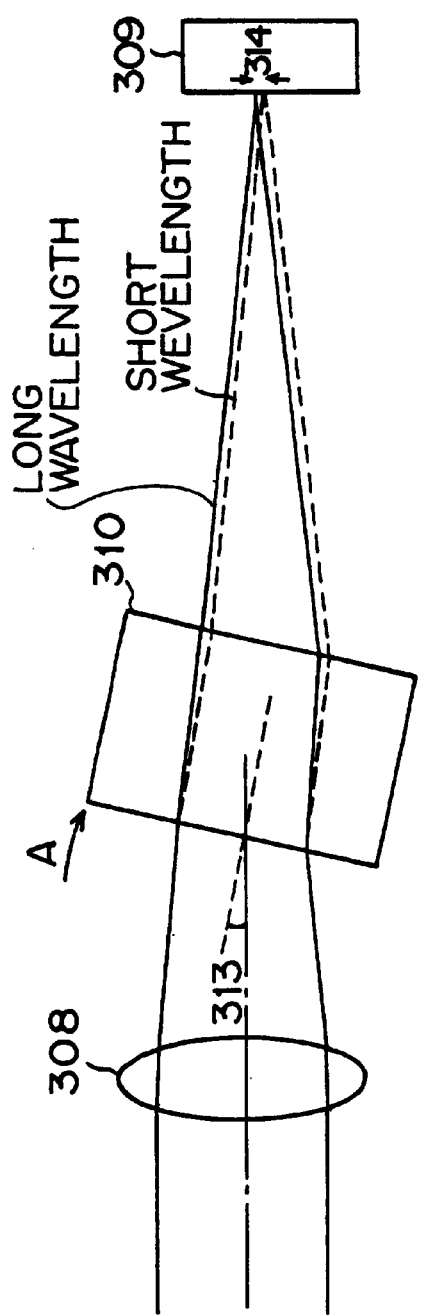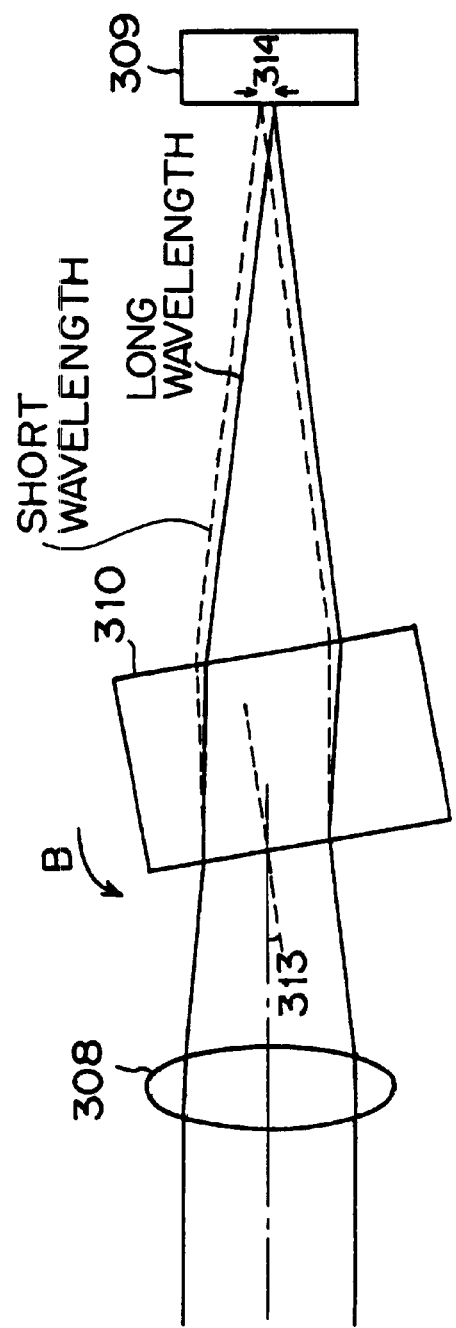
FIG. 28A
FIG. 28B

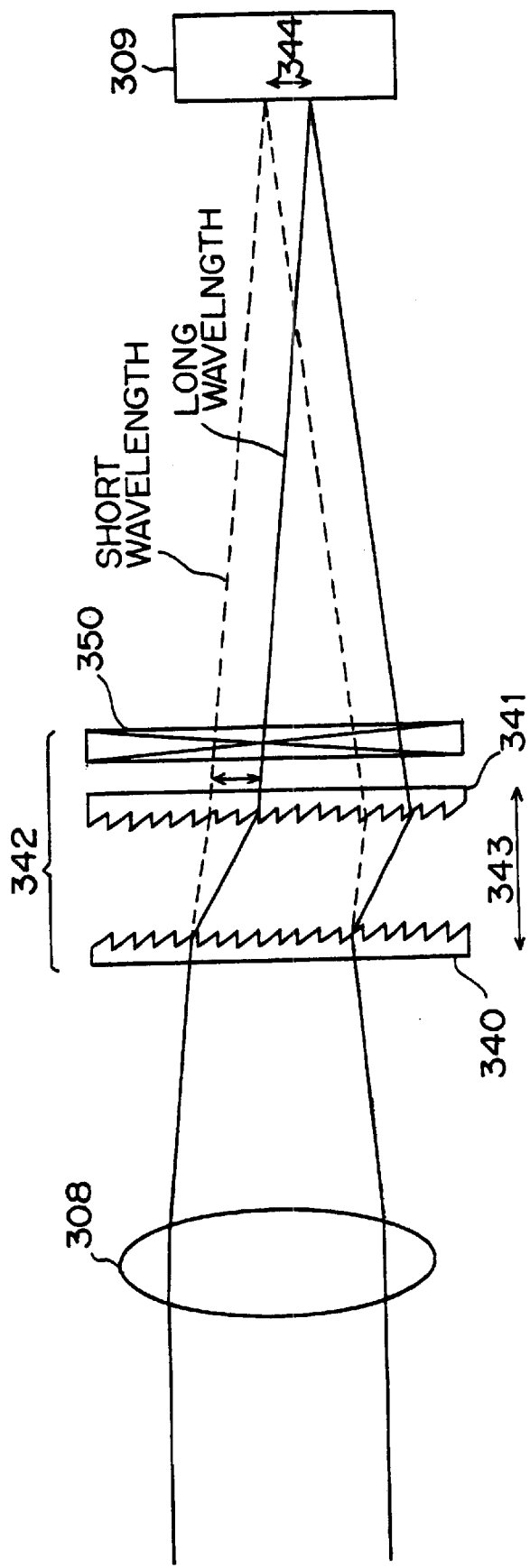
F I G. 40

APPARATUS FOR VARIABLE WAVELENGTH DISPERSION AND WAVELENGTH DISPERSION SLOPE

BACKGROUND OF THE INVENTION

1. Field of the Invention

The present invention relates to an apparatus for wavelength dispersion and generation of a wavelength dispersion slope, and an apparatus for compensating for the wavelength dispersion accumulated in an optical fiber transmission network, and more specifically to an apparatus using a virtually imaged phased array for generating a wavelength dispersion and a wavelength dispersion slope.

2. Description of the Related Art

In the conventional fiber optical communications system for transmitting information through an optical system, a transmitter transmits a pulse to a receiver through an optical fiber. However, the wavelength dispersion of an optical fiber deteriorates the quality of a signal of a system.

To be more practical, as a result of wavelength dispersion, the transmission speed of a signal of an optical fiber depends on the wavelength of the signal. For example, if a pulse having a long wavelength (for example, the pulse of the wavelength indicating a red color pulse) is transmitted at a higher speed than a pulse having a short wavelength (for example, the pulse of the wavelength indicating a blue color pulse), it is normal dispersion. On the other hand, if a pulse having a short wavelength (for example, the pulse of the wavelength indicating a blue color pulse) is transmitted at a higher speed than a pulse having a long wavelength (for example, the pulse of the wavelength indicating a red color pulse), then it is abnormal dispersion.

Therefore, when a pulse contains red and blue pulses and is transmitted from a transmitter, the pulse is divided when it is transmitted through an optical fiber into a red pulse and a blue pulse which are received by a photodetector at different times. If a red pulse is transmitted at a higher speed than a blue pulse, it is normal dispersion.

If there are continuous wavelength components from blue to red as another example of pulse transmission, a pulse is extended in an optical fiber and distorted by wavelength dispersion because a red component and a blue component are transmitted at different speeds. Since all pulses contain finite wavelength extension, such wavelength dispersion frequently occurs in the fiber optical communications system.

Therefore, it is necessary for the fiber optical communications system to compensate for wavelength dispersion to obtain a higher transmission capacity.

To compensate for the wavelength dispersion, the fiber optical communications system requires an inverse dispersion device. Normally, an inverse dispersion device provides inverse dispersion for a pulse to nullify the dispersion generated by transmission through an optical fiber.

There are several devices which can be used as an inverse dispersion device. For example, a dispersion compensation fiber has a specific sectional index profile, thereby functioning as an inverse dispersion device and providing the inverse dispersion for nullifying the dispersion generated by the optical fiber. However, the dispersion compensation fiber is expensive in production cost, and has to be sufficiently long enough to successfully compensate for the wavelength dispersion. For example, when an optical fiber is 100 km long, the dispersion compensation fiber is approximately 20 through 30 km. Therefore, there is the problem of a large loss and size.

FIG. 1 shows the chirp fiber grating used as an inverse dispersion device to compensate for the chromatic dispersion.

As shown in FIG. 1, a ray is transmitted through an optical fiber, wavelength-dispersed, and then provided for an input port 48 of an optical circulator 50. The optical circulator 50 provides the ray for a chirp fiber grating 52. The chirp fiber grating 52 returns the ray to the optical circulator 50 such that different wavelength components can be reflected by the channel fiber grating at different distances, different wavelength components can travel different distances, and the wavelength dispersion can be compensated for. For example, the chirp fiber grating 52 can be designed such that a long wavelength component can be reflected at a long distance, and travel a longer distance than a short wavelength. Then, the optical circulator 50 provides the ray reflected to an output port 54 from the chirp fiber grating 52. Therefore, the chirp fiber grating 52 can add inverse dispersion to a pulse.

However, the chirp fiber grating 52 has very narrow band for a reflected pulse. Therefore, a sufficient wavelength band cannot be obtained to compensate for the ray containing a number of wavelengths such as a wavelength division-multiplexed light. A number of chirp fiber gratings can be cascaded for a wavelength division-multiplexed signal. However, the resultant system becomes costly. The chirp fiber grating obtained by incorporating a circulator is appropriate for a single-wavelength fiber optical communications system, etc.

FIGS. 2 and 3 shows the conventional diffraction grating used to generate wavelength dispersion.

As shown in FIG. 2, a diffraction grating 56 has a grating surface 58. Parallel rays 60 having different wavelengths are input into the grating surface 58. The rays are reflected by each stage of the grating surface 58, and interferes each other. As a result, rays 62, 64, and 66 having different wavelengths are output at different angles from the diffraction grating 56. The diffraction grating can be used in the spatial grating pair array described later to compensate for the wavelength dispersion.

FIG. 3A shows a spatial grating pair array used as an inverse dispersion device to compensate for wavelength dispersion.

As shown in FIG. 3A, a ray 67 is diffracted from a first diffraction grating 68, and becomes a ray 69 for a short wavelength and a ray 70 for a long wavelength. These ray 67 and ray 70 are diffracted by a second diffraction grating 71, and travel in the same direction. As shown in FIG. 3A, the wavelength components having different wavelengths travel different distances, thereby compensating for the wavelength dispersion. A long wavelength (such as the ray 70, etc.) travels a longer distance than a short wavelength. Therefore, the spatial grating pair array shown in FIG. 3A indicates abnormal dispersion.

FIG. 3B shows another spatial grating pair array used as an inverse dispersion device to compensate for chromatic dispersion.

As shown in FIG. 3B, lenses 72 and 74 are positioned between the first and second diffraction gratings 68 and 71. A long wavelength (such as the ray 70) travels a shorter distance than a short wavelength (such as the ray 69). Therefore, the spatial grating pair array shown in FIG. 3B indicates normal dispersion.

The spatial grating pair array as shown in FIGS. 3A and 3B are normally used to control the dispersion using a laser resonator. However, an actual spatial grating pair array cannot provide sufficient dispersion to compensate for a relatively large amount of chromatic dispersion generated by the fiber optical communications system. To be more practical, the angular dispersion generated by diffraction grating is normally very small, that is, approximately 0.05°/nm. Therefore, to compensate for the wavelength dispersion generated in the fiber optical communications system, the first and second diffraction grating 68 and 71 have to be largely apart. Accordingly, such a spatial grating pair array is not practical at all.

FIG. 4 shows the conventional technology of an inverse dispersion device using a VIPA.

In the above mentioned conventional technology, in the patent application numbers 10-534450 and 11-513133, the 'Virtually Imaged Phased Array' as shown in FIG. 4, that is, the device containing the portion referred to as VIPA 1, is suggested as an inverse dispersion device. The VIPA transmits from the VIPA the rays having different wavelengths spatially discriminated. This device includes an optical return device 2 for generating multiple reflection in the VIPA.

The above mentioned device can be realized by comprising a device including the VIPA 1 for receiving the input ray of a wavelength in the range of continuous wavelengths, and continuously generating a corresponding output ray. The output ray can be spatially discriminated from the output ray of a different wavelength in the range of the continuous wavelengths (for example, traveling in different directions). If the output ray can be discriminated at a forward angle, it proves that the device provides angular dispersion.

Furthermore, the above mentioned device is realized by comprising the VIPA 1 and the optical return device 2. The VIPA 1 contains a transmission area and a transparent element. By traveling through the transmission area, a ray can be input from and output to the VIPA 1. A transparent element 3 has the first and the second surfaces. The second surface is reflective, and passes a part of an input ray. The input ray passes through the transmission area. Then, it is received by the VIPA 1, and is reflected many times between the first and second surfaces of the transparent element. A plurality of the transmitted rays interfere each other, and an output ray 4 is generated. The input ray has a wavelength in the range of continuous wavelengths, and the output ray can be spatially discriminated from the ray of another wavelength in the range of the continuous wavelengths. The optical return device 2 can return the output ray in the completely opposite direction to the second surface, pass it through the second surface, and input it into the VIPA 1. The output ray is multiple-reflected in the VIPA 1, and output to an input path through the transmission area of the VIPA 1.

Furthermore, the above mentioned device can be realized by comprising a device including a VIPA for generating a plurality of output rays having the same wavelengths as the input ray and having different interference orders. The device also includes an optical return device for returning an output ray at one interference order to the VIPA, and not returning other output rays. Thus, only the ray corresponding to one interference order is returned to the VIPA.

In addition, the above mentioned device can be realized by including a VIPA, an optical return device, and a lens 5. The VIPA receives an input ray, and generates a corresponding output ray transmitted from the VIPA. The optical return device receives the output ray from the VIPA, and returns it to the VIPA. The lens is positioned such that: (a) the output ray can be returned from the optical return device to the VIPA by passing through the lens from the VIPA and being collected at the optical return device by the lens; (b) the output ray can be returned from the optical return device to the VIPA by being directed from the optical return device to the lens, and then to the VIPA by the lens; and (c) the output ray from the VIPA to the lens can travel parallel to and in the opposite direction of the output ray returned from the lens to the VIPA. Furthermore, the output ray from the VIPA to the lens does not overlap the output ray returned from the lens to the VIPA.

Furthermore, the above mentioned device can be realized by including the device having a VIPA, a mirror 6, and a lens. The VIPA receives an input ray, and generates an output ray traveling from a corresponding VIPA. The lens collects the output ray at the mirror, the mirror reflects the output ray, and the reflected ray is returned to the VIPA by the lens. The mirror is formed such that the device can perform constant wavelength dispersion.

As described above, the VIPA has the function of performing angular dispersion as diffraction grating, and can compensate for wavelength dispersion. Especially, it is characterized by large angular dispersion, and easily provides a practical inverse dispersion device. However, it requires specific conditions of a practical inverse dispersion device for use in a wavelength multiplexed transmission system.

FIG. 5 shows the wavelength dispersion of an optical fiber normally put for practical use.

The wavelength dispersion of an optical fiber normally put for practical use is not constant by a wavelength as shown in FIG. 5, but normally has a small positive slope (the longer the wavelength, the larger positive value the wavelength dispersion indicates). For example, in a common single mode fiber (SMF), the wavelength dispersion per 1 km is about +17 ps/nm while the wavelength dispersion slope indicates 0.06 ps/nm². When a required wavelength band width is, for example, 35 nm, the wavelength dispersion changes approximately +2 ps/nm. Such a slope of wavelength dispersion can be referred to as a wavelength dispersion slope or a second order wavelength dispersion. The wavelength dispersion slope is not always positive (the longer the wavelength, the larger the wavelength dispersion), but a wavelength dispersion slope can be generated such that it can be negative in a wavelength extension longer than the zero dispersion wavelength in a dispersion shifted fiber with the zero dispersion wavelength shifted to the wavelength band of 1.5 μm by changing the structure of the fiber.

Furthermore, the wavelength dispersion graph shown in FIG. 5 is not actually linear, and the slope of wavelength dispersion (wavelength dispersion slope) is not strictly constant, but the third order wavelength dispersion seldom causes problems at a transmission speed of about 40 Gb/s, and can be ignored.

Considering the actual wavelength dispersion of the transmission line of an optical fiber, the wavelength dispersion and a wavelength dispersion slope per unit length depend on the type of optical fiber as shown in FIG. 5, and the actual wavelength dispersion and wavelength dispersion slope depend on the length (transmission distance) of an optical fiber. If the wavelength dispersion of the actual optical fiber transmission line is compensated for by an inverse dispersion device, it is desired that a wavelength dispersion can be somewhat variable because the type and the transmission distance of an optical fiber largely depend on the period in which the optical fiber is installed and the situation of the site of the installed optical fiber.

In the wavelength multiplexed transmission, the compensation of the wavelength dispersion only is not sufficient, but a wavelength dispersion slope becomes a problem. Although the dispersion can be compensated for the wavelength of a signal channel, the wavelength dispersion cannot be completely compensated for with different wavelengths of signal channels if the wavelength dispersion of an inverse dispersion component is constant. Therefore, it is desired that the inverse dispersion device for the wavelength multiplexed transmission has a wavelength dispersion slope. Furthermore, since there are various transmission distances as described above, the wavelength dispersion slope changes in proportion to the length with the wavelength dispersion, it is also desired that the wavelength dispersion slope is somewhat variable. Furthermore, the value of a wavelength dispersion slope to be provided does not depend simply on the value of the wavelength dispersion because, if the type of optical fiber changes, not only the wavelength dispersion but also the wavelength dispersion slope changes as clearly shown in FIG. 5. That is, in the wavelength multiplexed transmission, it is the most desirable that the wavelength dispersion and the wavelength dispersion slope can be independently variable when the wavelength dispersion of an optical fiber transmission line is compensated for by an inverse dispersion device.

The method for having the wavelength dispersion and the wavelength dispersion slope independently vary is not clearly described by the above mentioned patent application numbers 10-534450 and 11-513133. Furthermore, it is not realized by the conventional inverse dispersion devices.

First, with a dispersion compensation fiber, an index profile including an inverse dispersion slope can be designed. However, changing its value requires various index profiles and lengths, and is not a practical operation. In addition, as described above, there is the problem that the method is costly, has a large loss, and large in size.

Furthermore, the chirp fiber grating also requires various index profiles and lengths although it can provide an inverse dispersion slope by optimizing the design of the chirp of the chirp fiber grating. Therefore, it is not a practical method, either. Although the wavelength dispersion and the wavelength dispersion slope are changed by changing the temperature, the value of the wavelength dispersion slope simply depends on the value of the wavelength dispersion. As a result, the wavelength dispersion and the wavelength dispersion slope cannot be independently varied. In addition, a sufficient wavelength band to compensate for the ray containing a large number of wavelengths such as a wavelength division-multiplexed ray cannot be obtained.

In the conventional diffraction grating, it is possible to independently vary the wavelength dispersion and the wavelength dispersion slope to a certain extent by appropriately arranging the diffraction grating. However, as described above, sufficiently large dispersion cannot be realized to compensate for a relatively large amount of chromatic dispersion generated in the fiber optical communications system in a practical size. Therefore, a practical method cannot be realized.

SUMMARY OF THE INVENTION

As described above, the present invention has been developed to solve the above mentioned problems, and aims at providing an apparatus for generating arbitrary wavelength dispersion and wavelength dispersion slope, and simultaneously performing dispersion compensation in multiple wavelength range of multiple channels on the wavelength dispersion and wavelength dispersion slope practically accumulated in an optical fiber.

The object of the present invention can be attained by providing an apparatus having the above mentioned VIPA including: a mirror formed such that substantially constant wavelength dispersion can be performed in a angular dispersion direction of the VIPA regardless of each wavelength of the output ray from the VIPA, and such that different wavelength dispersion can be performed in the direction substantially vertical to the angular dispersion direction of the VIPA; a unit for generating parallel gaps of optical paths by various wavelengths in the direction substantially vertical to the angular dispersion direction of the VIPA between the lens and the mirror; and a unit for varying the amount of the gaps of the optical paths.

According to the present invention, wavelength dispersion and a wavelength dispersion slope can be independently controlled, and can be provided for an optical signal. Therefore, an effective wavelength dispersion compensator can be provided when high-speed optical communications are realized using an optical fiber.

BRIEF DESCRIPTION OF THE DRAWINGS

FIG. 3A shows a spatial grating pair array generating abnormal dispersion;

FIG. 3B shows a spatial grating pair array generating normal dispersion;

FIG. 27A is a side view of a part of the apparatus for independently varying the wavelength dispersion and the wavelength dispersion slope according to an embodiment of the present invention;

FIG. 27B is a top view of a part of the apparatus for independently varying the wavelength dispersion and the wavelength dispersion slope according to an embodiment of the present invention;

FIGS. 28A and 28B are top views of a part of the apparatus for independently varying the wavelength dispersion and the wavelength dispersion slope according to an embodiment of the present invention;

FIG. 40 is a top view of a part of the apparatus for independently varying the wavelength dispersion and the wavelength dispersion slope according to an embodiment of the present invention;

DESCRIPTION OF THE PREFERRED EMBODIMENTS

Figure 1:
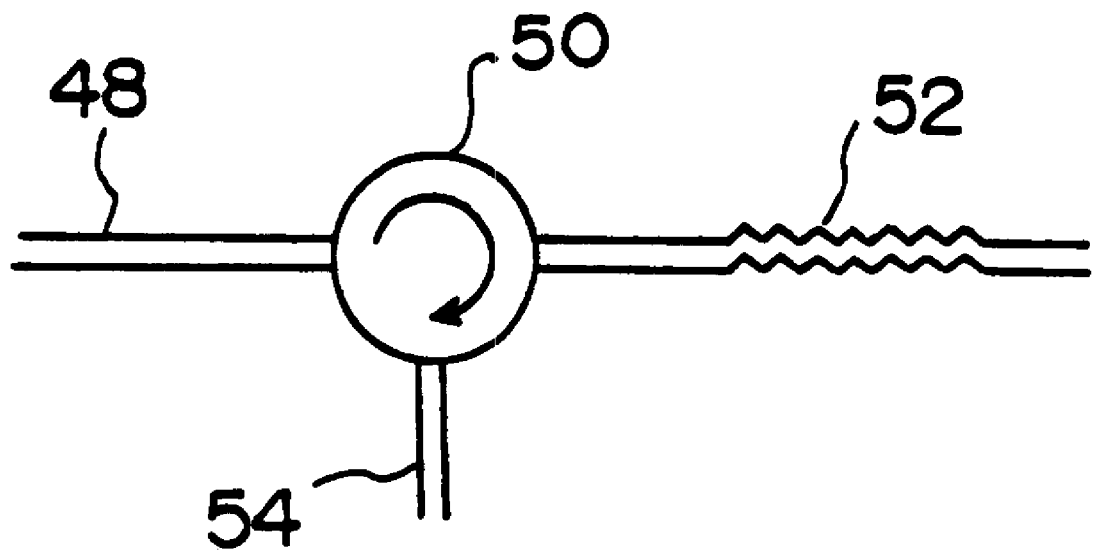
FIG. 1 shows the chirp grating for use as a counter-dispersion unit for compensating for chromatic dispersion.
Figure 2:
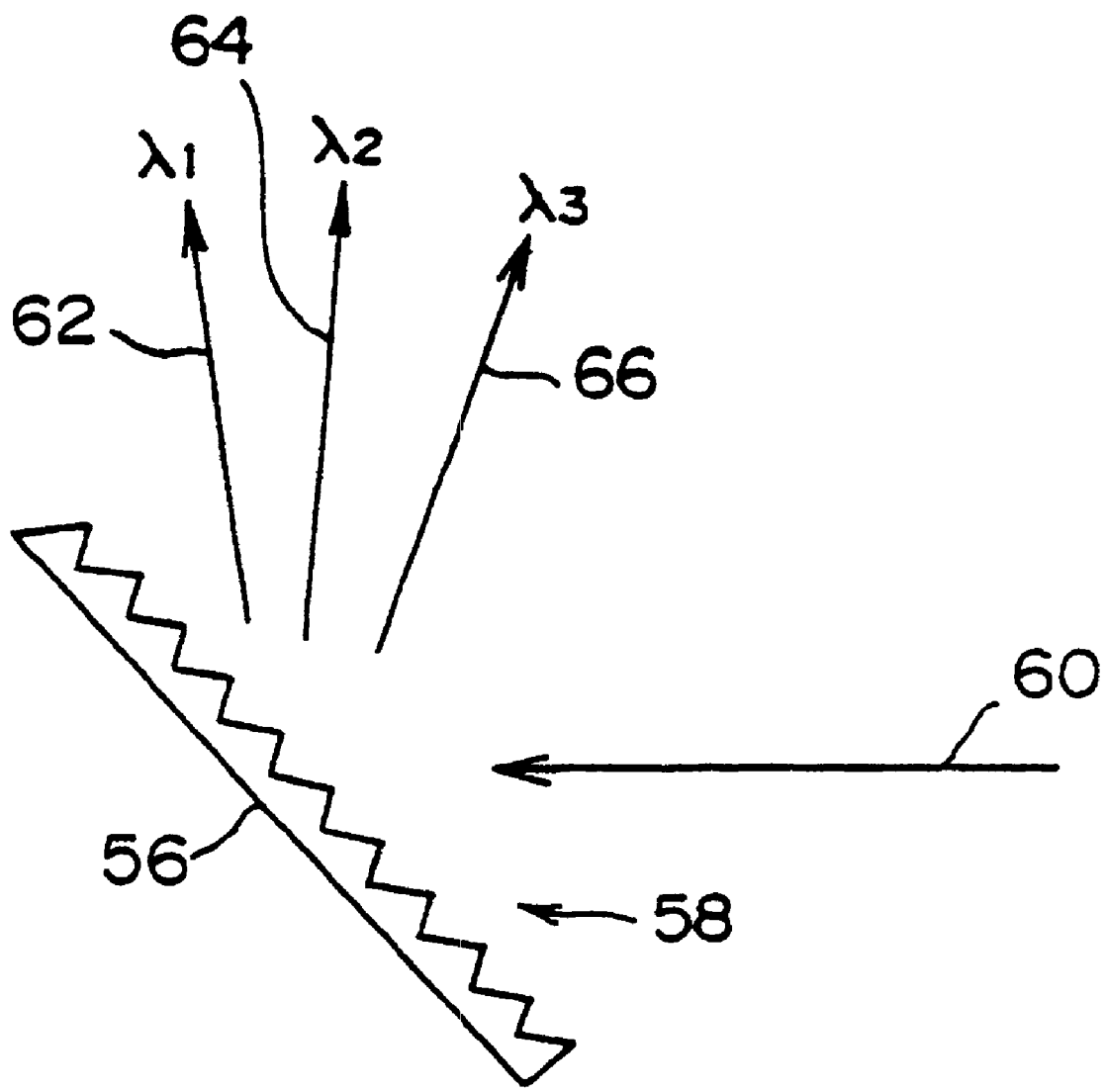
FIG. 2 shows the conventional diffraction grating.

Described below in detail are the embodiments of the present invention. In the attached drawings, the same functions are assigned the same reference numerals.

Figure 6:
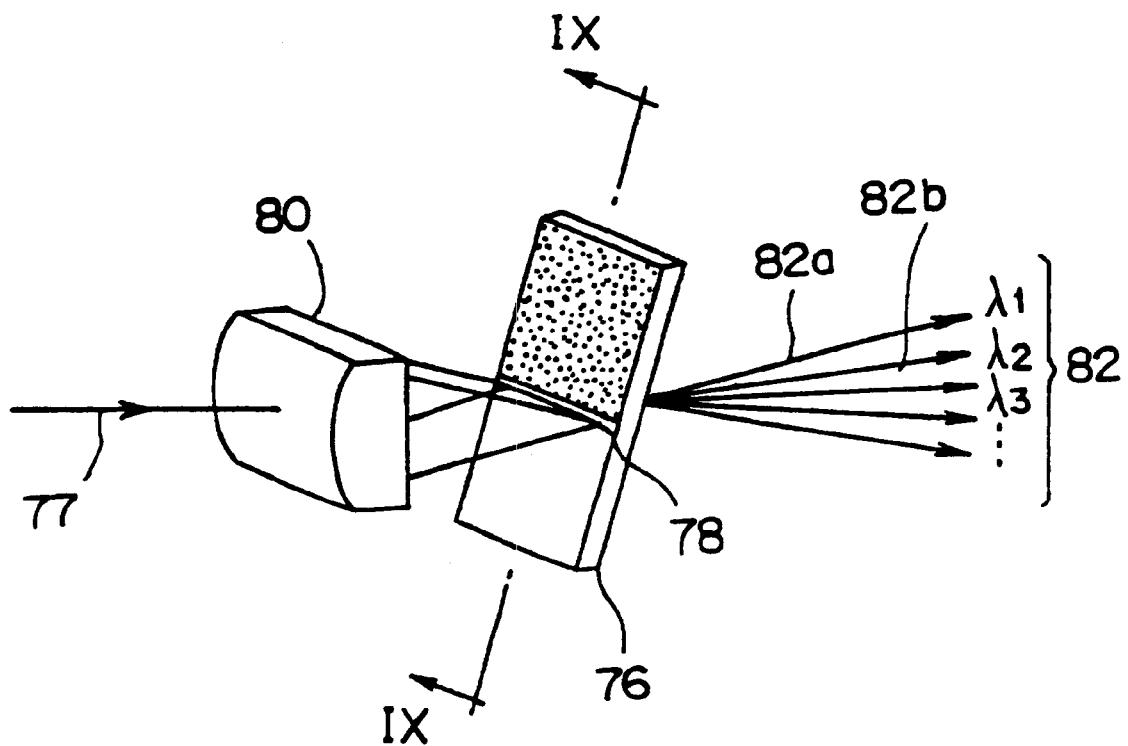
FIG. 6 shows the VIPA according to an embodiment of the present invention.

FIG. 6 shows a virtually imaged phased array (VIPA).

The words 'virtually imaged phased array' and 'VIPA' can be hereinafter replaced with each other.

In FIG. 6, it is desired that a VIPA 76 is a thin glass plate. An input ray 77 is collected on a line 78 through a lens 80 such as a semi-cylindrical lens, etc., and the input ray 77, thereby reaching the VIPA 76. The line 78 is hereinafter referred to as a focal line 78. The input ray 77 is radially transmitted from the focal line 78, and received by the VIPA 76. Then, the VIPA 76 outputs luminous flux 82 of parallel rays. The output angle of the luminous flux 82 changes with the wavelength of the input ray 77. For example, when the wavelength of the input ray 77 is λ1, the VIPA 76 outputs the luminous flux 82a having the wavelength of λ1 in a specified direction. When the wavelength of the input ray 77 is λ2, the VIPA 76 outputs the luminous flux 82a having the wavelength of λ2 in a specified direction. Therefore, the VIPA 76 generates the luminous flux 82a and 82b which can be spatially discriminated from each other.

Figure 7:
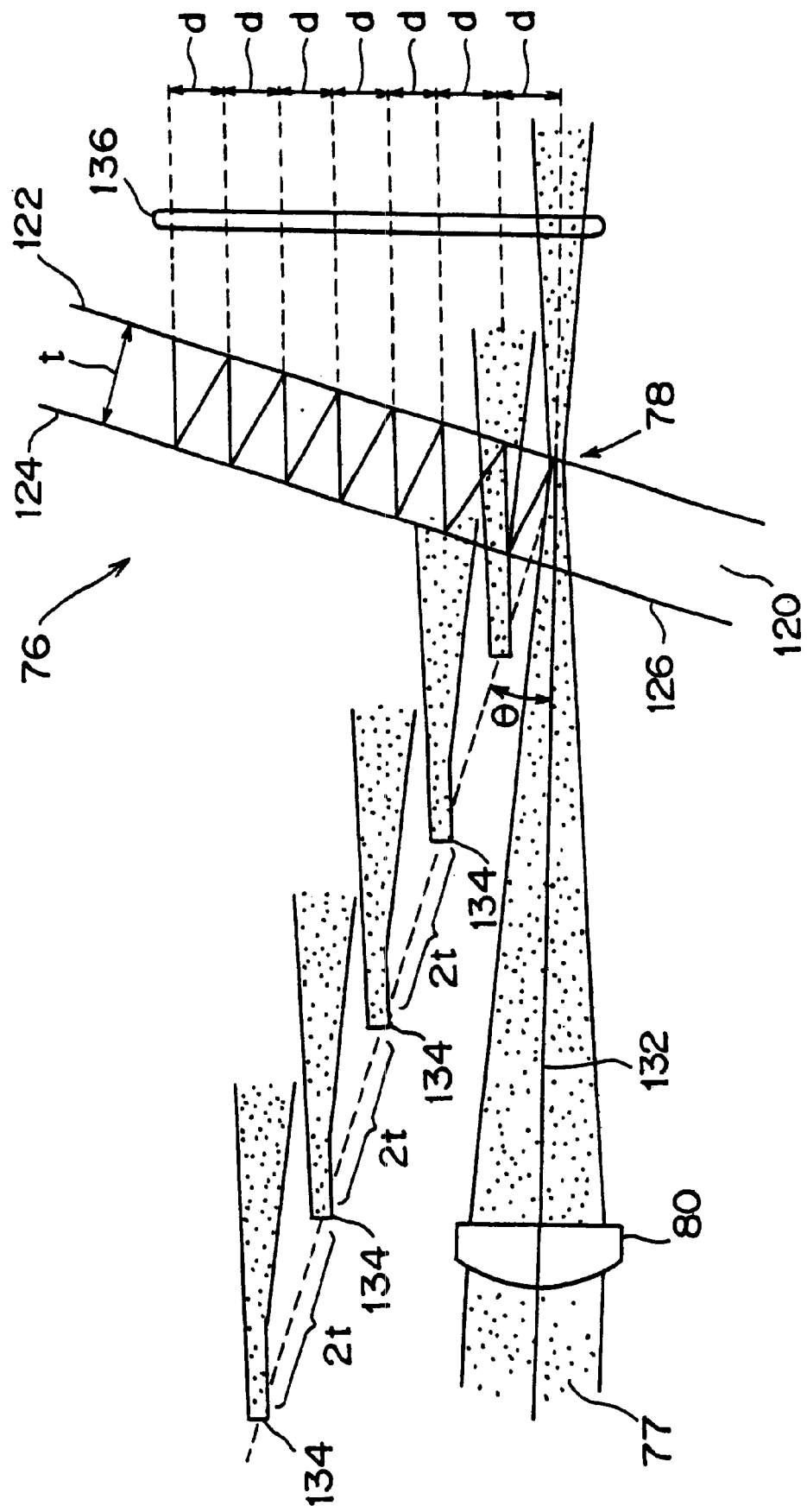
FIG. 7 shows in detail the VIPA shown in FIG. 6 according to an embodiment of the present invention.

FIG. 7 shows in detail the VIPA 76 according to an embodiment of the present invention.

In FIG. 7, the VIPA 76 comprises a plate 120 which is made of, for example, glass, and has reflecting films 122 and 124 on the surface. It is desired that the reflecting film 122 has a reflectance of 95% or higher, but has to be up to 100%. It is desired that the reflecting film 124 has the reflectance of approximately 100%. It is also desired that a radiation window 126 is formed on the plate 120, and has a reflectance of approximately 0%. The input ray 77 is collected by the lens 80 on the focal line 78 through the radiation window 126 such that multiple reflection can be generated between the reflecting films 122 and 124. The focal line 78 is desired to be on the plate 120 to which the reflecting film 122 is applied. Thus, the focal line 78 is desired to be positioned in the plate 120 to which the reflecting film 122 is applied. Thus, the focal line 78 is a line for collecting rays on the reflecting film 122 through the radiation window 126. The width of the focal line 78 collected by the lens 80 is also referred to as a beam waist of the input ray 77.

Thus, according to the embodiment of the present invention shown in FIG. 7, the beam waist of the input ray 77 converges on the farther surface (that is, the surface of the reflecting film 122) of the plate 120. By collecting the beam waist on the farther surface of the plate 120, there can be smaller possibility that the area (for example, an area a shown in FIG. 10 described below in detail) of the radiation window 126 in the surface of the plate 120 covered by the input ray 77 input through the radiation window 126 overlaps the area (for example, an area b shown in FIG. 10 described below in detail) in the reflecting film 124 into which the input ray 77 is first input when it is first reflected by the reflecting film 124 according to the embodiment of the present invention. To correctly perform the operations of the VIPA, it is desired that the above mentioned overlapping areas can be avoided.

In FIG. 7. an optical axis 132 of the input ray 77 has a small slope angle θ. In the first reflection of the reflecting film 122, 5% of the rays are transmitted through the reflecting film 122, and diverges after the beam waist. In addition, 95% of the rays are reflected toward the reflecting film 124. After being reflected by the reflecting film 124, the rays reach the reflecting film 122 with a shift by d. Then, 5% of the rays are transmitted through the reflecting film 122. Similarly, as shown in FIG. 7, the rays diverge from a virtual image 134 at the beam waist. The virtual image 134 is arranged at predetermined intervals of 2t along the line vertical to the plate 120. In this example, t indicates the thickness of the plate 120. The position of the beam waist relative to the virtual image 134 is automatically set. It is not necessary to adjust the positions of the images. The rays from the virtual images 134 interfere with each other, and form parallel rays 136 transmitted in the different directions depending on the wavelengths of the input rays 77.

The intervals of the optical paths are d=2tSinθ, and the difference between the lengths of the adjacent paths is 2tCosθ. The angular dispersion is proportional to the ratio between the two values, that is, proportional to cotθ. As a result, the VIPA generates considerable angular dispersion.

As clearly shown in FIG. 7, the term 'virtually imaged phased array' has come from the form of the arrangement of the virtual image 134.

Figure 8:
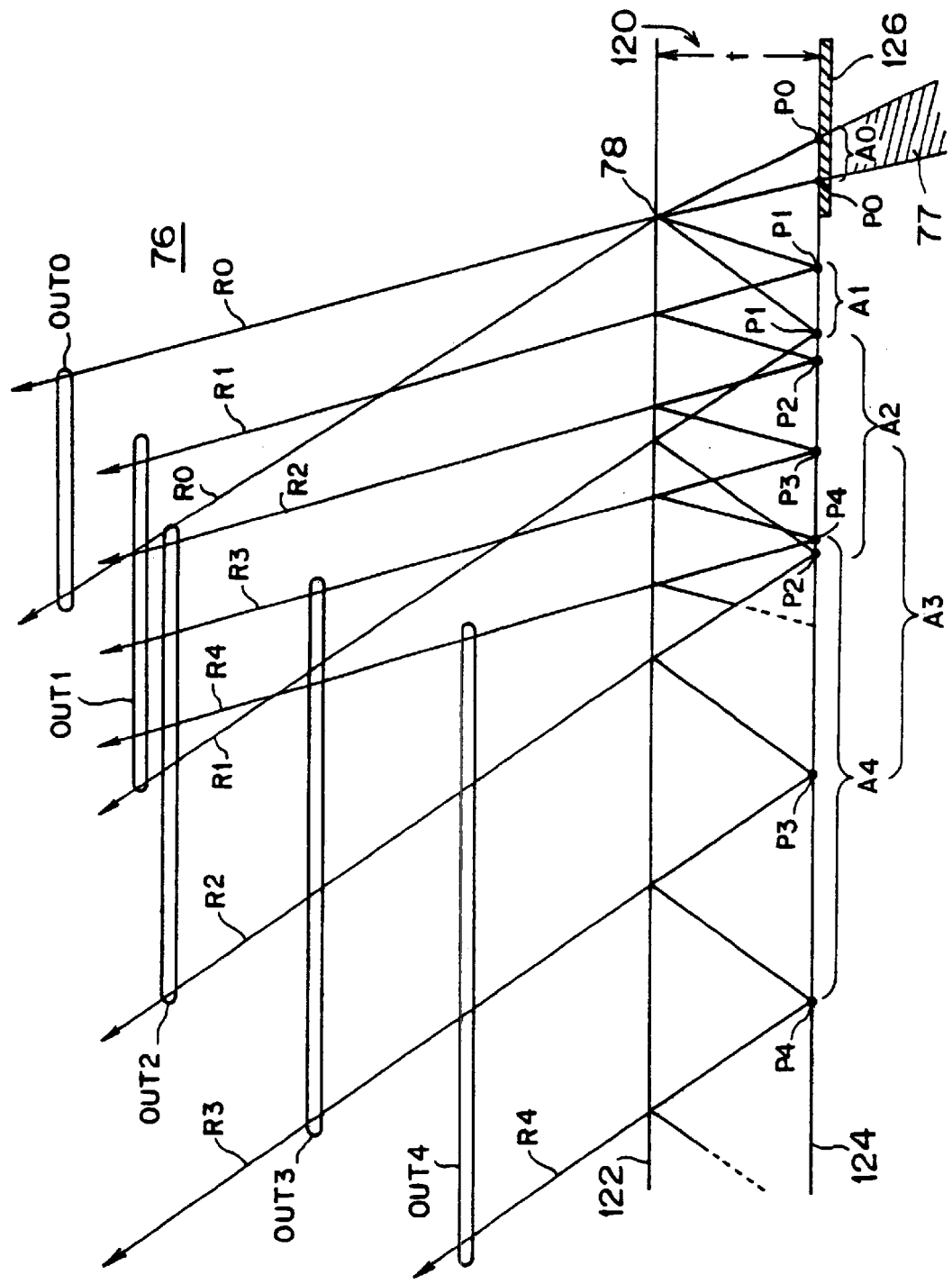
FIG. 8 shows a cross-sectional view along the line IX—IX of the VIPA 1 shown in FIG. 6 according to an embodiment of the present invention.

FIG. 8 shows the cross section along the line IX—IX of the VIPA 76 shown in FIG. 6 according to the embodiment of the present invention.

In FIG. 8, the plate 120 has the reflecting films 122 and 124. The reflecting surfaces 122 and 124 are parallel to each other, and arranged at intervals of t indicating the thickness of the plate 120. The reflecting surfaces 122 and 124 are typical reflecting films applied to the plate 120. As described above, the reflectance of the reflecting surface 124 is approximately 100% excluding the radiation window 126. The reflectance of the reflecting surface 122 is 95% or higher. Therefore, the transmittance of the reflecting surface 122 is 5% or lower. As a result, 5% or lower of the input rays are transmitted through the reflecting surface 122, and 95% or higher of them are reflected. Changing the reflectance of the reflecting surfaces 122 and 124 does not affect the operation of the VIPA. However, the reflectance of the reflecting surface 122 is to be lower than 100% to transmit a part of the input rays.

The radiation window 126 is provided in the reflecting surface 124. It is desired that the radiation window 126 passes rays, and does not reflect them, or has the lowest possible reflectance. The radiation window 126 receives and reflects the input ray 77 on the reflecting surfaces 122 and 124.

FIG. 8 shows the cross section along the straight line IX—IX shown in FIG. 6. Therefore, the focal line 78 shown in FIG. 6 is expressed by dots in FIG. 8. The input rays 77 are radially transmitted from the focal line 78. Furthermore, as shown in FIG. 8, the focal line 78 is provided in the reflecting surface 122. It is not necessary to provide the focal line 78 in the reflecting surface 122, but changing the position of the focal line 78 causes a small change in the characteristic of the VIPA 76.

As shown in FIG. 8, the input ray 77 enters the plate 120 through the area A0 of the radiation window 126. The point P0 indicates a point in the area A0.

By the reflectance of the reflecting surface 122, 95% or higher of the input rays 77 are reflected by the reflecting surface 122, and input into the area A1 of the reflecting surface 124. The point P1 indicates a point in the area A1. After being reflected in the area A1 of the reflecting surface 124, the input rays 77 reach the reflecting surface film 122, and a part of the input rays 77 is transmitted through the reflecting surface 122 as an output ray Out 1 referred to as a Ray R1.

Thus, as shown in FIG. 8, the input ray 77 is multiple-reflected between the reflecting surface 122 and the reflecting surface 124. Each time the ray is reflected by the reflecting surface 122, a transmitted ray is generated. Therefore, for example, immediately after the input rays 77 are reflected in the areas A2, A3, and A4 of the reflecting surface 124, they are reflected by the reflecting surface 122, and output rays Out 2, Out 3, and Out 4 are generated. The point P2 indicates a point in the area A2, the point P3 indicates a point in the area A3, and the point P4 indicates a point in the area A4. The output ray Out 2 is indicated by the ray R2, the output ray Out 3 is indicated by the ray R3, and the output ray Out 4 is indicated by the ray R4. FIG. 8 shows only the output rays Out 0, Out 1, Out 2, Out 3, and Out 4, but there are a large number of rays depending on the intensity of the input ray 77 and the reflectance of the reflecting surfaces 122 and 124. As described below in detail, the output rays interfere with each other, and generate luminous flux directed in different directions depending on the wavelength of the input ray 77. Therefore, the luminous flux can be referred to as an output ray generated by the interference among the output rays Out 1, Out 2, Out 3, and Out 4.

Figure 9:
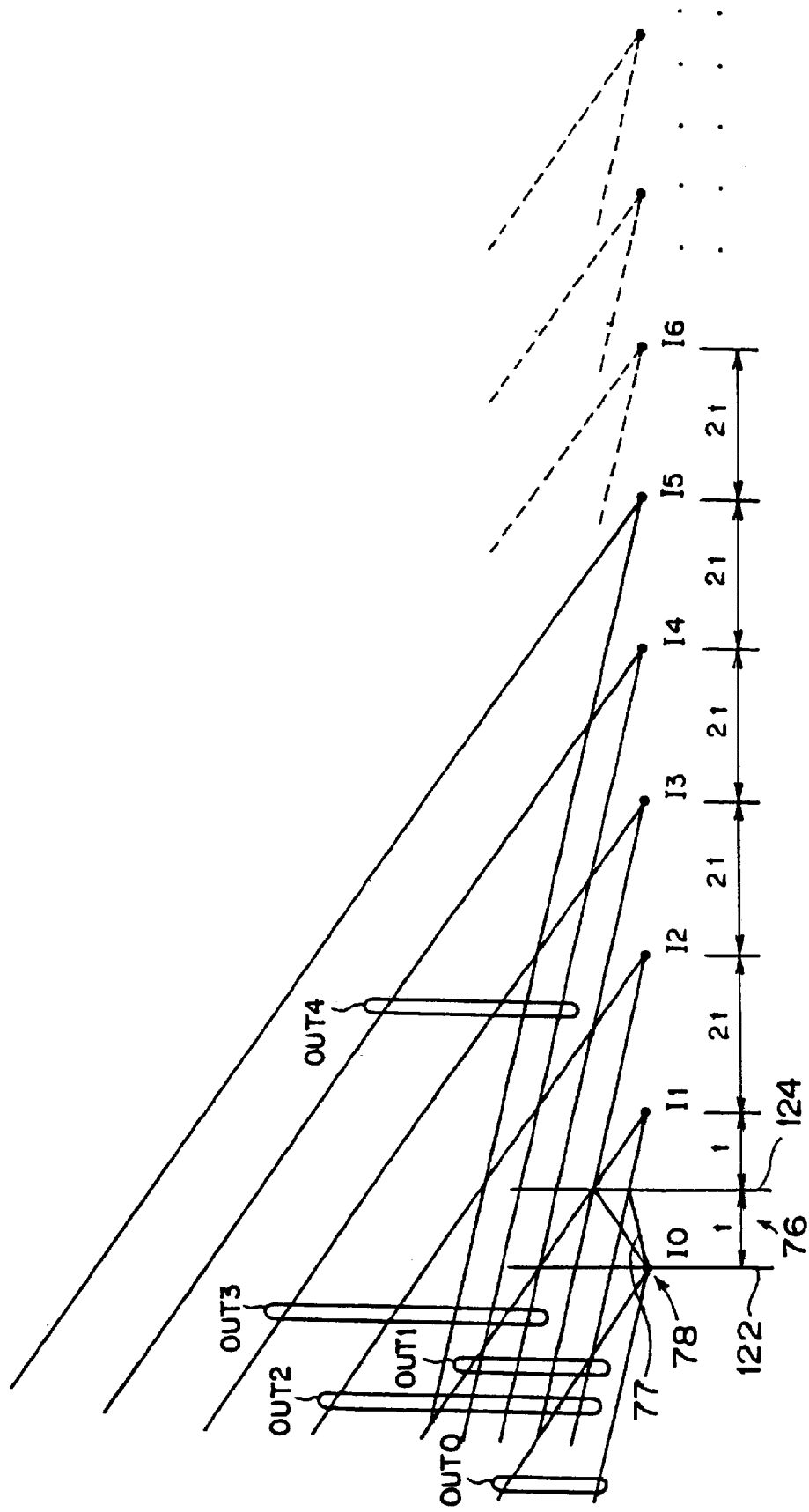
FIG. 9 shows the interference between the reflected rays by the VIPA according to an embodiment of the present invention.

FIG. 9 shows the interference of reflected rays by the VIPA according to the embodiment of the present invention.

In FIG. 9, the ray transmitted from the focal line 78 is reflected by the reflecting surface 124. As described above, the reflectance of the reflecting surface 124 is approximately 100%, and basically has the function of a mirror. As a result, it can be assumed that the output ray Out 1 has been emitted from the focal line I1 without the reflecting surfaces 122 and 124. Similarly, it can be assumed that the output rays Out 2, Out 3, and Out 4 have been emitted from the focal lines I2, I3, and I4. The focal lines I2, I3, and I4 are virtual images of the focal line I0.

Therefore, as shown in FIG. 9, the focal line I1 is 2t apart from the focal line I0, where t indicates the distance between the reflecting surfaces 122 and 124. Similarly, the subsequent focal lines are spaced 2t apart. Therefore, the focal line I2 is placed at a distance of 2t from the focal line I1. Furthermore, an output ray lower in intensity than the output ray immediately before is generated by the subsequent multiple reflection between the reflecting surfaces 122 and 124. Therefore, the output ray Out 2 is lower in intensity than the output ray Out 1.

As shown in FIG. 9, the output rays from focal lines overlap and interfere with each other. In further detail, since the focal lines I1, I2, I3, and I4 are virtual images of the focal line I0, the output rays Out 0, Out 1, Out 2, Out 3, and Out 4 have equal optical phases on the focal lines I1, I2, I3, and I4. Therefore, the interference generates luminous flux transmitting in different directions depending on the wavelength of the input ray 77.

The VIPA according to the embodiment of the present invention contains the constructive condition which is the feature of designing a VIPA. By satisfying the constructive condition, luminous flux is generated with the interference of output rays intensifying each other. The constructive condition of the VIPA is expressed by the following equation (1).

$$2t \times \cos \phi = m\lambda \quad (1)$$

where $\phi$ indicates the transmission direction viewed from the line vertical to the reflecting surfaces 122 and 124. $\lambda$ indicates the wavelength of an input ray, t indicates the distance between the reflecting surface 122 and the reflecting surface 124, and m indicates an integer.

Furthermore, the input rays 77 radially diverge from the focal line 78 at a specified angle. Therefore, input rays having equal wavelengths travel in a number of different directions from the focal line 78, and are reflected by the reflecting surfaces 122 and 124. On the constructive condition of the VIPA, rays traveling in a specified direction intensify each other through the interference of output rays, and form luminous flux in the direction corresponding to the wavelength of an input ray. A ray traveling in a direction different from a specified direction based on the constructive condition is reduced in intensity by the interference of output rays.

Figure 10:
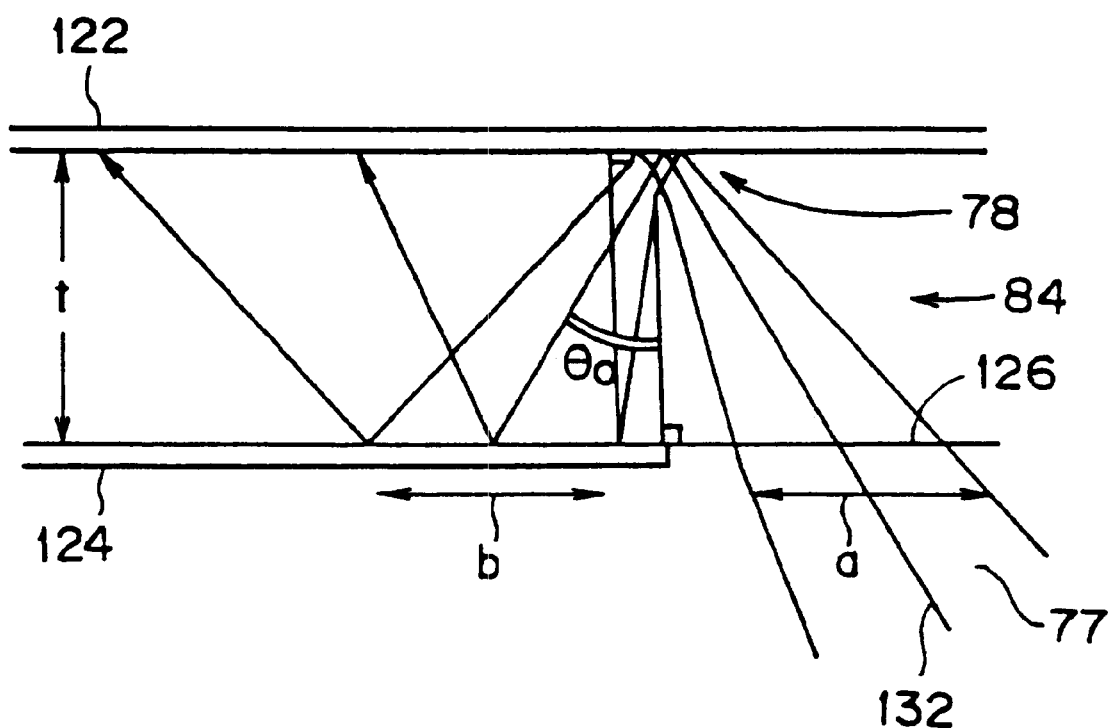
FIG. 10 shows a cross-sectional view along the line IX—IX of the VIPA 1 shown in FIG. 6 to determine the slope angle of an input ray according to an embodiment of the present invention.

FIG. 10 shows the cross section along the straight line IX—IX of the VIPA shown in FIG. 6, and shows the characteristic of the VIPA for determining the angle of incidence or the slope angle used in an embodiment of the present invention.

In FIG. 10, the input ray 77 is collected by the cylindrical lens (not shown in the attached drawings, and converge on the focal line 78. As shown in FIG. 10, the input ray 77 covers an area having the width of "a" in the radiation window 126. After the input ray 77 is once reflected by the reflecting surface 122, it reaches the reflecting surface 124, and covers the area having the width of "b" in the reflecting surface 124. Furthermore, as shown in FIG. 10, the input ray 77 travels along the optical axis 132 having the slope angle of θ1 corresponding to the line vertical to the reflecting surface 122.

The slope angle θ1 has to be set to a value such that, after the input ray 77 is once reflected by the reflecting surface 122, the input ray 77 cannot be positioned outside the plate through the radiation window 126. That is, the slope angle θ1 has to be set such that the input ray 77 can be fetched between the reflecting surface 122 and the reflecting surface 124, and cannot be leaked out of the radiation window 126. Therefore, to prevent the input ray 77 from leaking out of the plate through the radiation window 126, the slope angle θ1 is to be set by the following equation (2).

$$\text{slope angle } \theta 1 \text{ of optical axis} \geq (a+b)/4t \quad (2)$$

Therefore, as shown in FIGS. 6 through 10, the embodiment of the present invention comprises a VIPA for receiving an input ray having various wavelengths in a continuous wavelength range. The VIPA is designed to allow self-interference by the multiple reflection of an input ray, and form an output ray. The output ray can be spatially discriminated from the input ray having a different wavelength in continuous wavelength areas. For example, FIG. 8 shows the input ray 77 indicating the multiple reflection between the reflecting surfaces 122 and 124. The multiple reflection generates a plurality of output rays Out 0, Out 1, Out 2, Out 3, and Out 4 capable of interfering with each other and generating luminous flux spatially discriminating wavelengths of the input ray 77.

'Self-interference' refers to the interference generated among a plurality of rays from the same light source. Therefore, since the output rays Out 0, Out 1, Out 2, Out 3, and Out 4 are generated from the same light sources (that is, the input ray 77), the interference of the output rays Out 0, Out 1, Out 2, Out 3, and Out 4 is referred to as the self-interference of the input ray 77.

According to the present invention, an input ray can have an arbitrary wavelength in the range of continuous wavelengths. Thus, the input ray is not limited to the wavelength of the value selected from the range of discontinuous values. Furthermore, according to the present embodiment, the output rays generated for the input rays of a specific wavelength in the range of continuous wavelengths are spatially discriminated from the output rays generated when the input rays have different wavelengths in the range of continuous wavelengths.

Therefore, for example, as shown in FIG. 6, the direction (that is, the 'spatial characteristic') of the luminous flux 82 becomes different when the input ray 77 has a different wavelength in the range of continuous wavelengths.

FIG. 11 shows the method of generating the VIPA used in an embodiment of the present invention.

Figure 11A:
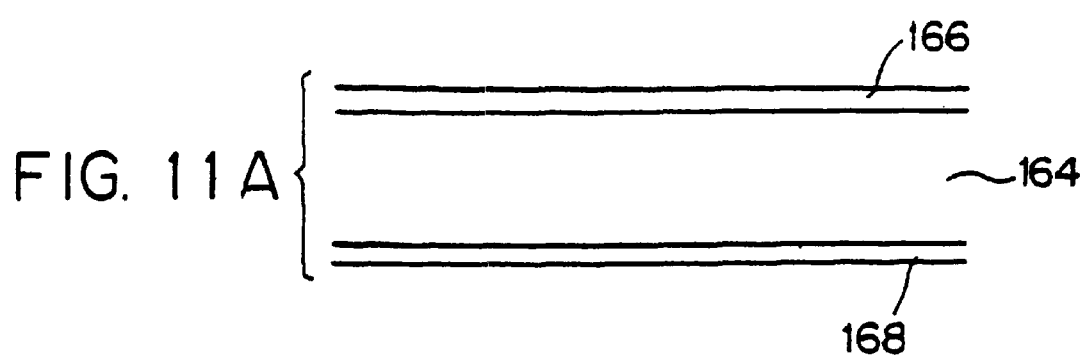
FIGS. 11A, 11B, 11C, and 11D show the method of producing the VIPA according to an embodiment of the present invention.

In FIG. 11A, it is desired that a parallel plates 164 are made of glass, and have excellent parallelism. Reflecting films 166 and 168 are provided on both surfaces of the parallel plates 164 in the vacuum evaporation method, ion beam assist evaporation method, spattering method, etc. It is desired that one of the reflecting films 166 and 168 has the reflectance of 100%, and the other has the reflectance higher than 80% and lower than 100%.

Figure 11B:
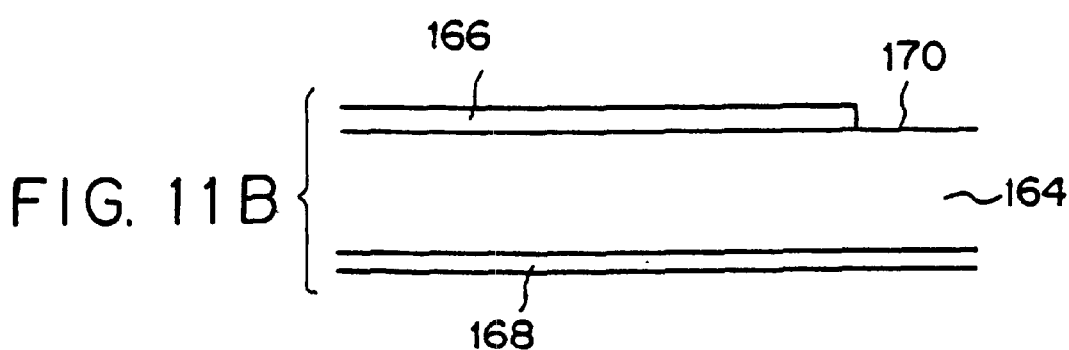

In FIG. 11B, one of the reflecting films 166 and 168 is partly ground to form a radiation window 170. The reflecting film 166 shown in FIG. 11B is ground such that the radiation window 170 can be formed on the same surface as the reflecting film 166 on the parallel plates 164. Instead, the reflecting film 168 can be partly ground such that the radiation window can be formed on the same surface as the reflecting film 168 on the parallel plates 164. As indicated in various embodiments of the present invention, the radiation window can be provided in either sides of the parallel plates 164.

The reflecting film can be ground in the etching process, but also can be processed in a mechanical carving process which requires smaller cost. However, when a reflecting film is mechanically carved, the parallel plates 164 are to be carefully processed to minimize the damage to the parallel plates 164. For example, when there is large damage to the parallel plates 164 forming a radiation window, the parallel plates 164 suffer excess losses by the dispersion of received input rays.

Instead of first forming and carving a reflecting film, a portion of the parallel plates 164 is masked corresponding to a radiation window so that the portion cannot be covered with the reflecting film.

Figure 11C:
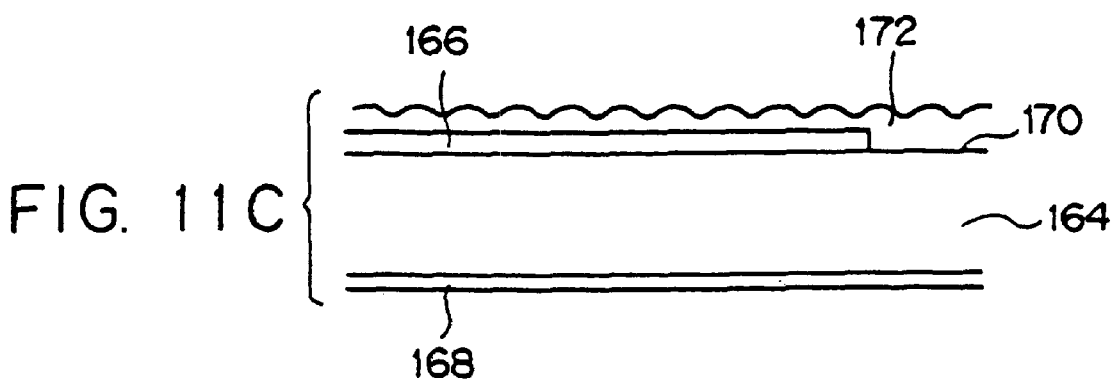

As shown in FIG. 11C, a transparent adhesive 172 is applied to the reflecting film 166 and a part of the parallel plates 164 excluding the reflecting film 166. Since the transparent adhesive 172 is also provided in a part of the parallel plates 164, the optical loss can be minimized.

Figure 11D:
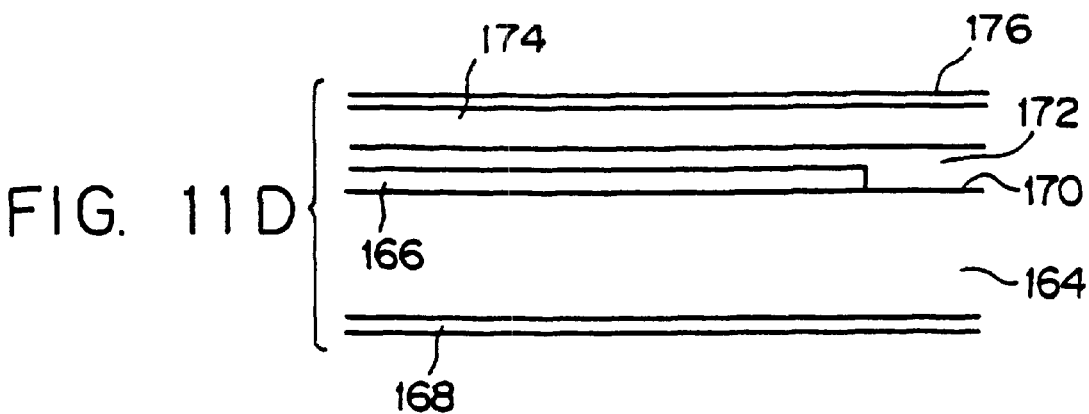

In FIG. 11D, a protective transparent plate 174 is placed on and protects the reflecting film 166 and reflecting film 166 coated with the transparent adhesive 172.

The protective transparent plate 174 is placed on the top surface of the parallel plates 164 so that the transparent adhesive 172 can be applied to fill the concave portion after removing the reflecting film 166.

Similarly, to protect the reflecting film 168, the adhesive (not shown in the attached drawings) is applied on the top surface of the reflecting film 168 to provide a protective plate (not shown in the attached drawings). When the reflecting film 168 has the reflectance of about 100%, and there is no radiation window on the surface of the same parallel plates 164, it is not necessary that the adhesive and the protective plate are transparent.

Furthermore, an anti-reflection film 176 can be applied to the transparent protective plate 174. For example, the protective transparent plate 174 and the radiation window 170 can be covered with the anti-reflection film 176.

According to the above mentioned embodiment of the present invention, the focal line is assumed to be on the radiation window, or on the opposite surface of the parallel plates into which input rays are input, but the focal line can also be in the parallel plates or before the radiation window.

According to the above mentioned embodiment of the present invention, two reflecting films reflect the rays between them, and the reflectance of one of them is about 100%. However, the similar effect can be obtained by two reflecting films having the reflectance up to 100%. For example, the two reflecting films can have the reflectance of 95%. In this case, each reflecting film transmits rays and generates interference. As a result, the luminous flux traveling in different directions depending on the wavelength can be formed on both sides of the parallel plates having reflecting films. Thus, various reflectance shown in various embodiment of the present invention can be changed depending on the characteristic requested by the VIPA.

The VIPA according to the above mentioned embodiment of the present invention maintains a constant phase difference between interference rays using multiple reflection. As a result, the characteristic of the VIPA becomes stable, thereby reducing a change in optical characteristic generated by polarization.

According to the above mentioned embodiment of the present invention, the luminous flux spatially discriminated from each other can be obtained. The 'to be spatially discriminated' means that flux can be spatially discriminated. For example, various types of luminous flux can be assumed that they can be spatially discriminated when they are parallel and travel in different directions, or are collected in different positions. However, the present invention is not limited to these detailed examples, but can be realized in various methods for spatially discriminating luminous flux.

Figure 12:
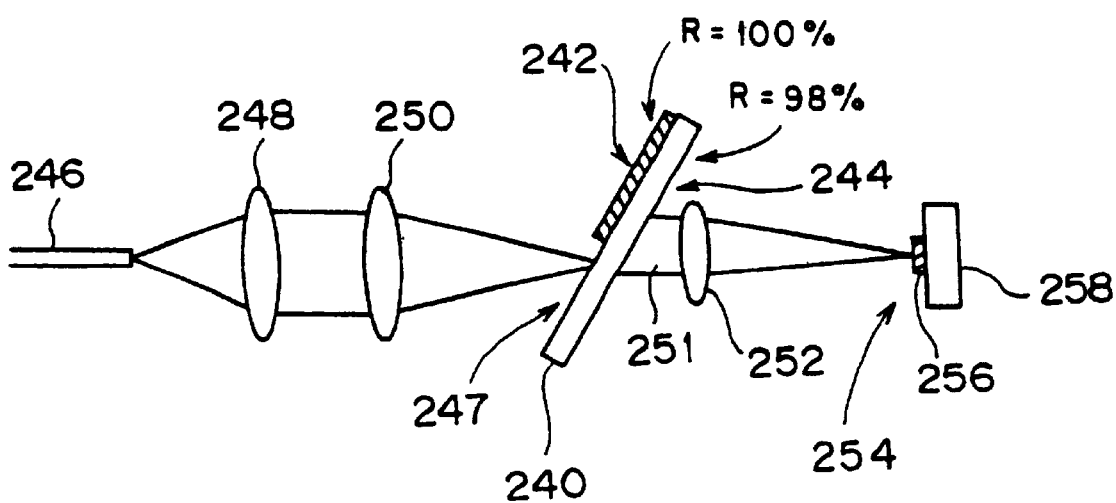
FIG. 12 shows the apparatus which uses the VIPA as an angular dispersion unit for generating chromatic dispersion according to an embodiment of the present invention.

FIG. 12 shows the conventional device in which the VIPA, not diffraction grating, is used as an angular dispersion unit to generate wavelength dispersion.

In FIG. 12, a VIPA 240 comprises a first surface 242 having reflectance of about 100%, and a second surface 244 having reflectance of about 98%. The VIPA 240 also comprises a radiation window. The VIPA 240 is not limited to this configuration, but can have a number of different configurations.

As shown in FIG. 12, a ray is output from a fiber 246, collimated by a collimating lens 248, and linearly collected by a cylindrical lens 250 on the VIPA 240 through a radiation window 247. Then, the VIPA 240 generates a collimated ray 251 collected on a mirror 254 by a focal lens 252. The mirror 254 can be a mirror portion 256 formed on a substrate 258.

The mirror 254 reflects rays, and transmits the rays to the VIPA 240 through the focal lens 252. Then, the rays produce multiple reflection in the VIPA 240, and output from the radiation window 247. The rays output from the radiation window 247 are received by the fiber 246 through the collimating lens 248.

Therefore, the rays are output from the VIPA 240, reflected by the mirror 254, and returned to the VIPA 240. The rays reflected by the mirror 254 are returned through the path they have traveled. As described below in detail, the different wavelength components of rays have focal points on the different points of the mirror 254, and the rays are reflected and returned to the VIPA 240. As a result, the different wavelengths travel different distances, and generates wavelength dispersion.

Figure 13:
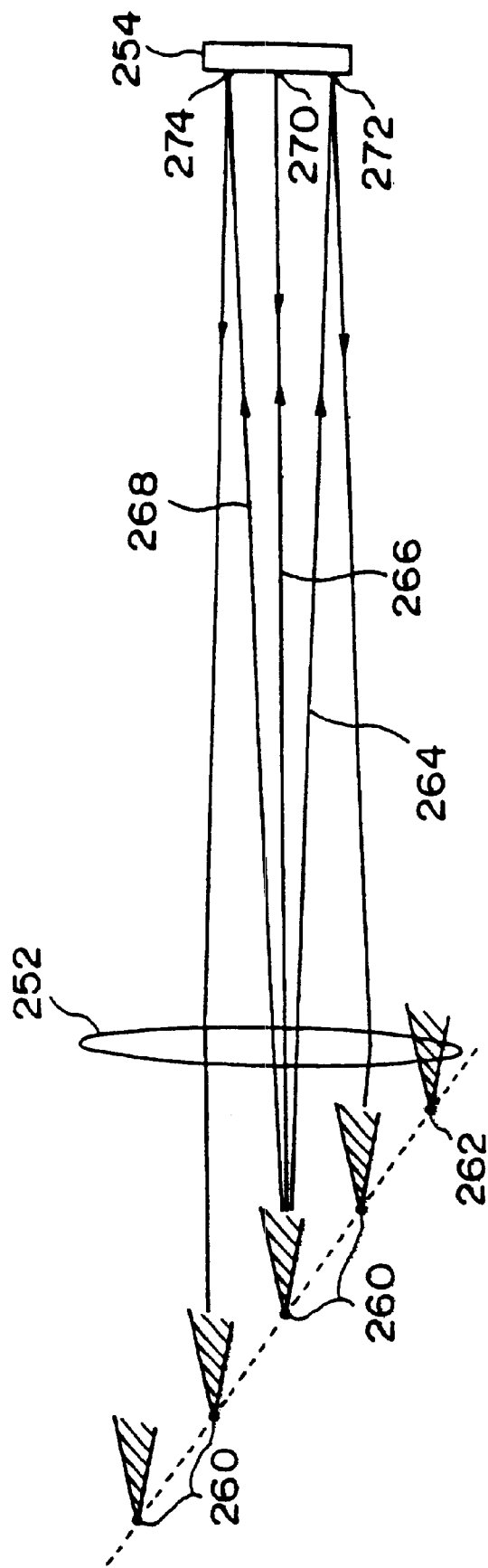
FIG. 13 shows in detail the operation of the apparatus shown in FIG. 12 according to an embodiment of the present invention.

FIG. 13 shows further in detail the principle of the operation of the VIPA 1 shown in FIG. 12.

It is assumed that rays having various wavelength components are received by the VIPA 240. As shown in FIG. 13, the VIPA 240 forms a virtual image 260 of a beam waist 262, and the virtual image 260 emits rays of light. As shown in FIG. 13, the focal lens 252 collects the focal points of different wavelength components of the collimated rays from the VIPA 240 on the different points of the mirror 254. Furthermore, a longer wavelength 264 is collected on a point 272, a central wavelength 266 is collected on a point 270, and a shorter wavelength 268 is collected on a point 274. The longer wavelength 264 is returned to the virtual image 260 closer to the beam waist 262 than the central wavelength 266. The shorter wavelength 268 is returned to the virtual image 260 farther to the beam waist 262 than the central wavelength 266. In the above mentioned array, normal dispersion takes place.

The mirror 254 reflects only the rays of a specific interference order, and the rays of other interference orders are collected outside the mirror 254. Furthermore, as described above, the VIPA 1 outputs collimated rays. The collimated rays travels in the direction having a difference of mλ in the path from each virtual image where m indicates an integer. The m-th interference is defined as an output ray corresponding to m.

Figure 14:
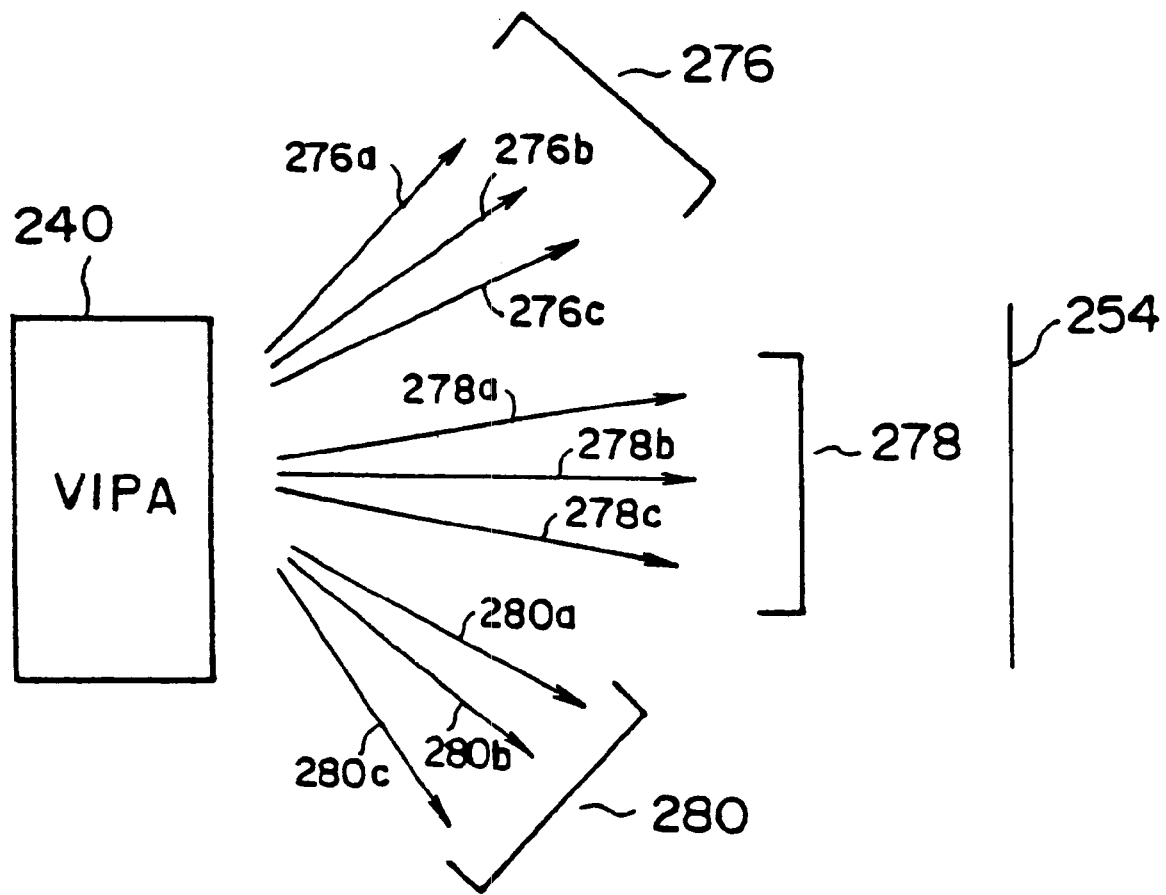
FIG. 14 shows various orders of the interference of the VIPA according to an embodiment of the present invention.

For example, FIG. 14 shows various interference order of the VIPA.

In FIG. 14, the VIPA 1 such as the VIPA 240 emits collimated rays 276, 278, and 280. Each of the collimated rays 276, 278, and 280 corresponds to a different interference order. Therefore, for example, the collimated ray 276 corresponds to the ray of the (n+2)th interference order, the collimated ray 278 corresponds to the ray of the (n+1)th interference order, and the collimated ray 280 corresponds to the ray of the n-th interference order. In the above mentioned description, n indicates an integer. The collimated ray 276 is shown as having a plurality of wavelength components 276a, 276b, and 276c. Similarly, the collimated ray 276 is shown as having a plurality of wavelength components 280a, 280b, and 280c. The wavelength components 276a, 278a, and 280a are the same wavelengths. The wavelength components 276b, 278b, and 280b also have the same wavelengths. FIG. 14 shows only the collimated rays of three different interference orders, but the collimated rays of other interference orders are emitted.

Since the collimated rays travels in different directions with the same wavelengths for different interference orders, and collected in different positions, the mirror 254 can reflects only the rays of a single interference order, and return the reflected rays to the VIPA 240. For example, as shown in FIG. 14, the length of the reflecting portion of the mirror 254 is set relatively small, and only the ray corresponding to a single interference order is reflected. Furthermore, in FIG. 14, only the collimated ray 278 is reflected by the mirror 254. Thus, the collimated rays 278 and 280 are collected outside the mirror 254.

A wavelength division-multiplexed ray normally contains a number of channels. By referring to FIG. 12 again, the thickness t between the first surface 242 and the second surface 244 of the VIPA 240 is set to a specified value, the dispersion at each channel with the configuration is simultaneously compensated for.

Further in detail, each channel has a central wavelength. The central wavelengths are normally apart from each other at predetermined frequency intervals. The thickness t between the first surface 242 and the second surface 244 is set such that all wavelength components corresponding to the central wavelengths can be output at the same output angle from the VIPA 240. This is possible when the thickness t is set for each channel such that the forward-and-backward traveling distance of the rays on the VIPA 240 can be a multiple of central wavelengths of each channel. The value of the thickness t is hereinafter referred to as a 'thickness in the range of a WDM matching free spectrum' or a 'thickness of a WDM matching FSR'.

In this case, the forward-and-backward optical traveling distance (2ntcosθ) through the VIPA 240 is equal to a value obtained by multiplying a central wavelength of each channel for a different integer having the same θ by an integer. In the description, n indicates the refractive index of the material between the first surface 242 and the second surface 244, and θ indicates the direction of propagation of luminous flux corresponding to the central wavelength of each channel. Furthermore, as described above, θ indicates a slope angle of the optical axis of an input ray (refer to FIG. 7).

Therefore, if t is set such that 2ntcosθ is equal to a multiple of the central wavelength at each channel for a different integer having the same θ relative to the wavelength corresponding to the central wavelength at each channel, then all wavelength components for the central wavelengths have the same output angle from the VIPA 240, and have the same focal position on the mirror 254.

For example, if the forward-and-backward physical length (double the thickness of 1 mm of the VIPA 240) is 2 mm, and the refractive index is 1.5, then all wavelengths at 100 GHz intervals satisfy the condition. As a result, the VIPA 240 can simultaneously compensate for the dispersion for all channels of a wavelength division-multiplexed ray.

Therefore, in FIG. 13, when the thickness t is set as the thickness of the FSR of the WDM matching, the VIPA 240 and the focal lens 252 can (a) concentrate the wavelength component corresponding to the central wavelength of each channel on the point 270 of the mirror 254, (b) concentrate the wavelength component corresponding to a component having a longer wavelength of each channel on the point 272 of the mirror 254, and (c) concentrate the wavelength component corresponding to a component having a shorter wavelength of each channel on the point 274 of the mirror 254. Therefore, using the VIPA 240, the wavelength dispersion can be compensated for all channels of the wavelength division-multiplexed rays.

Figure 15:
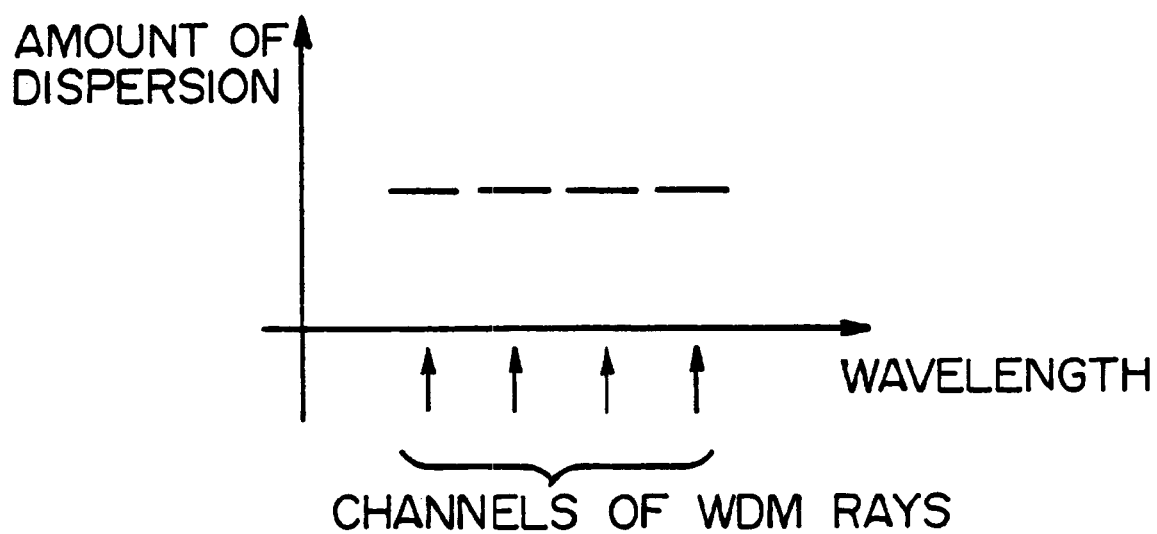
FIG. 15 shows the chromatic dispersion of several channels of a wavelength division-multiplexed ray according to an embodiment of the present invention.

FIG. 15 is a graph indicating the amount of dispersion of some channels of the wavelength division-multiplexed ray when the thickness t is set as the thickness of the FSR of the WDM matching according to an embodiment of the present invention.

As shown in FIG. 15, the same dispersion takes place for all channels. However, the dispersion should not continue among channels. Furthermore, the range of the wavelength of each channel for which the VIPA 240 compensates for the dispersion can be set by appropriately setting the size of the mirror 254.

Figure 16A:
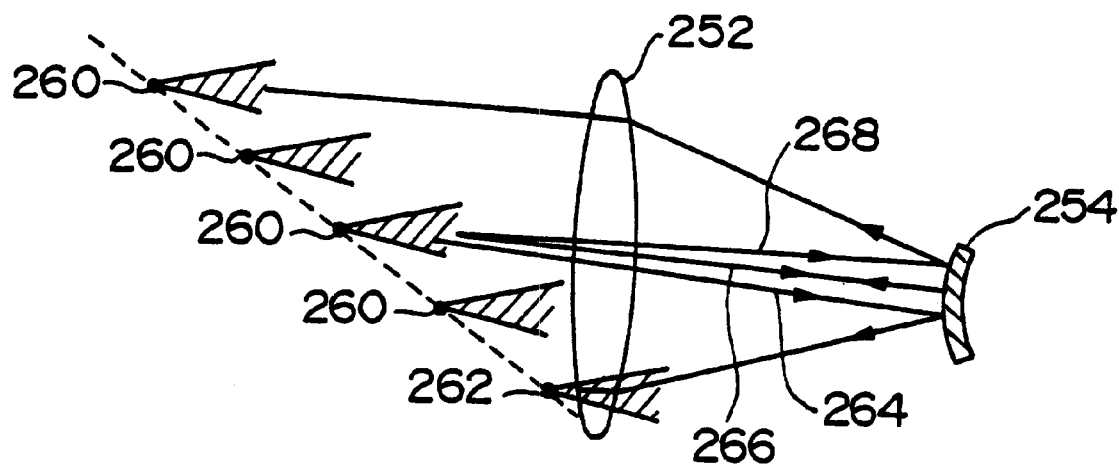
FIGS. 16A and 16B are side views of the apparatus which uses the VIPA to disperse a ray according to another embodiment of the present invention.
Figure 16B:
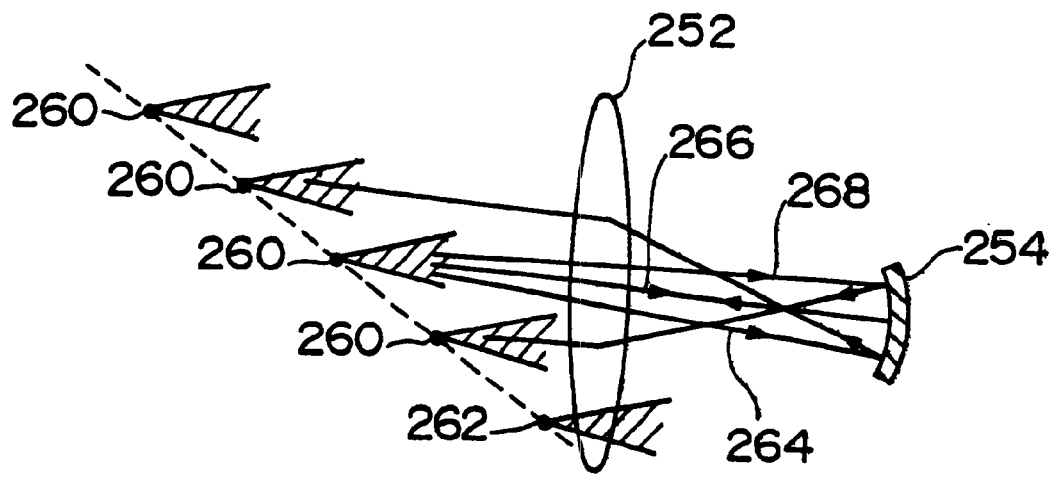

FIGS. 16A and 16B are side views of the device in which the VIPA is used to assign each value of the wavelength dispersion to a ray of light to explain that the wavelength dispersion depends on the shape of a mirror.

FIGS. 16A and 16B are similar to FIG. 13 in that they show the directions of the longer wavelength 264, the central wavelength 266, and the shorter wavelength 268 emitted by the virtual image 260 of the beam waist 262.

In FIG. 16A, the mirror 254 is a convex mirror. Using a convex mirror, the beam shift is extended. Therefore, large chromatic dispersion takes place with a short focal distance and at short intervals. When the mirror 254 is convex, the convexity can be viewed only from the side as shown in FIG. 16A, but cannot be viewed from above.

In FIG. 16B, the mirror 254 is a concave mirror. Using a concave mirror, the sign of the dispersion is inverted. Therefore, abnormal dispersion takes place with a short focal distance and at short intervals. When the mirror 254 is concave, the concavity can be viewed only from the side, but cannot be viewed from above as shown in FIG. 16B.

Therefore, the mirror 254 normally appears flat from above. However, if the mirror 254 is rotated and viewed from above, it proves that the mirror is a one-dimensional mirror.

In FIGS. 16A and 16B, the mirror 254 is located at or near the focal point of the focal lens 252.

Therefore, as described above, for example, the mirror 254 can be concave or convex when viewed from the side as shown in FIGS. 16A and 16B. A convex mirror promotes the wavelength dispersion, and a concave mirror reduces the wavelength dispersion or inverts the negative (normal) into the positive (abnormal) Further in detail, the convex mirror generates large dispersion in the negative direction, and the concave mirror either generates small dispersion in the negative direction or inverts the dispersion into positive. This is realized by the level of the chromatic dispersion equal to the function of the curvature of the mirror viewed from the side.

Figure 17:
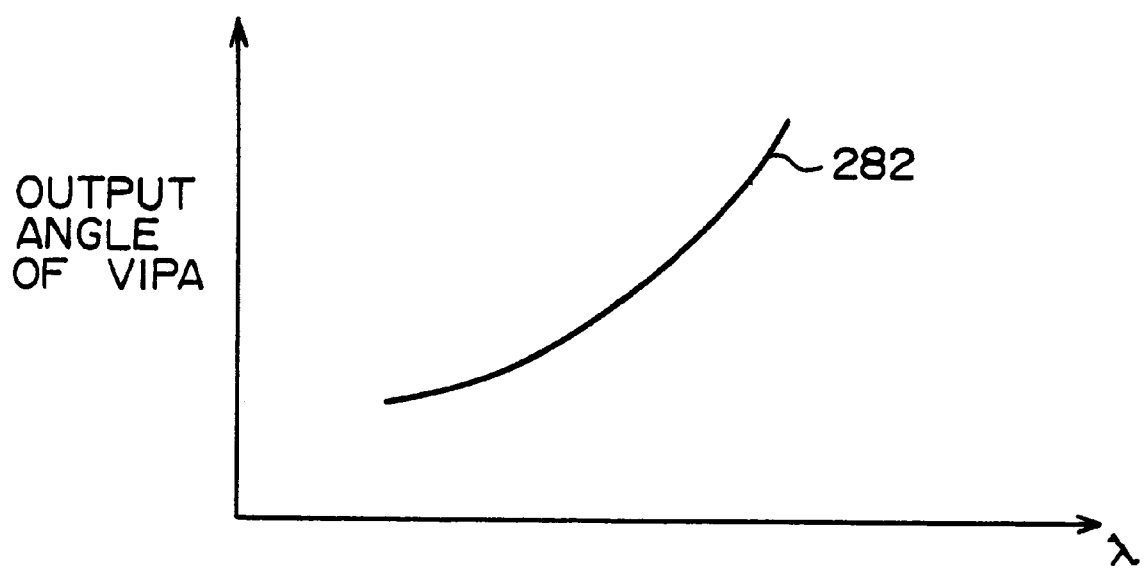
FIG. 17 shows the angle of output luminous flux of the VIPA for the wavelength of luminous flux according to an embodiment of the present invention.

FIG. 17 is a graph of the output angle of the luminous flux from the VIPA 240 to the wavelength of the luminous flux.

As shown in FIG. 17, the change of the wavelength to an output angle is not linear.

Since the relationship between the wavelength and the output angle of the luminous flux generated by the VIPA is not linear, the wavelength dispersion is not constant in a wavelength band as far as a flat mirror, a normal convex mirror, or a normal concave mirror is used as the mirror 254 The nonlinearity in the wavelength dispersion is defined as higher order dispersion.

Normally, in the device shown in FIGS. 16A and 16B, the nonlinearity in the wavelength dispersion can be understood by the following equation (3).

$$(\text{angular dispersion}) \cdot (1 - f \cdot (1/R)) \propto \text{wavelength dispersion}$$

where f indicates the focal distance of the focal lens 252, and R indicates the radius of the curvature of the mirror 254.

Figure 18:
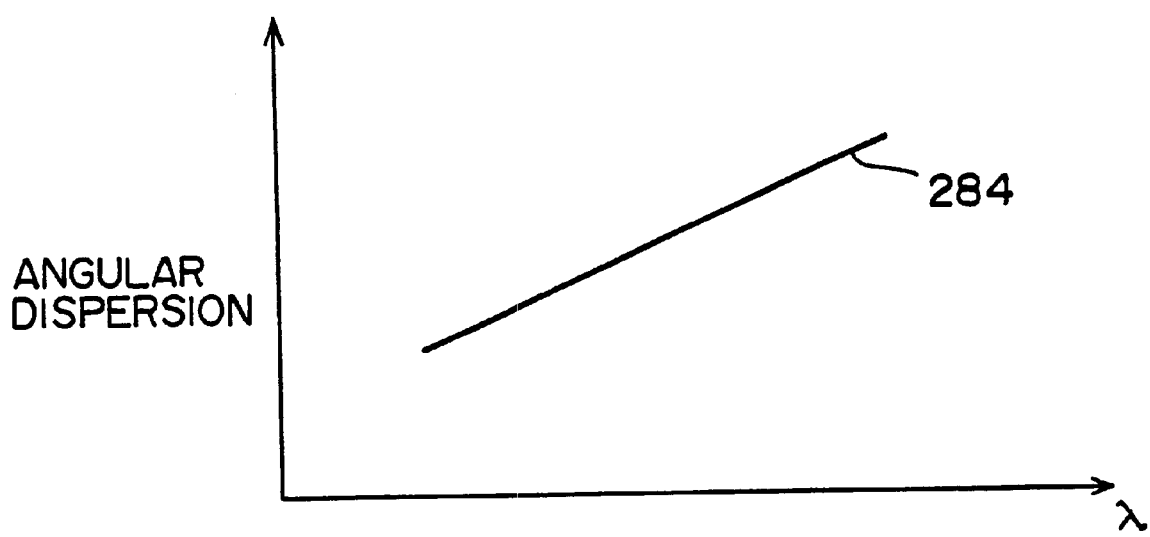
FIG. 18 shows angular dispersion of the VIPA for the wavelength of luminous flux according to an embodiment of the present invention.

FIG. 18 is a graph showing the angular dispersion of the VIPA 240 for the wavelength of luminous flux.

Normally, a curve 284 shown in FIG. 18 indicates the slope of a curve 282 shown in FIG. 17. As shown in FIG. 18, the angular dispersion is not constant. Instead, the angular dispersion changes with a wavelength.

Figure 19:
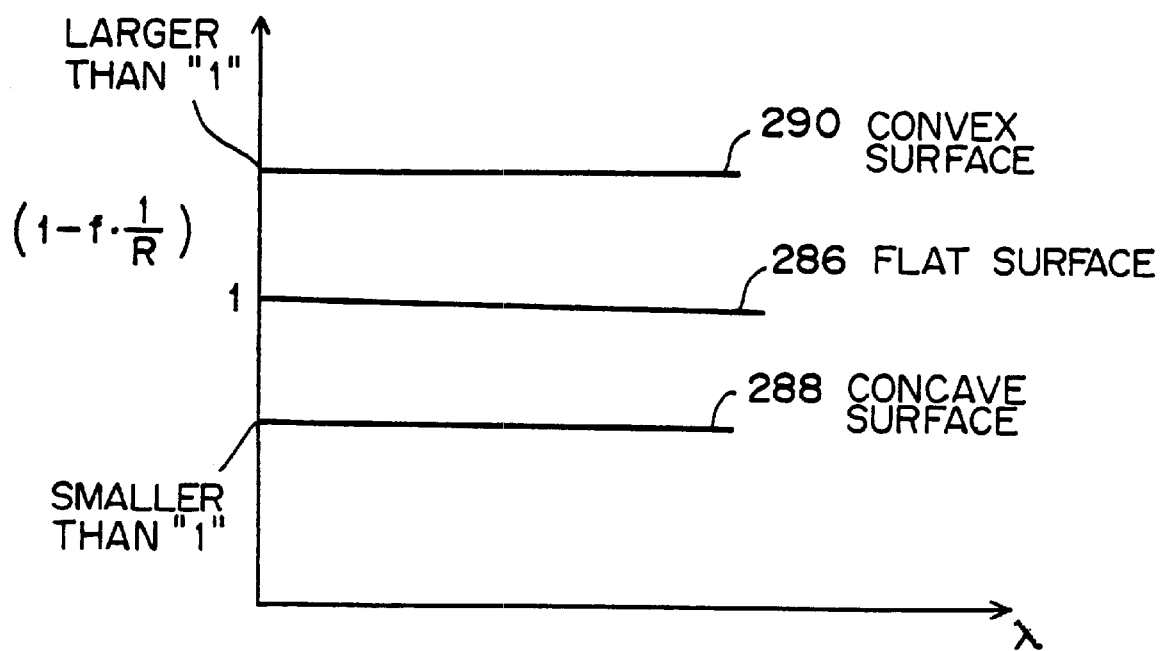
FIG. 19 shows the effects of different mirror types of the apparatus which uses the VIPA according to an embodiment of the present invention.

FIG. 19 is a graph showing a part of $(1-f\cdot(1/R))$ of the equation (3) against a wavelength.

Further in detail, a straight line 286 is a graph of $(1-f\cdot(1/R))$ for the wavelength when a flat mirror is used (the radius of the curvature is $\infty$ (infinite)). A straight line 288 is a graph of $(1-f\cdot(1/R))$ for the wavelength when a concave mirror is used (the radius of the curvature is '+') A straight line 290 is a graph of $(1-f\cdot(1/R))$ for the wavelength when a convex mirror is used (the radius of the curvature is '−'). As shown in FIG. 19, each mirror has a constant curvature radius.

Figure 20:
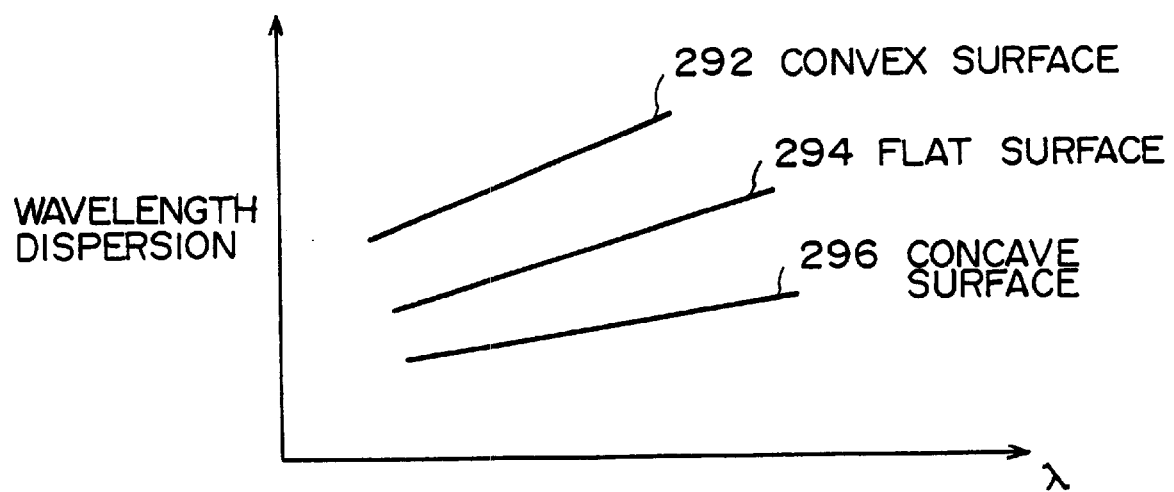
FIG. 20 shows the chromatic dispersion for a wavelength of the apparatus which uses the VIPA for each of different mirror types according to an embodiment of the present invention.

FIG. 20 is a graph of the wavelength dispersion of the wavelength of the device as shown in FIGS. 16A and 16B.

In these figures, the mirror 254 is a common spherical convex mirror, a flat mirror, and a spherical concave mirror. Further in detail, a curve 292 indicates the wavelength dispersion for the wavelength when the mirror 254 is a convex mirror. A curve 294 indicates the wavelength dispersion for the wavelength when the mirror 254 is a flat mirror. A curve 296 indicates the wavelength dispersion for the wavelength when the mirror 254 is a concave mirror.

Normally, as indicated by the above mentioned equation (3), the curves 292, 294, and 296 show the products of the angular dispersion shown in FIG. 28 and the straight lines shown in FIG. 19. The curve 294 shows the product of the curve 284 shown in FIG. 18 and the straight line 286 shown in FIG. 19. The curve 296 shows the product of the curve 284 shown in FIG. 18 and the straight line 288 shown in FIG. 19.

As shown in FIG. 20, the wavelength dispersion is not constant although a common spherical convex mirror, flat mirror, or spherical concave mirror is used as the mirror 256.

The above mentioned wavelength-dependency of the wavelength can be reduced or removed by chirping the curvature of the mirror 254.

Figure 21:
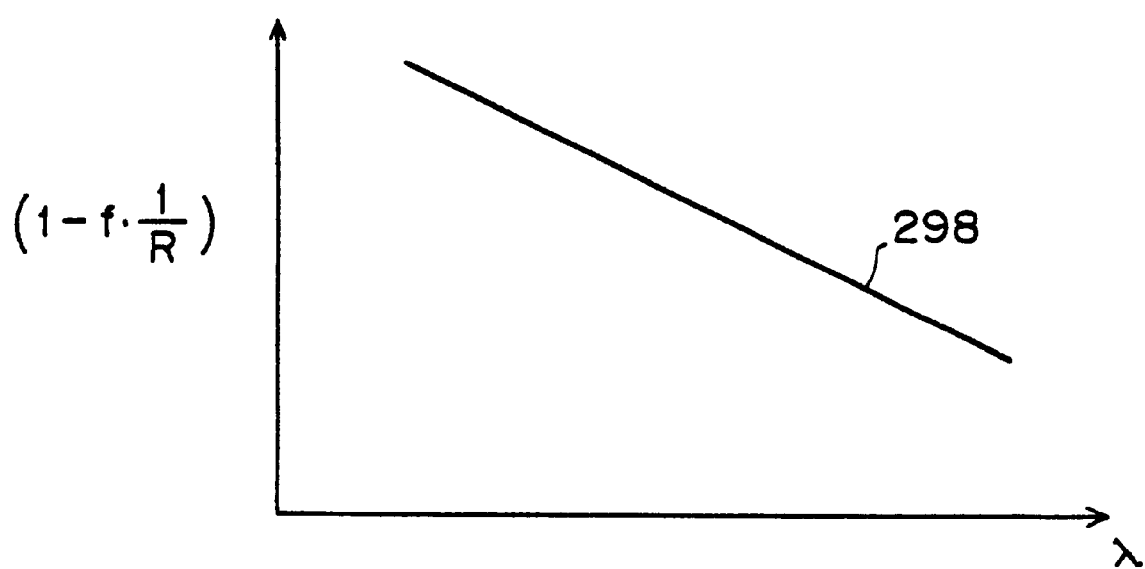
FIG. 21 shows the effect of the mirror of the apparatus which uses the VIPA 1 according to an embodiment of the present invention.

FIG. 21 is a graph of a curve 298 of the equation 3, that is, $(1-f\cdot(1/R))$, for the wavelength.

Figure 22:
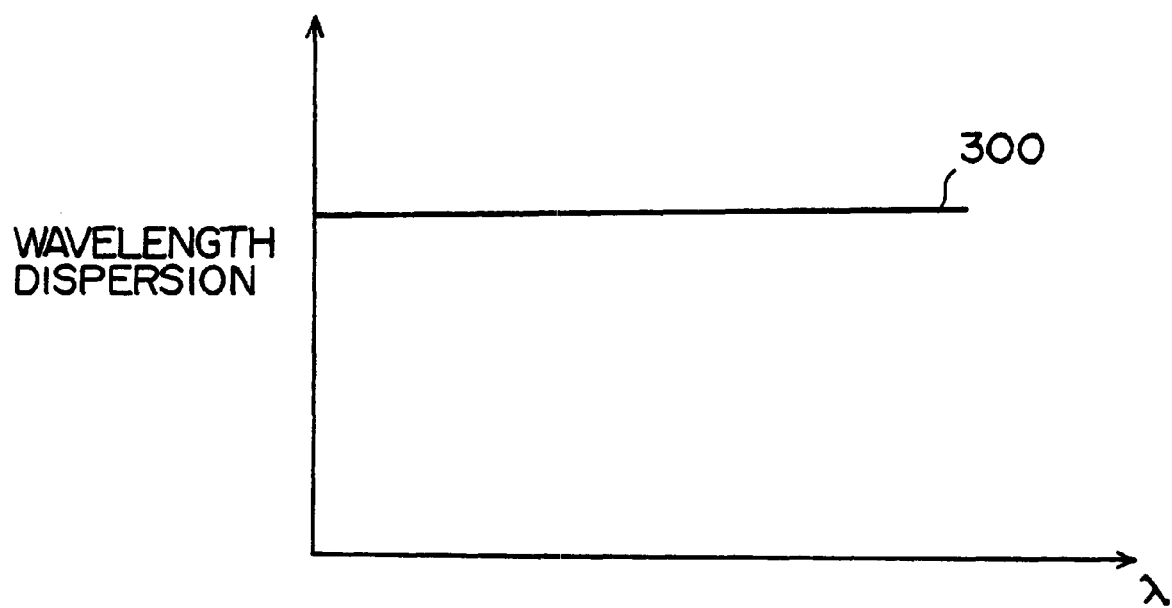
FIG. 22 shows constant chromatic dispersion of the apparatus which uses the VIPA 1 according to an embodiment of the present invention.

Normally, the curve 298 shown in FIG. 21 is obtained by inverting the curve 284 shown in FIG. 18. Therefore, as indicated by a curve 300 shown in FIG. 22, a mirror having the characteristics shown in FIG. 21 generates constant wavelength dispersion.

Figure 23:
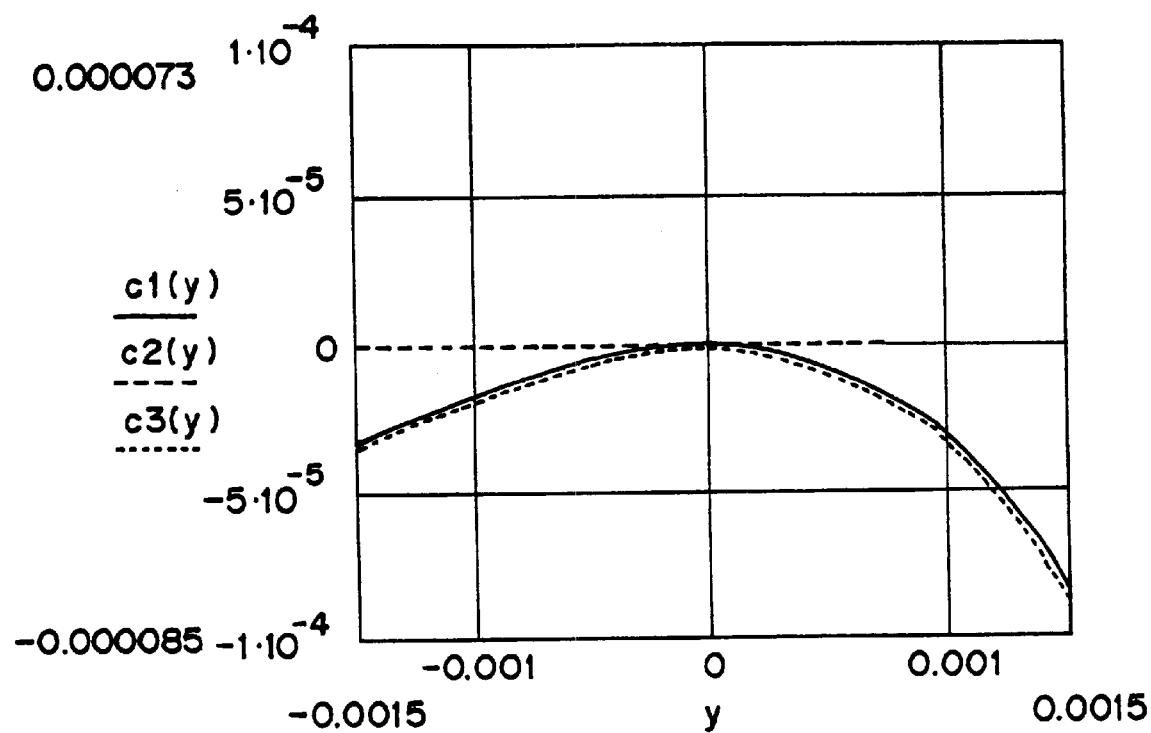
FIG. 23 is a sectional view of a mirror for the apparatus which uses the VIPA 1 according to an embodiment of the present invention.

For example, FIG. 23 shows an example of the shape (section) of a dispersion mirror satisfying the equation 3 and having a wavelength dispersion value of −2500 ps/nm.

As shown in FIG. 23, the shape of the mirror is non-spherical. The VIPA 1 and the mirror are spatially arranged such that the angular dispersion can be parallel to the section. To set the value of the wavelength dispersion to a specific value (for example, −2500 ps/nm), the shape of the mirror can have the same shape in the direction vertical to the section (that is, a cylindrical shape). However, since rays have a focal point defined by a lens in the direction vertical to the section regardless of the wavelength, it is not necessary to set a long distance in the direction vertical to the section.

Figure 24:
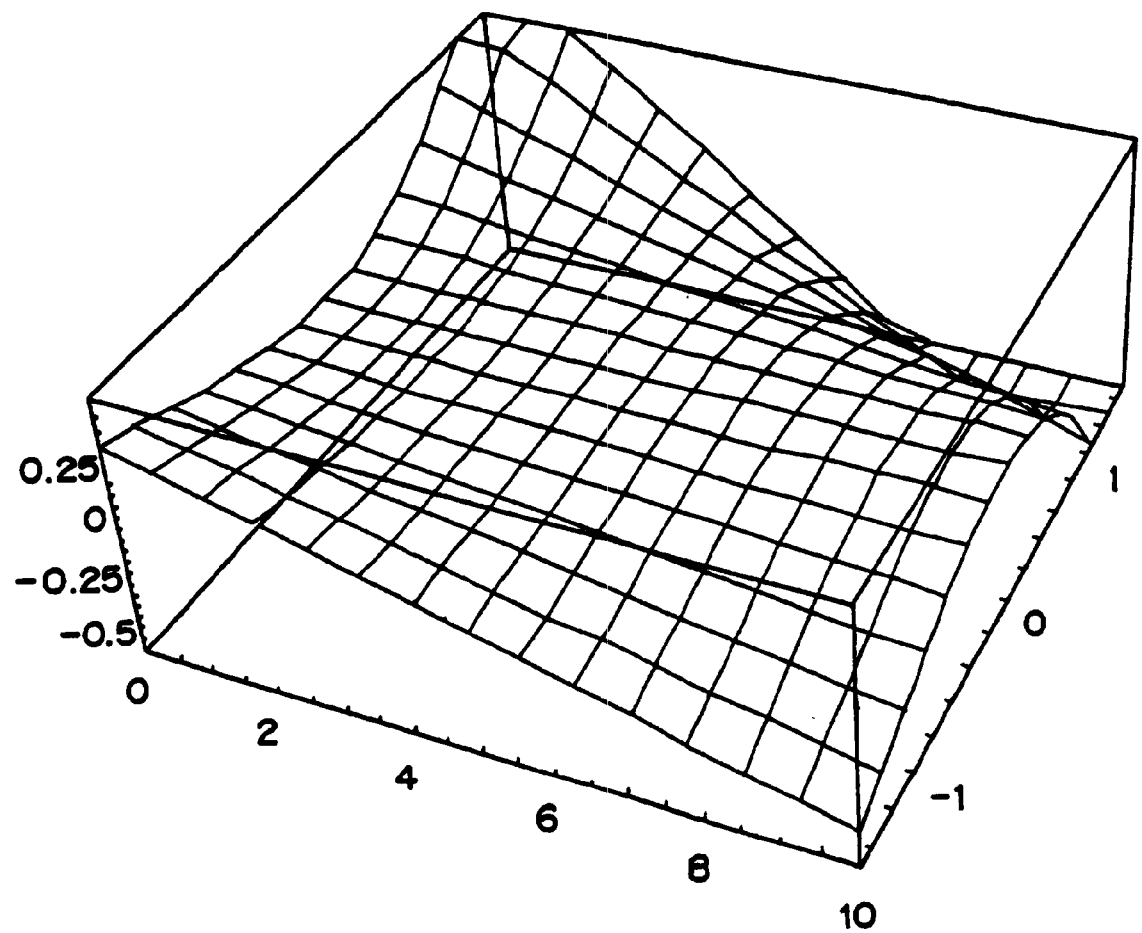
FIG. 24 shows the three-dimensional form of a mirror of the apparatus which uses the VIPA 1 according to an embodiment of the present invention.
Figure 25:
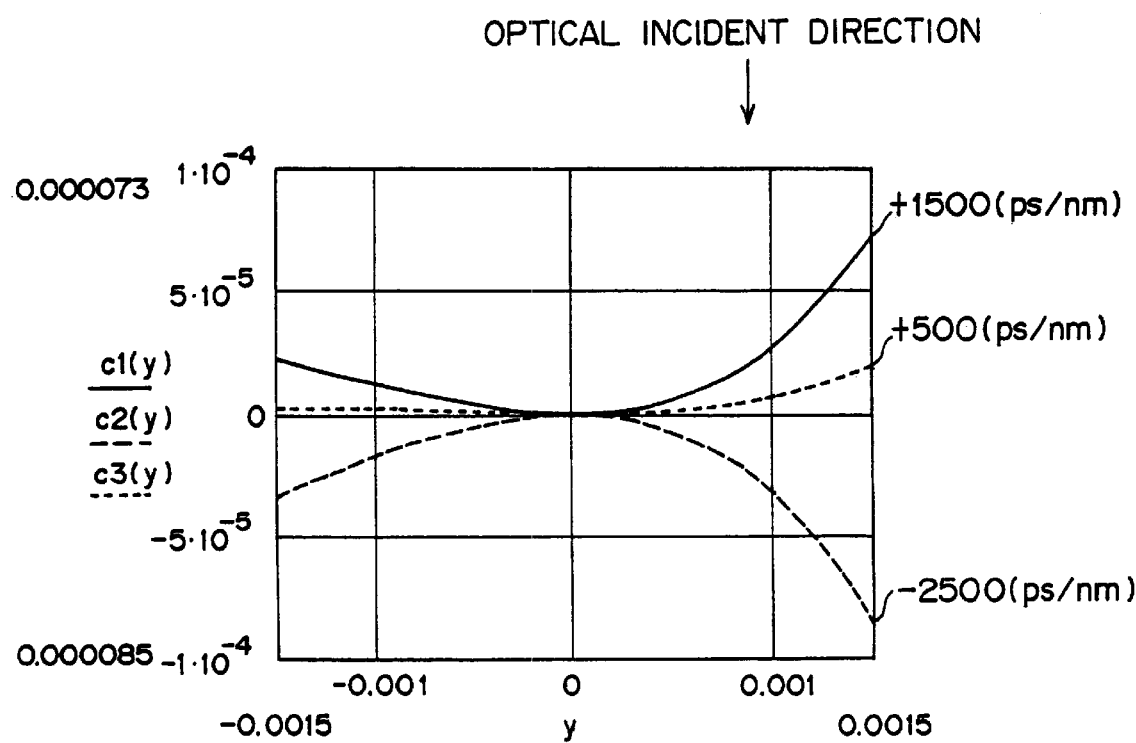
FIG. 25 is a sectional view of the mirror of the apparatus which uses the VIPA 1 according to an embodiment of the present invention.

Furthermore, according to an embodiment of the present invention, to obtain different levels of wavelength dispersion, the shape of the non-spherical mirror is set as a three-dimensional non-spherical mirror which gradually changes it shape in the direction vertical to the section, that is, in the direction vertical to the angular dispersion direction of the VIPA. Practically, it is the shape as shown in FIG. 24, and the section has the shape as shown in FIG. 25 in the position of the dispersion value of −500 ps/nm and +1500 ps/nm. As shown in FIG. 25, with the dispersion value changing from negative to positive, the shape changes from the non-spherical convex surface to the non-spherical concave surface. When the dispersion value is 0, the section is substantially flat. Thus, the wavelength dispersion depends on the position of the rays on the three-dimensional non-spherical mirror after the rays are output with the angular dispersion from the VIPA.

It is not difficult to generate the above mentioned three-dimensional non-spherical mirror in the current processing technology. The process is to be performed on metal such as Al, brass, etc. with a precision three-dimensional processor having a diamond bite and a precision movable stage. Since a mirror ground by the above mentioned processor is normally expensive, it is recommended that a metal mold having an inverted shape of a necessary shape is processed, an appropriate transferring and forming process is performed on plastic, glass having a low melting point, solgel glass, etc. using the metal mold, and a mirror is finally formed by applying metal such as Au, Al, etc., or a dielectric multilayer film. In addition, such a three-dimensional shape can be obtained using ion beam etching and resists having different thicknesses.

Furthermore, to actually vary the wavelength dispersion, it is necessary to provide a unit for moving the above mentioned three-dimensional non-spherical mirror in the direction vertical to the section, that is, in the direction vertical to the angular dispersion direction of the VIPA. That is, an embodiment of the present invention includes a unit for moving the above mentioned three-dimensional non-spherical mirror in the direction vertical to the angular dispersion direction of the VIPA. The moving unit can be configured mainly by, for example, a linear slider, a motor, etc. However, the components are not limited to them. That is, the linear slider can be replaced with a tremor stand, etc., and the motor can be replaced with an actuator, etc.

According to the above mentioned embodiment of the present invention, it is possible to compensate for wavelength dispersion in a practical level using a VIPA having large angular dispersion, to simultaneously compensate for dispersion at all channels of wavelength division-multiplexed rays by setting the thickness of the VIPA as the thickness of the FSR of the WDM matching, to reduce the wavelength dependency of the wavelength dispersion, that is, to have substantially constant wavelength dispersion, by having the shape of a mirror as the optimum non-spherical surface, to vary the wavelength dispersion by having the mirror as the three-dimensional non-spherical mirror and moving the three-dimensional non-spherical mirror, etc. However, a wavelength dispersion slope cannot be varied independent of the wavelength dispersion.

In the following embodiment according to the present invention, the wavelength dispersion and a wavelength dispersion slope can be varied independent of each other.

Figure 26:
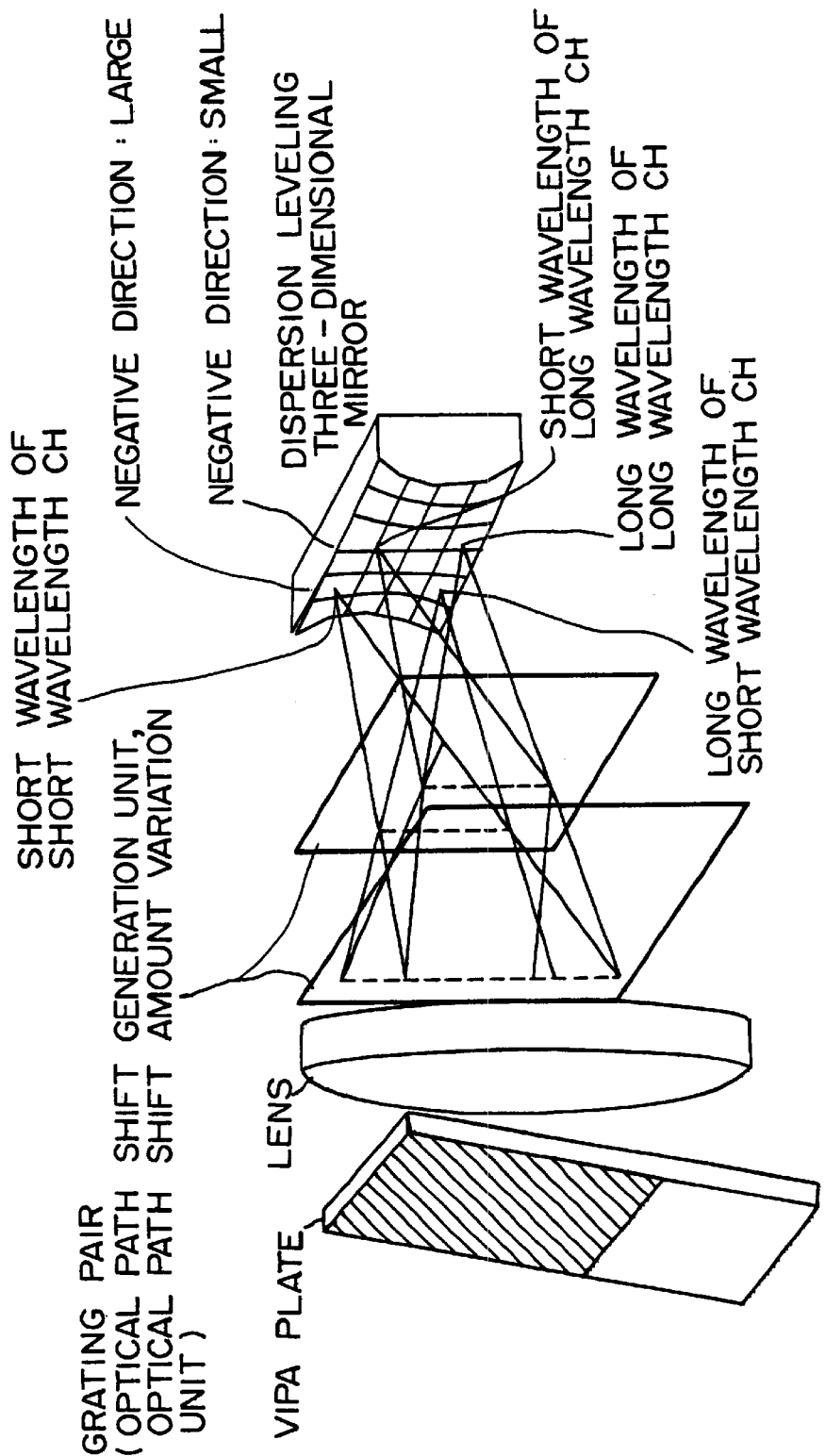
FIG. 26 shows the configuration showing the principle for independently varying the wavelength dispersion and the wavelength dispersion slope.

FIG. 26 shows the configuration in which the wavelength dispersion and a wavelength dispersion slope can be varied independent of each other.

In the principle of the present embodiment shown in FIG. 26, in addition to a VIPA, a lens, and a three-dimensional mirror, a unit for generating a parallel shift of an optical path by each wavelength, and a unit for varying the amount of the shift of the optical path are provided. According to the present principle, an optical path is shifted in parallel by a wavelength in the direction vertical to the angular dispersion direction of the VIPA, that is, in the moving direction of the mirror. Therefore, the wavelength dispersion can be varied by a wavelength, that is, a wavelength dispersion slope can be generated. Furthermore, in the above mentioned three-dimensional non-spherical mirror, a change in given wavelength dispersion is limited. Therefore, it is only necessary to invert the direction of the shift of an optical path by a wavelength to change the positive or negative state of a wavelength dispersion slope.

Described below are some examples of a practical unit for shifting an optical path in parallel by each wavelength in the direction vertical to the angular dispersion direction of the VIPA, and a practical unit for varying the amount of the shift of the optical path.

FIGS. 27 and 28 show the embodiments based on the above mentioned principle of the present invention.

As shown in FIG. 27A, as viewed from the side, the output rays from the VIPA 307 are emitted in different directions depending on the wavelengths, collected on a lens 308, and received by a three-dimensional mirror 309 through parallel plates 310. Then, the rays are received on the different points of the three-dimensional mirror 309 depending on the wavelength. Therefore, different wavelength dispersion takes place depending on the wavelength, thereby performing dispersion compensation. FIG. 27B is a view from the angular dispersion direction. In this view, the rays having different wavelengths are dispersed in the direction vertical to the drawings.

According to the present embodiment, the parallel plates 310 is inserted between the lens 308 and the three-dimensional mirror 309. The parallel plates are made of transparent materials having relatively large refractive index wavelength dispersion in an available wavelength band. Practically, it is, for example, polycrystal Si. Otherwise, it can be Ge, GaAs, etc. On both sides of the parallel plates, anti-reflection films of multilayer dielectric films are applied.

If the parallel plates 310 are set at an angle 313 with the output ray from the pseudo middle processing unit 8 in the direction vertical to an angular dispersion direction 312 of the VIPA 307 as shown in FIG. 28A, then the angle of the refraction of the rays depends on the refractive index of each wavelength based on the Snell's law. As a result, an optical path shift 314 is caused in parallel depending on each wavelength in the direction vertical to the angular dispersion direction 312 of the VIPA 307. With the optical path shift, the point at which a ray is received on the three-dimensional mirror 309 depending on each wavelength can be controlled independent of the angular dispersion of the VIPA 307. Therefore, the ray having each wavelength angular-dispersed by the VIPA 307 is led to the three-dimensional mirror 309, and the reflected ray is introduced to the VIPA 307 again. Accordingly, in addition to the functions of the above mentioned embodiment in which a predetermined amount of dispersion can be caused to the entire wavelength by leading a ray of each wavelength angular-dispersed by the VIPA 307 to the three-dimensional mirror 309 and inputting a reflected light to the VIPA 307 again, the amount of dispersion to each wavelength can be independently controlled by shifting the ray in the direction vertical to the angular dispersion direction of the VIPA 307, and leading the ray to the three-dimensional mirror 309. Thus, the wavelength dispersion slope can be controlled independent of the amount of wavelength dispersion.

$$n1 \times \sin \theta1 = n2 \times \sin \theta2 \qquad (4)$$

where n1 indicates the refractive index of an input medium, θ1 indicates an incident angle, n2 indicates the refractive index of the output medium, and θ2 indicates an output angle.

Furthermore, by changing the angle 313, the amount of the optical path shift 314 can be varied. By changing the angle 313, the amount of the optical path shift 314 is varied, and the wavelength dispersion slope can be changed. However, the optical path is simultaneously and entirely changed, and the wavelength dispersion is also changed. Therefore, it is necessary to move the three-dimensional mirror 309 such that the appropriate wavelength dispersion can take place. To obtain the appropriate wavelength dispersion and wavelength dispersion slope as described above, the angle and the position of the mirror have to be simultaneously changed. The angle can be changed by, for example, the rotation of a motor, etc. The changing method is not limited to this.

As shown in FIG. 28B, the direction of the optical path shift by a wavelength depends on whether the angle is changed in the direction A or B, thereby inverting the positive and negative state of the wavelength dispersion slope. Furthermore, the number of the parallel plates is not limited to one value. That is, there are plural sets of parallel plates. In addition, when Si, etc. used in the present embodiment has the temperature characteristic of the refractive index of $1.5 \times 10^{-4}$ (/° C.), which is a large value, it may cause a change in the optical path shift depending on the temperature. However, the problem can be solved by further comprising a control device for controlling the temperature of the parallel plates. The control device for controlling the temperature comprises at least a temperature sensor such as a platinum resistance, a thermistor, etc., and a heating/cooling device such as a heater and a Peltier device, and controls the heating/cooling device such that the value of the temperature obtained from the temperature sensor can be maintained at a constant level.

For example, when the wavelengths are 1,528 nm and 1,563 nm, the refractive indices of Si are respectively 3.47958 and 3.47666, and the difference between the refractive indices is as small as 0.003. Therefore, for example, when the thickness of an Si plate is 50 mm with an angle of 40°, the amount of the optical path shift is up to 8 μm. Therefore, although the above mentioned three-dimensional non-spherical mirror largely changes by 2,000 ps/nm per mm, only the amount of change of the wavelength dispersion up to 12 ps/nm can be made.

Described below is another embodiment of the present invention to solve the problem with the above mentioned embodiment.

Figure 29:
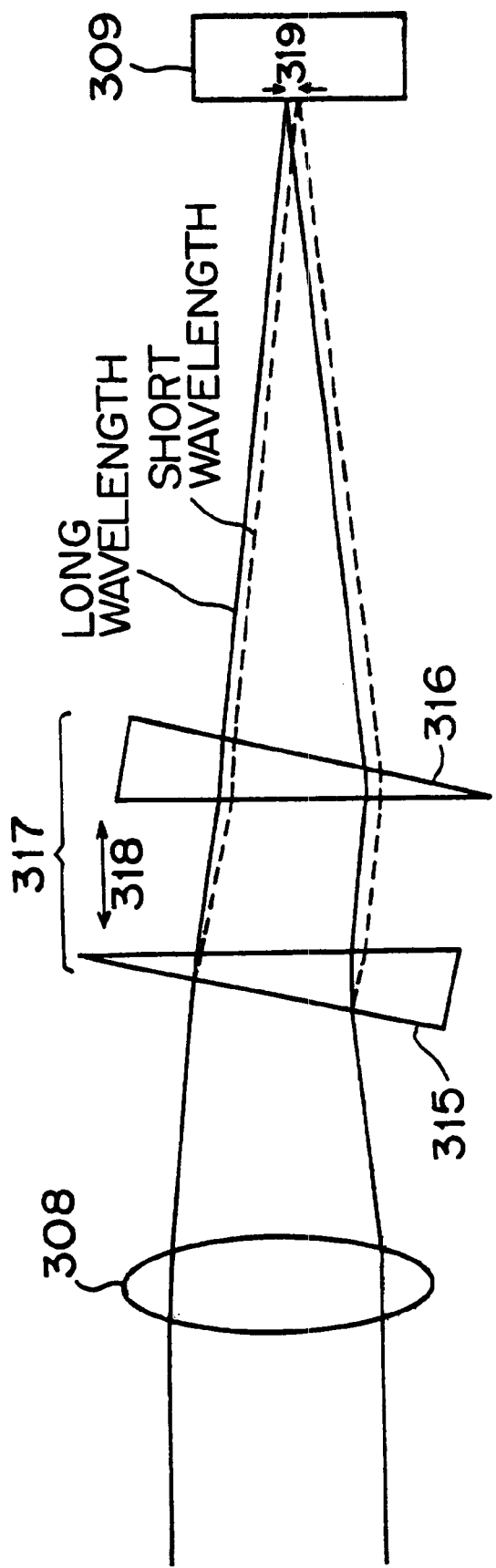
FIG. 29 is a top view of a part of the apparatus for independently varying the wavelength dispersion and the wavelength dispersion slope according to an embodiment of the present invention.

FIG. 29 shows an embodiment of the present invention.

According to the present embodiment, at least one prism pair 317 configured by arranging two prisms 315 and 316 made of a transparent material having a large refractive index wavelength dispersion in parallel to each other and symmetrically about a point is inserted between the lens 308 and the three-dimensional mirror 309. The prisms 315 and 316 are made of a transparent material having a relatively large refractive index wavelength dispersion in an available wavelength band. Practically, they are made of polycrystal Si. Otherwise, they can be Ge, GaAs, etc. On both sides of the prisms 315 and 316, anti-reflection films of dielectric multilayer films are applied. The rays refracted by the first prism 315 is refracted by the same amount in the opposite direction by the second prism 316 which is arranged in parallel and in the point-symmetrical position with the first prism 315. As a result, the rays travel in the same direction after passing through the prism pair 317. If the rays travel in the direction vertical to the angular dispersion direction of the VIPA, the rays reflected by the three-dimensional mirror 309 are returned through the similar optical path, thereby causing no losses.

As clearly shown by the equation (4), the angle of the ray refracted by the prisms 315 and 316 depends on the prism angles and the refractive indices of the prisms 315 and 316. According to the present embodiment, each wavelength has its own refractive index. Therefore, the refractive angle of a ray having each wavelength depends on the first prism 315, and the ray is refracted by the same degree in the opposite direction. As a result, an optical path shift 319 is generated in parallel by each wavelength in the direction vertical to the angular dispersion direction of the VIPA.

Figure 30:
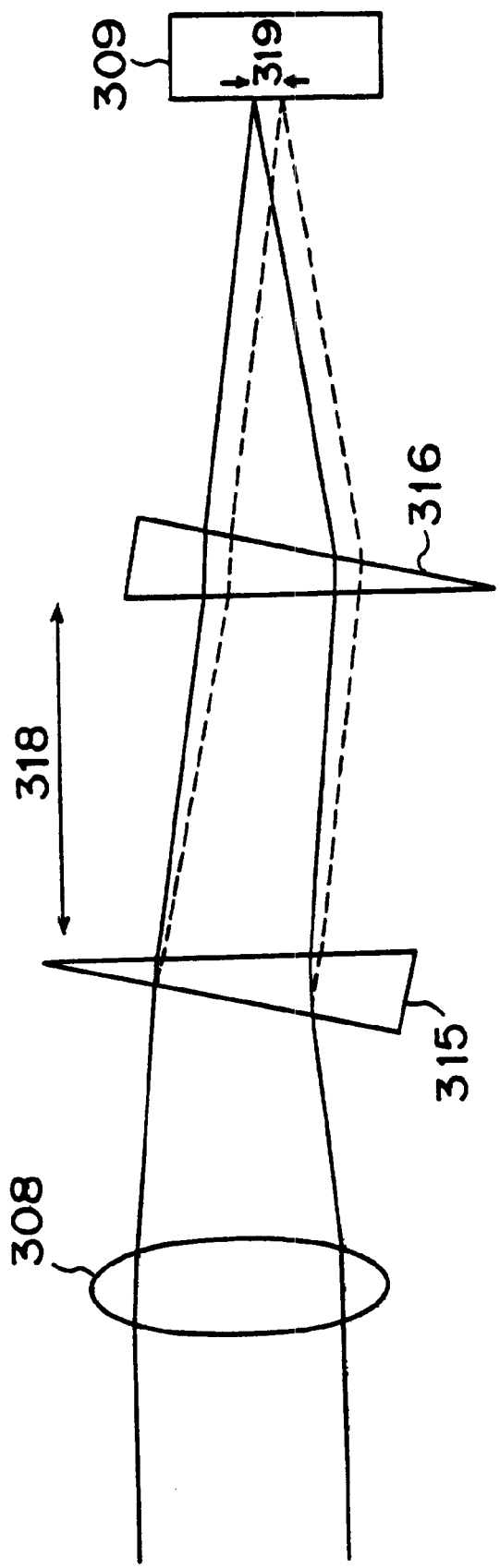
FIG. 30 is a top view of a part of the apparatus for independently varying the wavelength dispersion and the wavelength dispersion slope according to an embodiment of the present invention.
Figure 31:
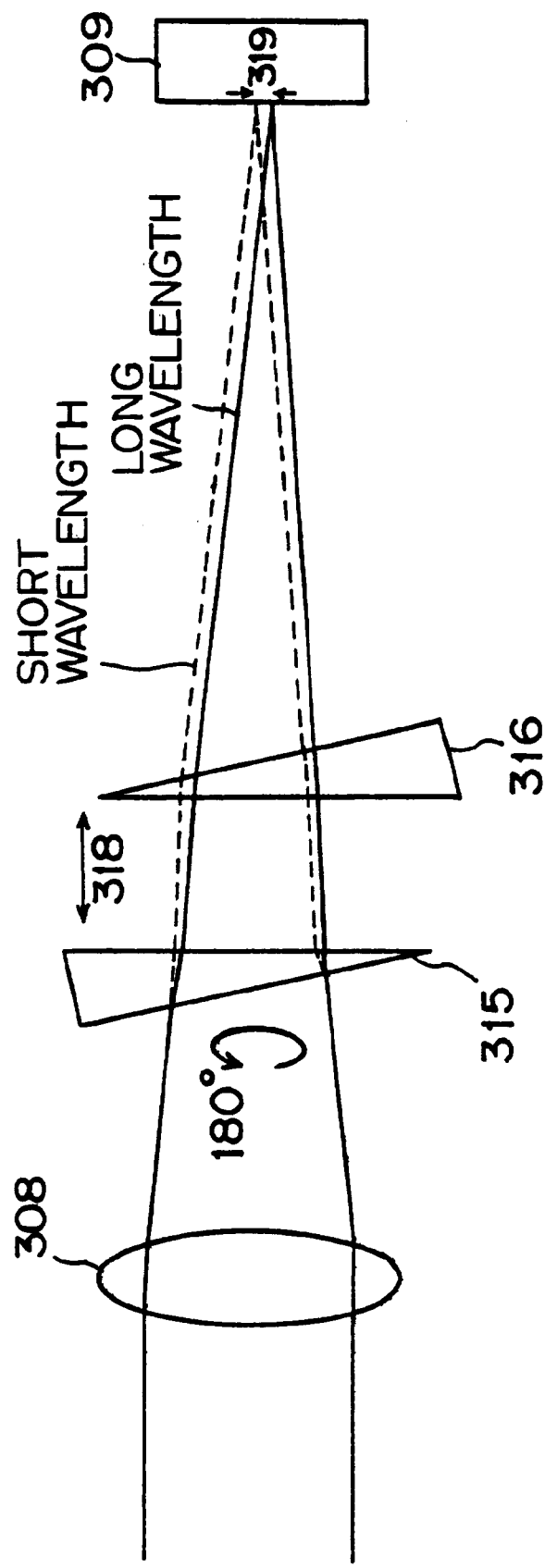
FIG. 31 is a top view of a part of the apparatus for independently varying the wavelength dispersion and the wavelength dispersion slope according to an embodiment of the present invention.

Furthermore, by moving one prism 316 while maintaining the parallelism and changing the space 318 in the prism pair 317 as shown in FIG. 30, the optical path shift 319 can be varied, and the wavelength dispersion slope can be changed. However, the optical path is simultaneously and entirely changed, and the wavelength dispersion is also changed. Therefore, it is necessary to move the three-dimensional mirror 309 such that the appropriate wavelength dispersion can take place. To obtain the appropriate wavelength dispersion and wavelength dispersion slope as described above, the space 318 of the prism pair 317 and the position of the mirror have to be simultaneously changed. The space in the prism pair 317 can be changed by, for example, using various units as well as the above mentioned mirror moving unit, etc. The changing method is not limited to this. By rotating the prism pair 317 by 180° about the optical path as shown in FIG. 31, the direction in which an optical path shift is generated by a wavelength can be inverted to change the positive/negative state of the slope (wavelength dispersion slope) of the wavelength dispersion. The method of rotating the prism pair 317 is, but is not limited, to use, for example, a motor. In addition, when Si, etc. used in the present embodiment has the temperature characteristic of the refractive index of $1.5 \times 10^{-4}$ (/° C.), which is a large value, it may cause a change in the optical path shift by the change of a refractive index depending on the temperature. However, the problem can be solved by further comprising a control device for controlling the temperature of the prisms. The control device for controlling the temperature comprises at least a temperature sensor such as a platinum resistance, a thermistor, etc., and a heating/cooling device such as a heater and a Peltier device, and controls the heating/cooling device such that the value of the temperature obtained from the temperature sensor can be maintained at a constant level.

For example, when the wavelengths are 1,528 nm and 1,563 nm, the refractive indices of Si are respectively 3.47958 and 3.47666, and the difference between the refractive indices is as small as 0.003. Therefore, for example, when the prism angle is 14° and the space in the prism pair is 50 mm, the amount of the optical path shift is up to 12 μm. Therefore, although the above mentioned three-dimensional non-spherical mirror largely changes by 2,000 ps/nm per mm, only the amount of change of the wavelength dispersion up to 25 ps/nm can be made.

Described below is another embodiment of the present invention to solve the problem with the above mentioned embodiment.

Figure 32:
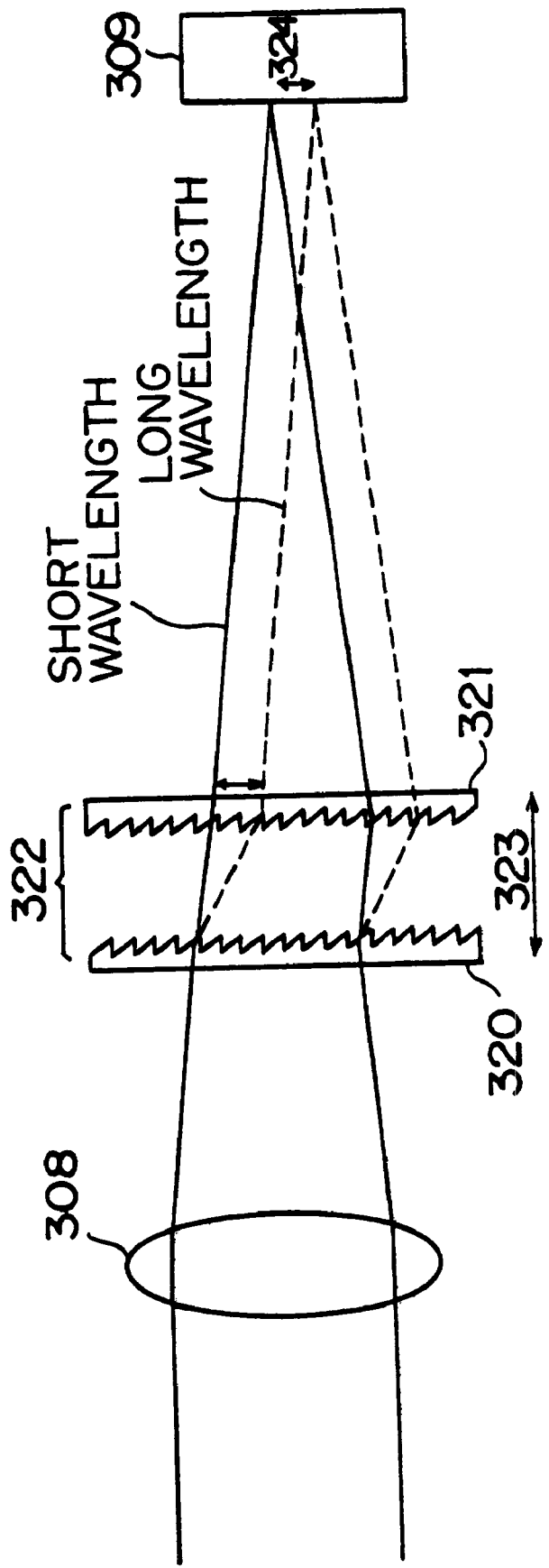
FIG. 32 is a top view of a part of the apparatus for independently varying the wavelength dispersion and the wavelength dispersion slope according to an embodiment of the present invention.

FIG. 32 shows an embodiment of the present invention.

According to the present embodiment, at least one diffraction grating pair 322 configured by arranging two diffraction gratings 320 and 321 having angular dispersion in the direction vertical to the angular dispersion direction of the VIPA in parallel and symmetrically about a point with each other is inserted between the lens 308 and the three-dimensional mirror 309. According to the present embodiment, a transmitting blazed grating having relatively large angular dispersion in an available wavelength band and having a high primary diffraction efficiency at a predetermined angle in an available wavelength band is used as the diffraction gratings 320 and 321. The blazed grating can be obtained by making a master mold by processing glass in a direct ion beam etching method or grinding glass or metal to transfer-form a resin layer on a glass substrate. On both sides of the diffraction gratings 320 and 321, anti-reflection films of dielectric multilayer films are applied.

The output ray from the lens 308 is diffracted in the direction satisfying the equation (5) by the first diffraction grating 320, thereby curving the optical path. At this time, the wavelength diffracting at an angle satisfying the Snell's law shown by the equation (6) has the highest diffraction efficiency, and the wavelength is referred to as a blaze wavelength. The diffraction gratings 320 and 321 have a blaze angle and a refractive index appropriately selected such that the available wavelength band can substantially match the blaze wavelength. Furthermore, the diffracted and curved rays are diffracted and curved again in the opposite direction by equal degrees by the second diffraction grating 321 arranged in the parallel and point symmetric position with the first diffraction grating 320. As a result, the rays travel in the same direction after passing through the diffraction grating pair 322. If the rays travel in the direction vertical to the angular dispersion direction of the VIPA, the rays reflected by the three-dimensional mirror 309 return through the similar optical path, thereby suffering no losses.

As clearly shown by the equation (5), the diffraction angle depends on the wavelength, the diffraction angle of a ray of each wavelength depends on the first diffraction grating 320, and the ray is similarly diffracted in the opposite direction by the second diffraction grating 321. As a result, an optical path shift 324 is generated in parallel according to each wavelength in the direction vertical to the angular dispersion direction of the VIPA.

$$\sin \beta = N \times m \times \lambda \quad (5)$$

$$n \times \sin \theta b = \sin(\theta b + \beta) \quad (6)$$

where β indicates a diffraction angle, N indicates the number of lines per unit length, m indicates an order, n indicates a refractive index, and θb indicates a blaze angle.

Figure 33:
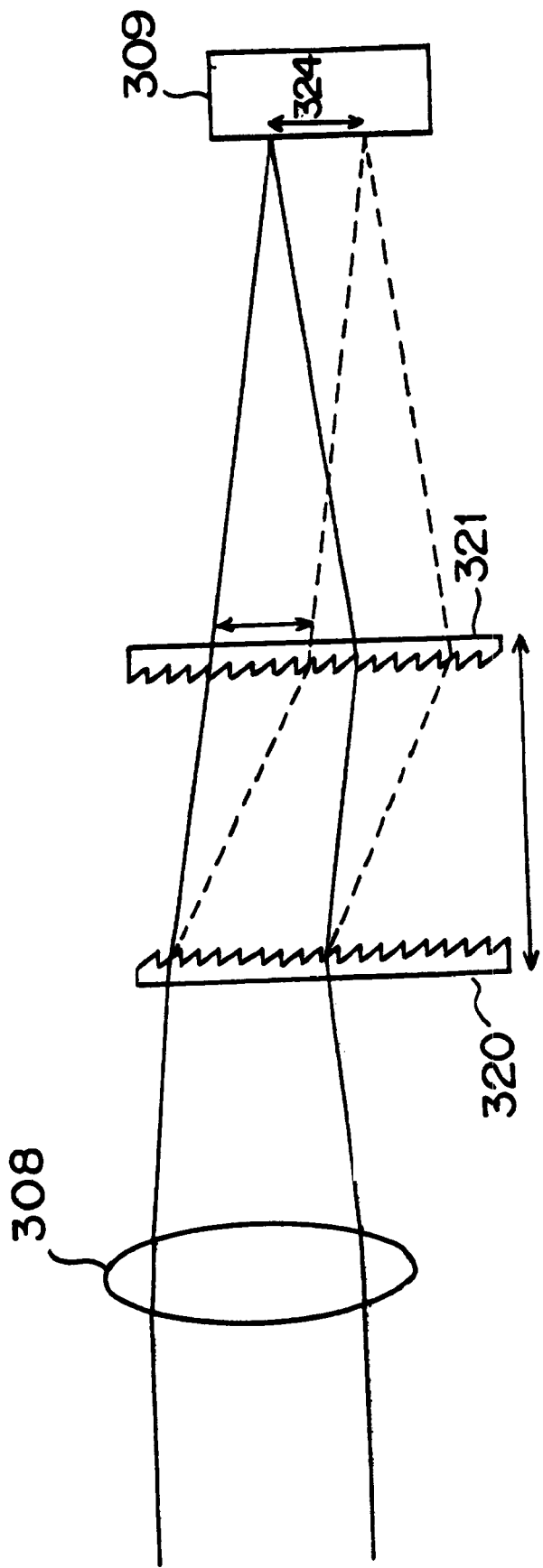
FIG. 33 is a top view of a part of the apparatus for independently varying the wavelength dispersion and the wavelength dispersion slope according to an embodiment of the present invention.
Figure 34:
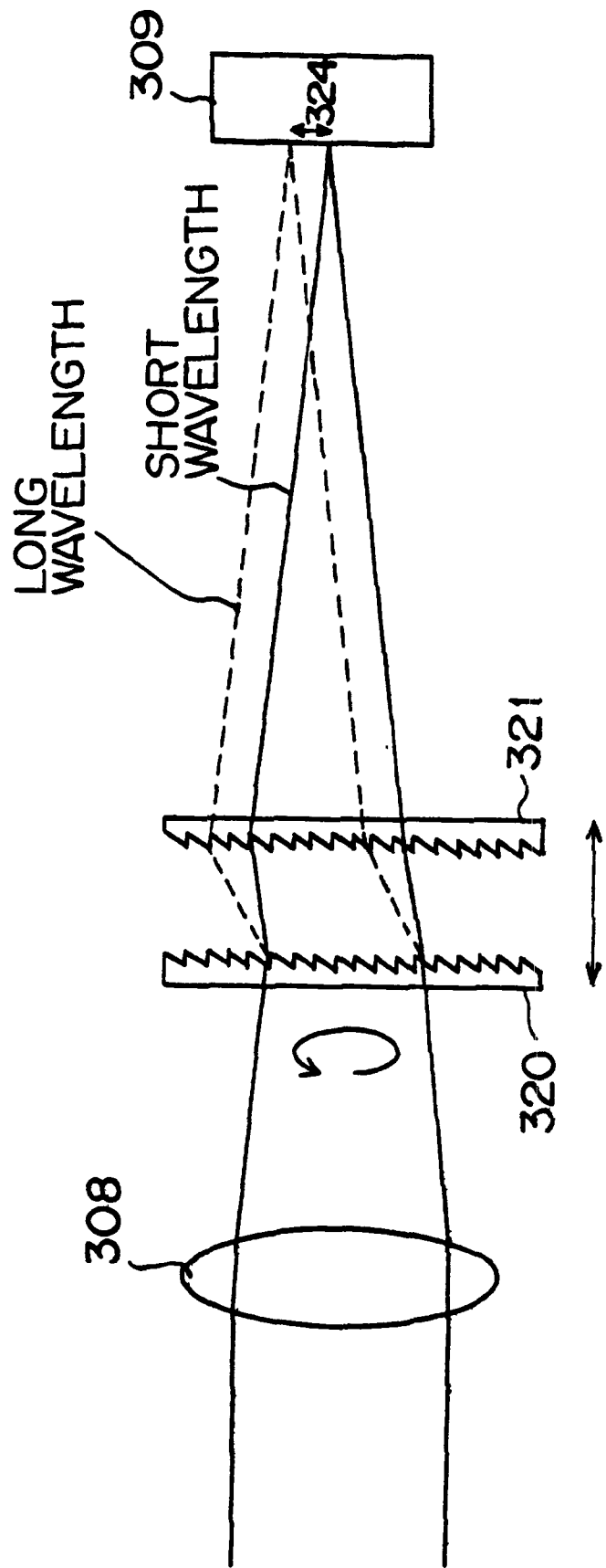
FIG. 34 is a top view of a part of the apparatus for independently varying the wavelength dispersion and the wavelength dispersion slope according to an embodiment of the present invention.

Furthermore, by moving one diffraction grating 321 while maintaining the parallelism and changing the space 323 in the diffraction grating pair 322 as shown in FIG. 33, the optical path shift 324 can be varied, and the wavelength dispersion slope can be changed. However, the optical path is simultaneously and entirely changed, and the wavelength dispersion is also changed. Therefore, it is necessary to move the three-dimensional mirror 309 such that the appropriate wavelength dispersion can take place. To obtain the appropriate wavelength dispersion and wavelength dispersion slope as described above, the space 323 of the diffraction grating pair 322 and the position of the mirror have to be simultaneously changed. The space 323 in the diffraction grating pair 322 can be changed by, for example, using various units as well as the above mentioned mirror moving unit, etc. The changing method is not limited to this. By rotating the diffraction grating pair 322 by 180° about the optical path as shown in FIG. 34, the direction in which an optical path shift is generated by a wavelength can be inverted to change the positive/negative state of the slope (wavelength dispersion slope) of the wavelength dispersion. The method of rotating the diffraction grating pair 322 is, but is not limited, to use, for example, a motor. The number of the diffraction grating pairs 322 is not limited to one value, but there can be plural pairs. In addition, the diffraction angle of a diffraction grating is normally temperature-dependent, and it may cause a change in the optical path shift by the change of a diffraction angle depending on the temperature. However, the problem can be solved by further comprising a control device for controlling the temperature of the diffraction grating. The control device for controlling the temperature comprises at least a temperature sensor such as a platinum resistance, a thermistor, etc., and a heating/cooling device such as a heater and a Peltier device, and controls the heating/cooling device such that the value of the temperature obtained from the temperature sensor can be maintained at a constant level.

According to the present embodiment, if the number of lines is 400 per mm, the refractive index of the diffraction grating is 1.54, and the blaze angle is 39.4, then the blaze wavelength is 1,546 nm, and the diffraction angle is 38.2°. For example, if the space in the diffraction grating pair is as small as 25 mm, the amount of the optical path shift is up to 720 $\mu$m when the wavelengths are 1,528 nm and 1,563 nm. Therefore, although the above mentioned three-dimensional non-spherical mirror changes by 800 ps/nm per mm, the amount of change of the wavelength dispersion up to 25 ps/nm can be made. The amount of the compensation of the dispersion slope corresponds to 290 km with the normal SMF having the wavelength dispersion slope of 0.06 ps/nm2/km, and is a sufficient compensation amount.

When an optical path shift is generated depending on the wavelength by the diffraction grating pair 322, there is wavelength dispersion generated by a small optical path difference by a wavelength. However, it can be ignored because it is smaller enough than the wavelength dispersion generated by the VIPA. If it cannot be ignored, the position of the three-dimensional mirror 309 corresponding to the wavelength dispersion is adjusted to give the appropriate wavelength dispersion.

Described below is another embodiment of a method of changing the positive/negative state of the slope of wavelength dispersion (wavelength dispersion slope).

Figure 35:
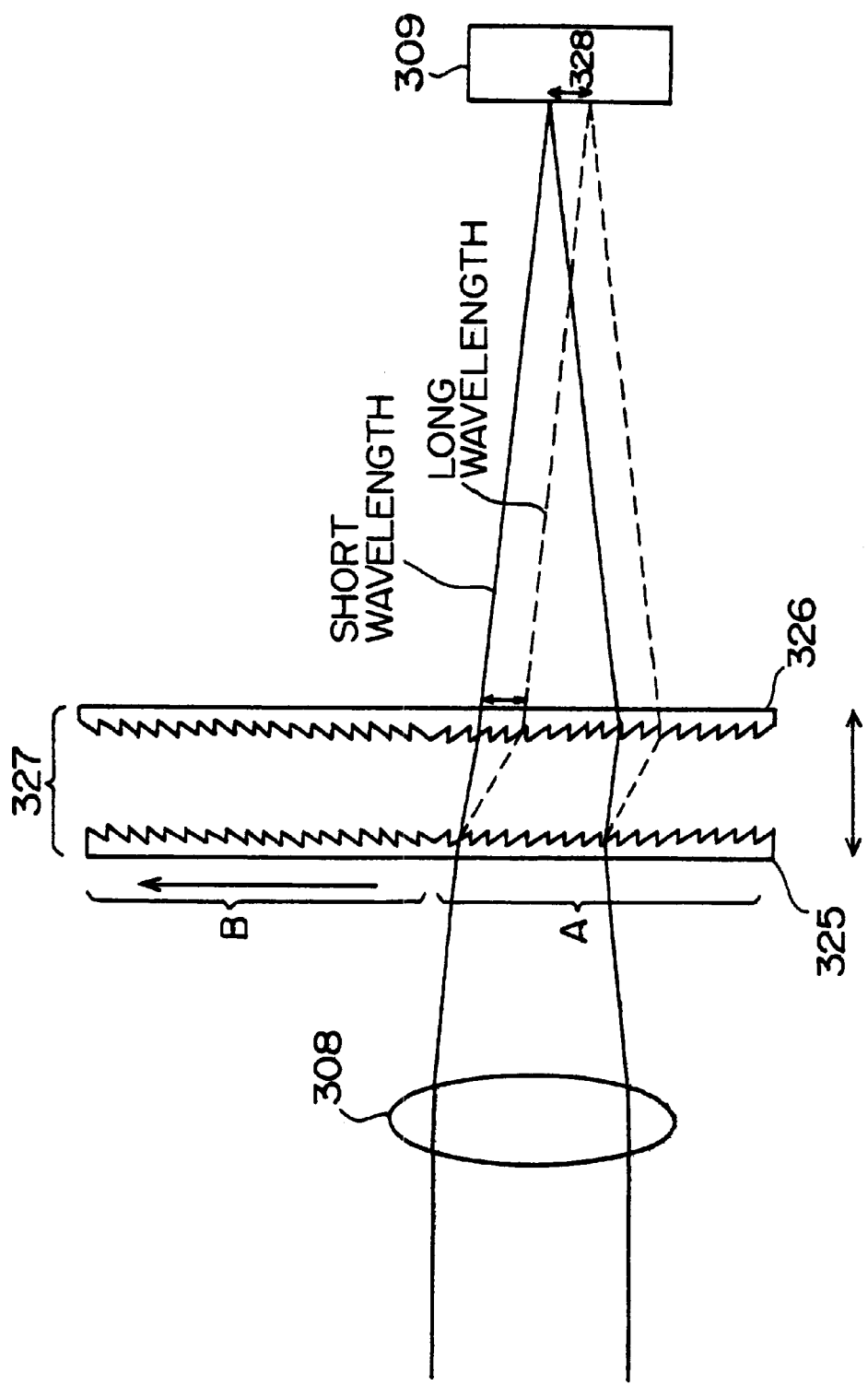
FIG. 35 is a top view of a part of the apparatus for independently varying the wavelength dispersion and the wavelength dispersion slope according to an embodiment of the present invention.

FIG. 35 shows an embodiment of the present invention.

Figure 36:
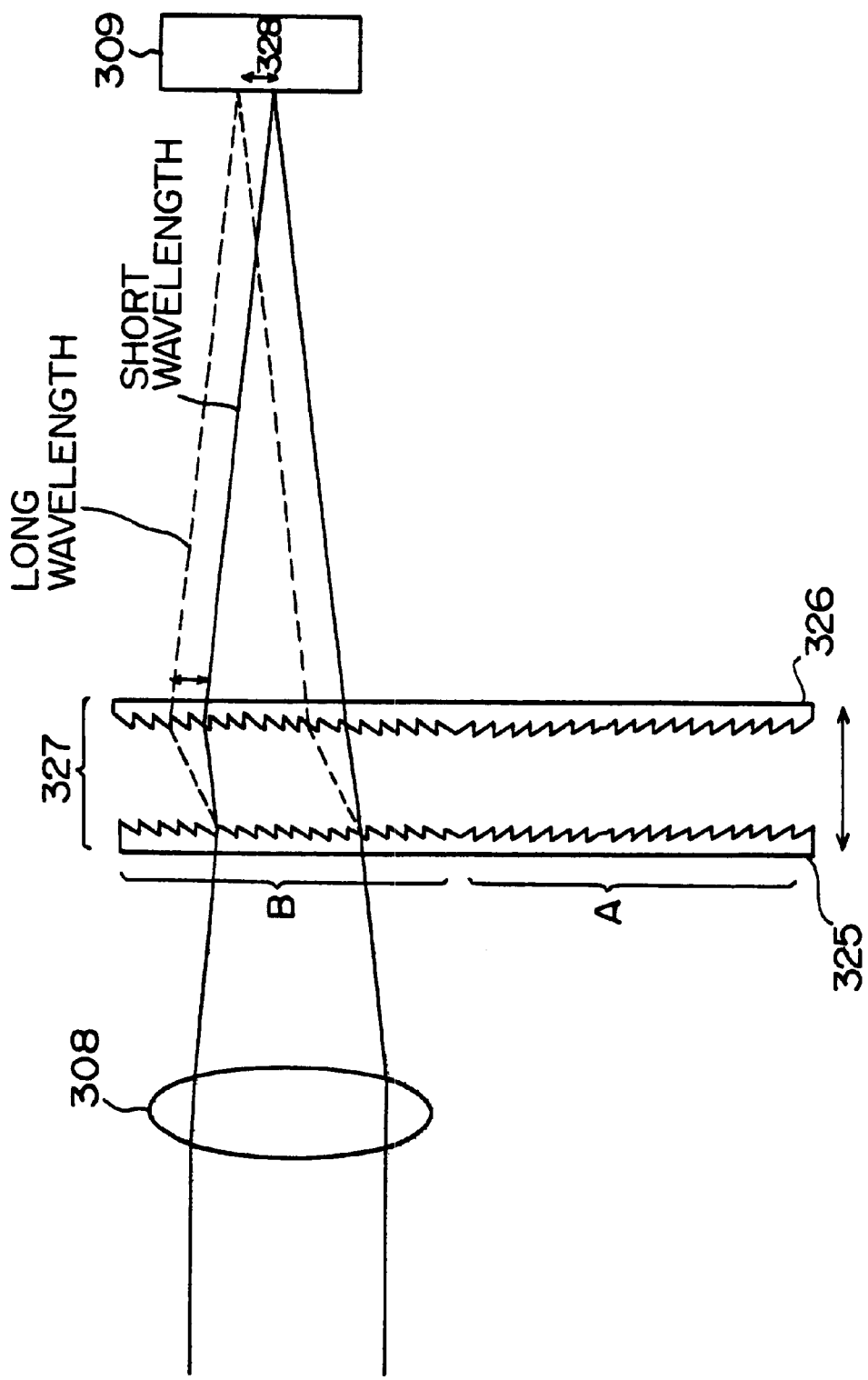
FIG. 36 is a top view of a part of the apparatus for independently varying the wavelength dispersion and the wavelength dispersion slope according to an embodiment of the present invention.

According to the present embodiment, at least one of diffraction grating pair 327 configured by two diffraction gratings 325 and 326 arranged parallel and point-symmetric to each other and having angular dispersion in the direction substantially vertical to the angular dispersion direction of the VIPA, and having at least two areas (for example, A and B) showing angular dispersion in opposite directions is used. According to the present embodiment, as in the above mentioned embodiment, a transmitting blazed grating is used. By moving the diffraction grating pair 327 as shown in FIG. 36, rays are emitted to different areas having angular dispersion in the opposite directions to generate the angular dispersion in the opposite directions and have an optical path shift 328 generated by a wavelength in the opposite direction, thereby changing the positive/negative state of the slope of wavelength dispersion (wavelength dispersion slope). The method of moving the diffraction grating pair 327 can be realized by various means as the above mentioned mirror moving unit, and is not limited to a specific method. To form different areas having angular dispersion in the opposite direction to a diffraction grating, for example, blazed gratings are formed in the opposite directions in the areas A and B.

Described below is another embodiment of a method of varying wavelength dispersion.

Figure 37:
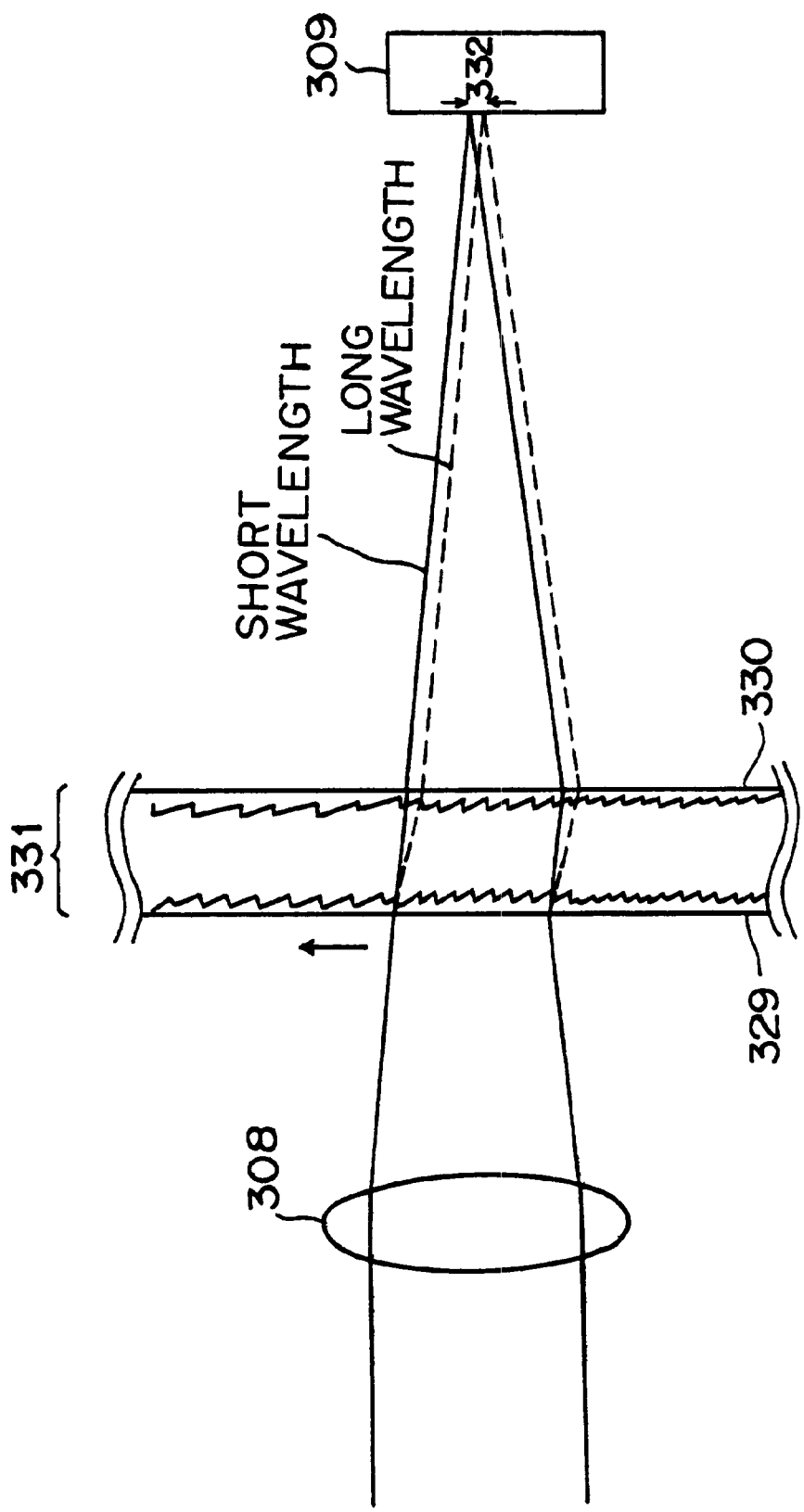
FIG. 37 is a top view of a part of the apparatus for independently varying the wavelength dispersion and the wavelength dispersion slope according to an embodiment of the present invention.
Figure 38:
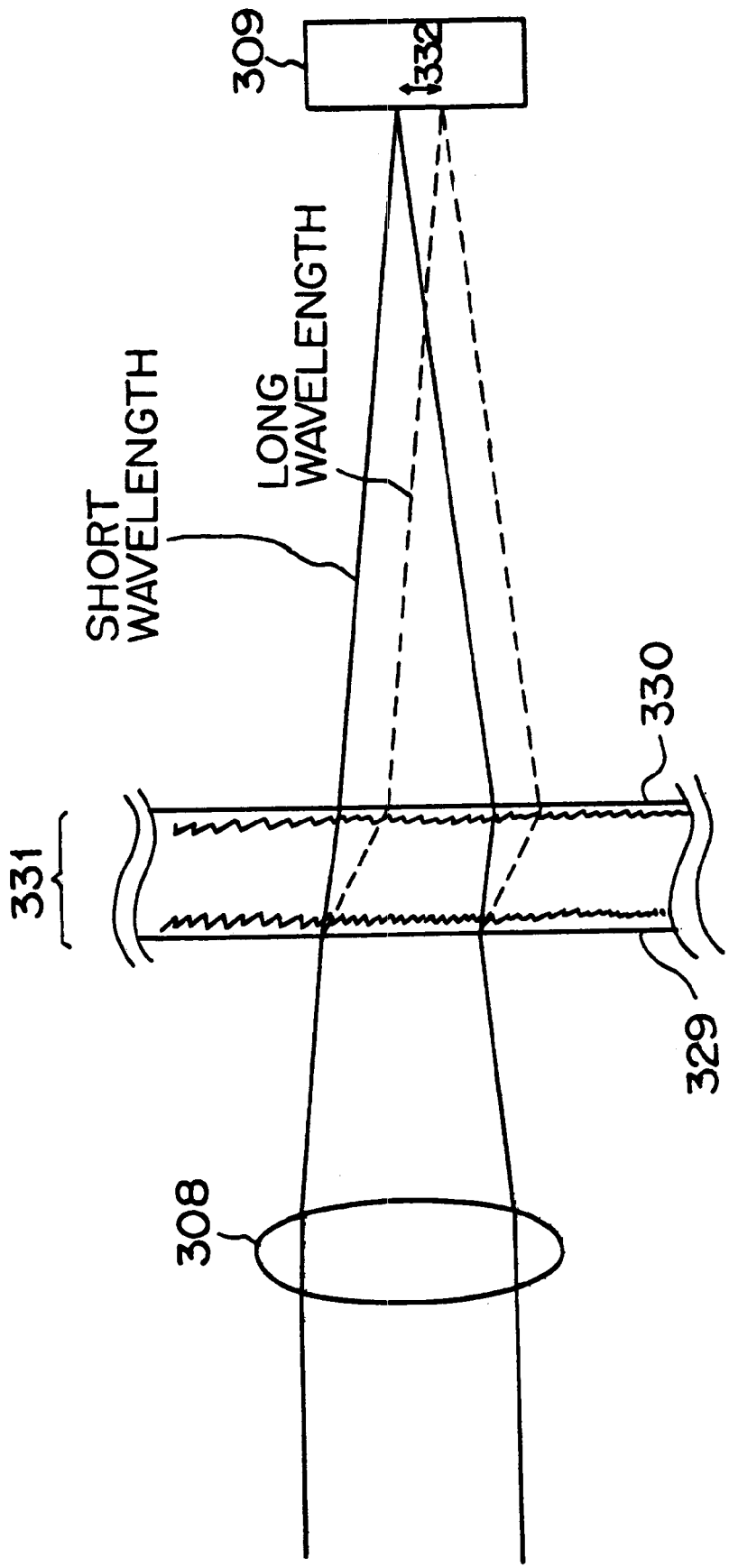
FIG. 38 is a top view of a part of the apparatus for independently varying the wavelength dispersion and the wavelength dispersion slope according to an embodiment of the present invention.

FIGS. 37 and 38 show other embodiments of the present invention.

According to the present embodiment, at least one diffraction grating pair 331 configured by two diffraction gratings 329 and 330 arranged parallel and point-symmetric to each other, having angular dispersion in the direction substantially vertical to the angular dispersion direction of the VIPA, and having a plurality of areas having different angular dispersion is used. To form a plurality of areas having different angular dispersion on a diffraction grating, for example, different blaze angles and numbers of lines are assigned to respective areas. By moving the diffraction grating pair 331, rays are emitted to areas having different angular dispersion to generate different angular dispersion, vary an amount of optical path shift 332, and vary wavelength dispersion. The method of moving the diffraction grating pair 331 can be realized by various means as by the above mentioned mirror moving unit, and is not limited to a specific method.

According to some of the above mentioned embodiments, transmitting blazed grating is used as diffraction gratings, but other diffraction gratings can be used obviously.

Figure 39:
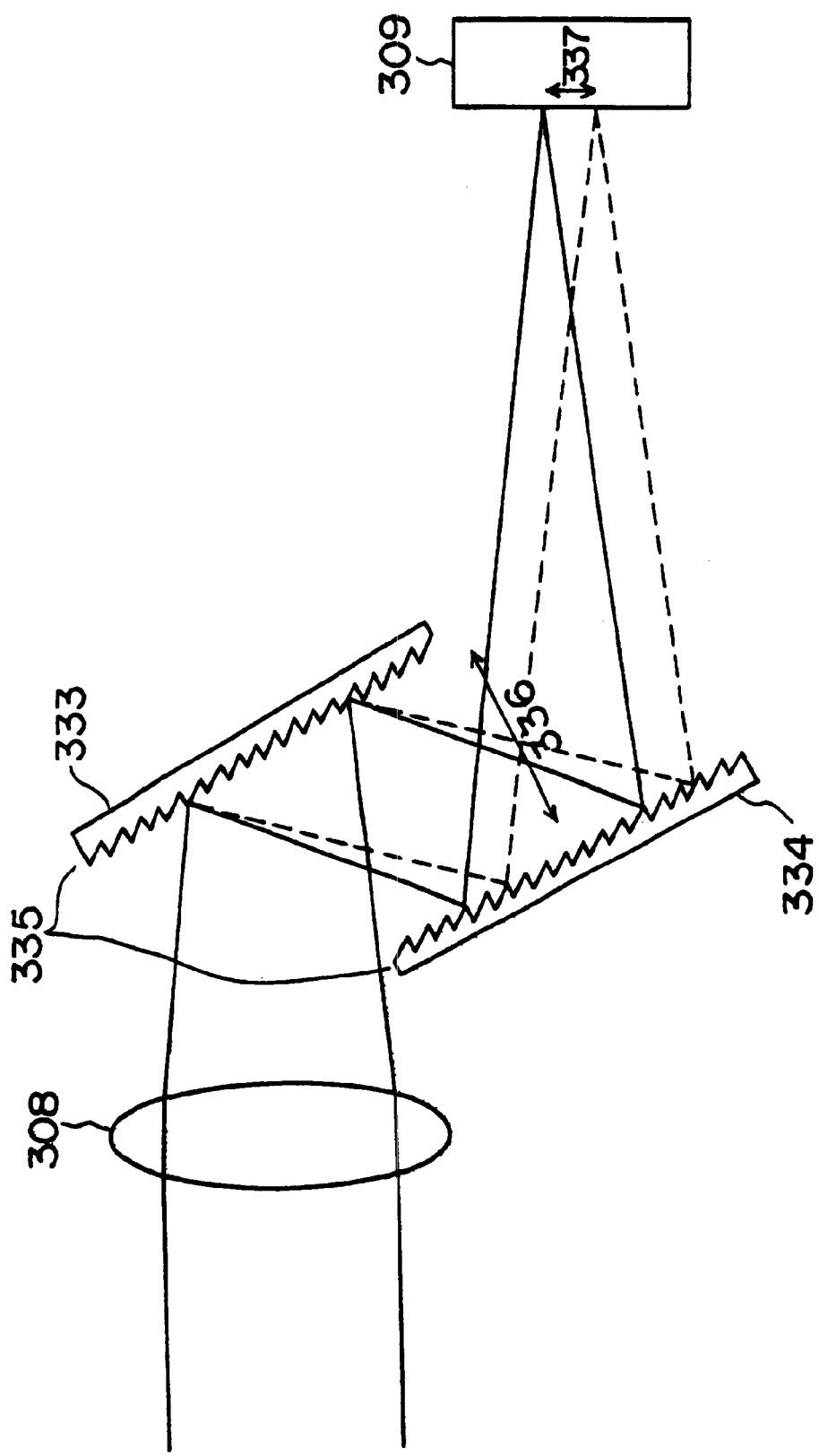
FIG. 39 is a top view of a part of the apparatus for independently varying the wavelength dispersion and the wavelength dispersion slope according to an embodiment of the present invention.

For example, FIG. 39 shows another embodiment of the present invention. According to the present embodiment, a reflecting blazed grating is used as a diffraction grating. In the case of a reflecting blazed grating, an output ray from the lens 308 is diffracted in the direction satisfying the equation (7) by the diffraction grating 333, and the optical path is curved. At this time, the wavelength diffracting at an angle satisfying the reflection law expressed by the equation (8) has the highest diffraction efficiency, and the wavelength is referred to as a blaze wavelength. For diffraction gratings 333 and 334, an appropriate blaze angle is selected such that an available wavelength band can substantially match the blaze wavelength. Basically as in the case of the transmitting diffraction grating, the diffracted and curved ray is similarly diffracted and curved again in the opposite direction by the second diffraction grating 334 arranged in the position parallel and point-symmetric with the first diffraction grating 333. As a result, the rays travel in the same direction after passing through a diffraction grating pair 335. If the rays travel in the direction vertical to the angular dispersion direction of the VIPA, the rays reflected by the three-dimensional mirror 309 are returned through the similar optical path, thereby causing no losses.

As clearly shown by the equation (7), the diffraction angle depends on a wavelength, a ray having each wavelength has a different diffraction angle depending on the first diffraction grating 333, and the diffraction takes place again in the opposite direction by the second diffraction grating 334. As a result, an optical path shift 337 takes place by each wavelength in parallel in the direction vertical to the angular dispersion direction of the VIPA.

$$\sin \alpha + \sin \beta = N \times m \times \lambda \quad (7)$$

$$\theta b = (\alpha + \beta)/2 \quad (8)$$

where α indicates an incident angle, β indicates a diffraction angle, N indicates the number of lines per unit length, m indicates an order, and θb indicates a blaze angle.

Furthermore, the optical path shift 337 can be varied by changing a space 336 of the diffraction grating pair 335 by moving one diffraction grating 334 while keeping the parallelism although a reflecting diffraction grating is used.

In addition, a rectangular diffraction grating, a cos curve diffraction grating, an echelon grating, etc. can be used. That is, the type of diffraction grating is not limited to a specific type.

Figure 4:
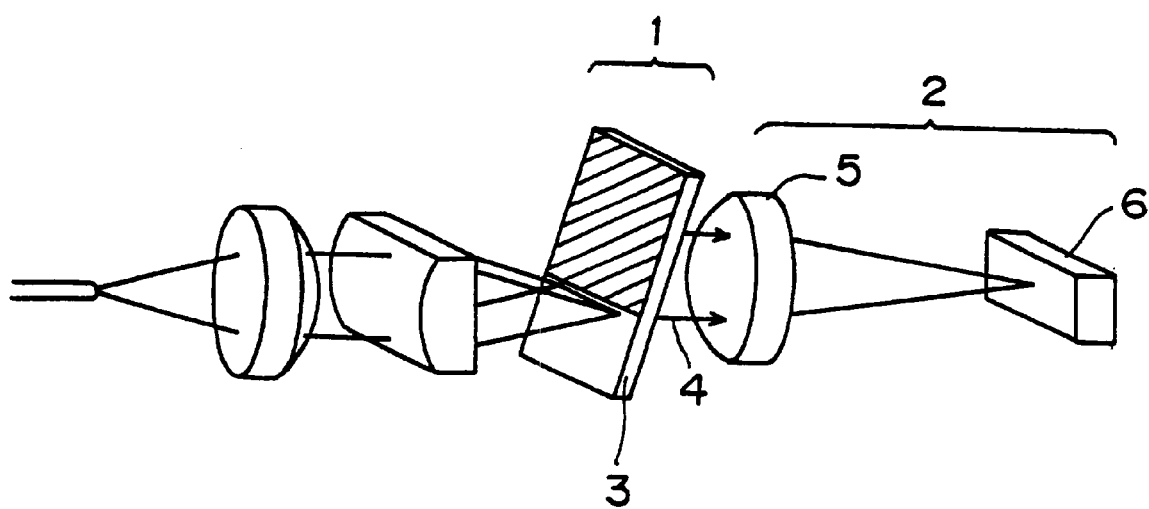
FIG. 4 shows the apparatus for generating wavelength dispersion using a VIPA.
Figure 5:
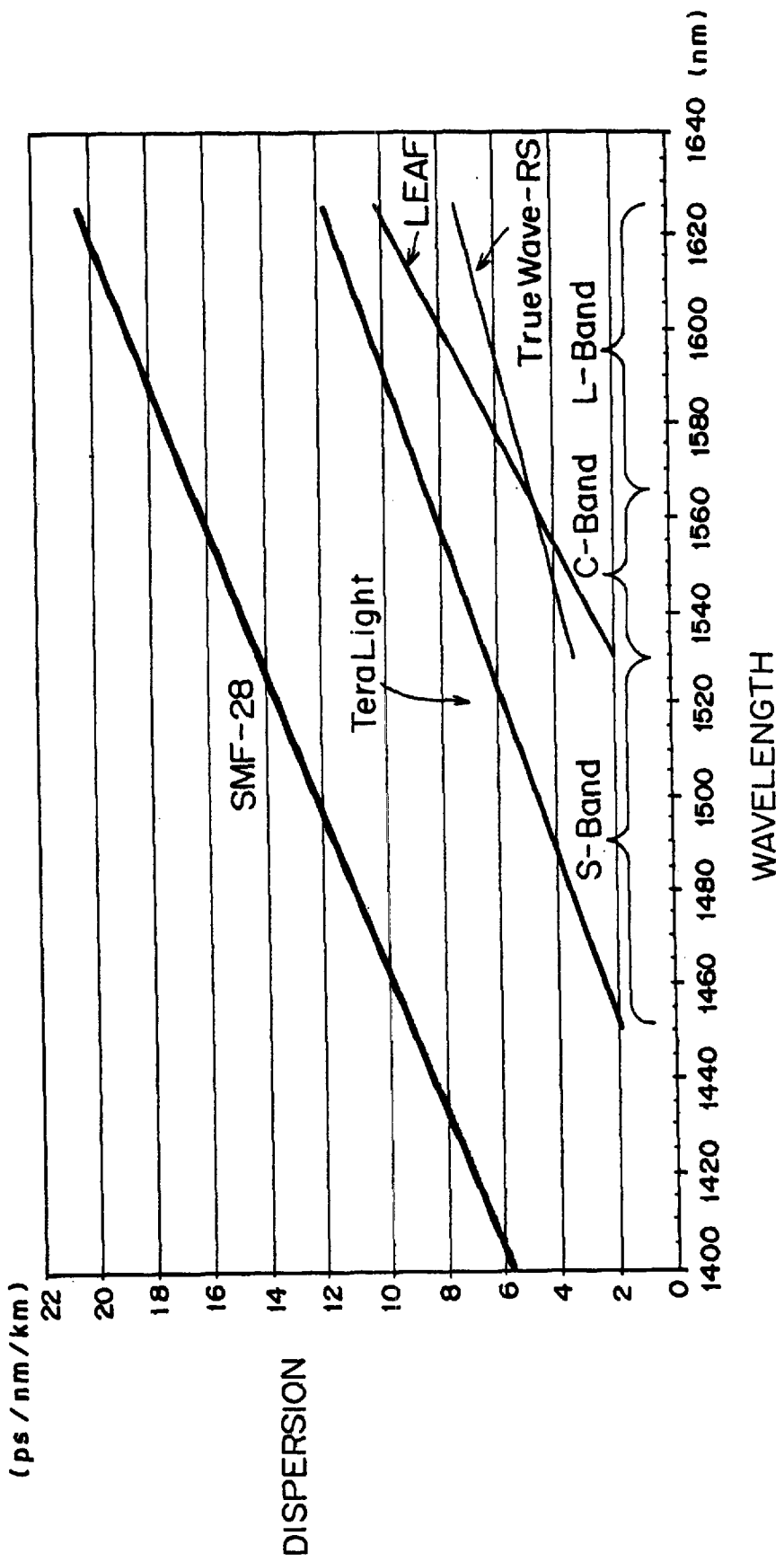
FIG. 5 shows wavelength dispersion and a wavelength dispersion slope depending on the type of fiber.

According to the present embodiment, an output ray for which the wavelength dispersion and a wavelength dispersion slope are compensated can be retrieved by inserting the circulator as shown in FIG. 1 into the tip of the fiber shown in FIG. 4.

FIG. 40 shows the configuration of solving the problem of the polarized-wave-dependent losses according to the above mentioned embodiment.

A polarized-wave-dependent loss occurs on the ray output from the lens 8 to a grating pair 342 shown in FIG. 40 after the ray passes through blazed gratings 340 and 341. To compensate for the polarized-wave-dependent loss, a polarization rotation element 350 is provided. The polarization of a ray reflected by the three-dimensional mirror 309 and returned is orthogonalized by 90° by the polarization rotation element 350 in the returning path. The polarization rotation element 350 having the polarization rotating function can be, for example, a λ/4 wavelength plate, a Faraday rotator, etc.

Thus, if a polarized wave is rotated by 90° between going and returning paths, and the polarized-wave-dependent losses are different between the going and returning paths, then different polarized-wave-dependent losses between different polarized waves can be leveled by providing all rays in the going and returning paths with both losses, thereby leveling the difference in loss by difference in polarized wave, that is, the reduced amount of the intensity of obtained rays.

FIG. 41 shows the configuration of continuously changing until inverting the amount of wavelength dispersion compensation provided for a ray according to an embodiment of the present invention.

Figure 41A:
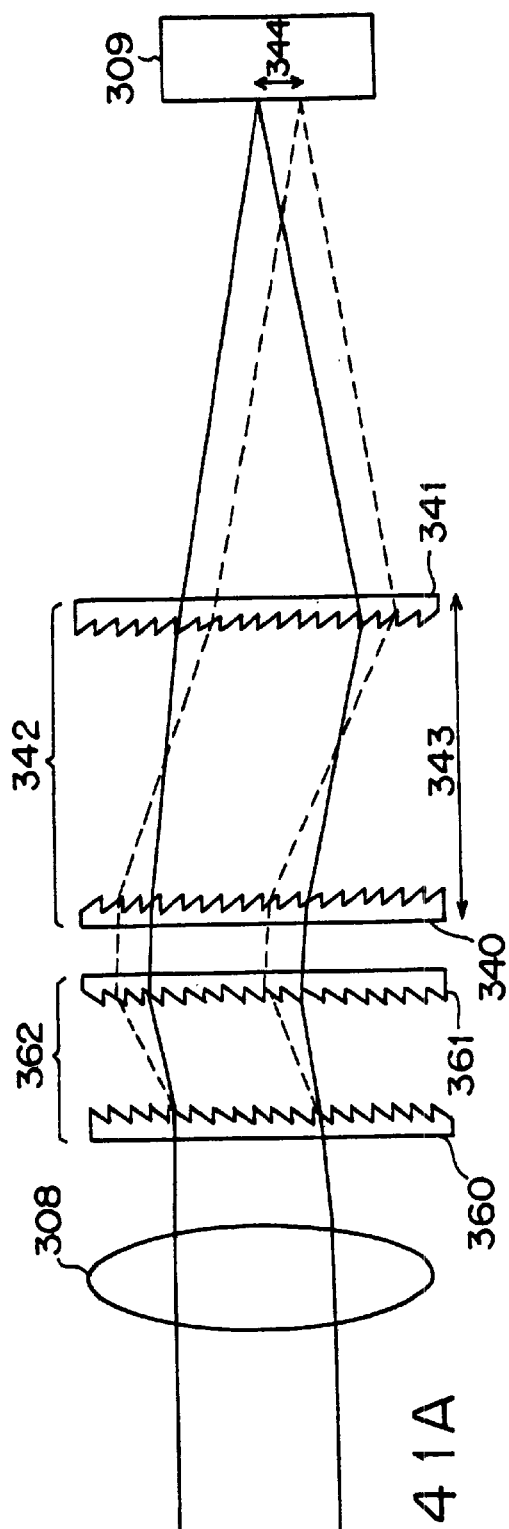
FIG. 41 is a top view of a part of the apparatus for independently varying the wavelength dispersion and the wavelength dispersion slope according to an embodiment of the present invention.
Figure 41B:
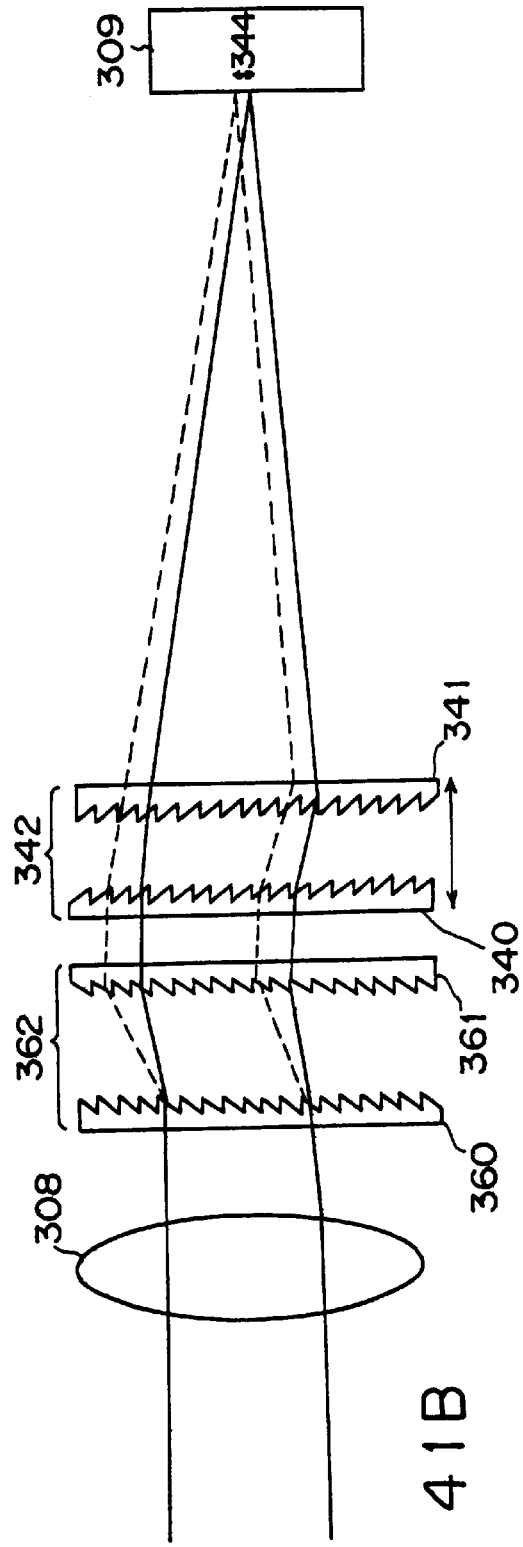

By arranging two pairs of grating pairs 362 as shown in FIGS. 41A and 41B, and adding an offset to the variable range of a wavelength dispersion slope of the grating pair 342 by the grating pair 362, the function of continuously varying from the negative wavelength dispersion slope to the positive wavelength dispersion slope can be realized. That is, after the grating pair 362 provides an offset for the optical paths of rays having different wavelengths, the space 343 in the grating pair 342 is appropriately adjusted, thereby outputting and crossing optical paths of rays having different wavelengths to be received by the three-dimensional mirror 309. When the space 343 is set to another value, the optical paths of the rays having different wavelengths do not cross each other when they are received by the three-dimensional mirror 309. Thus, by adjusting the space 343, the optical path shift of the rays having different wavelengths can be adjusted, and the points on the three-dimensional mirror 309 at which the rays are received can be exchanged. As a result, the amount of wavelength dispersion provided for each wavelength can be varied, and the amount of wavelength dispersion can be exchanged. thus, to control the value of the amount of wavelength dispersion for each wavelength is to change a wavelength dispersion slope.

FIG. 42 shows an example of a variation of the embodiment shown in FIG. 41.

Figure 42A:
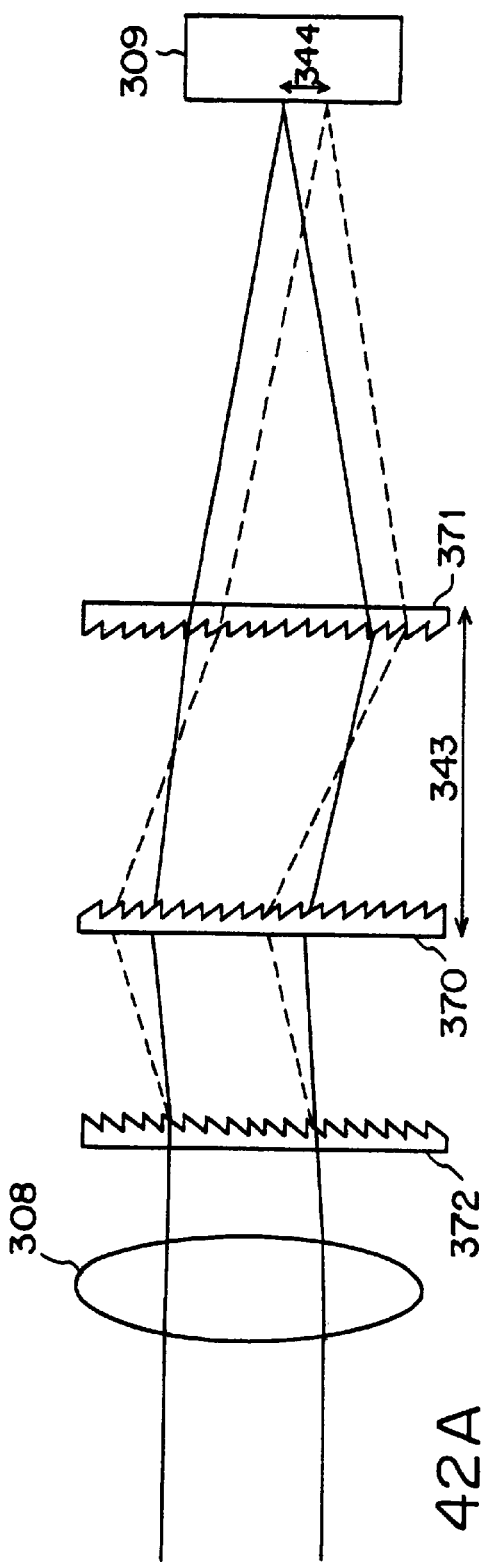
FIG. 42 is a top view of a part of the apparatus for independently varying the wavelength dispersion and the wavelength dispersion slope according to an embodiment of the present invention.
Figure 42B:
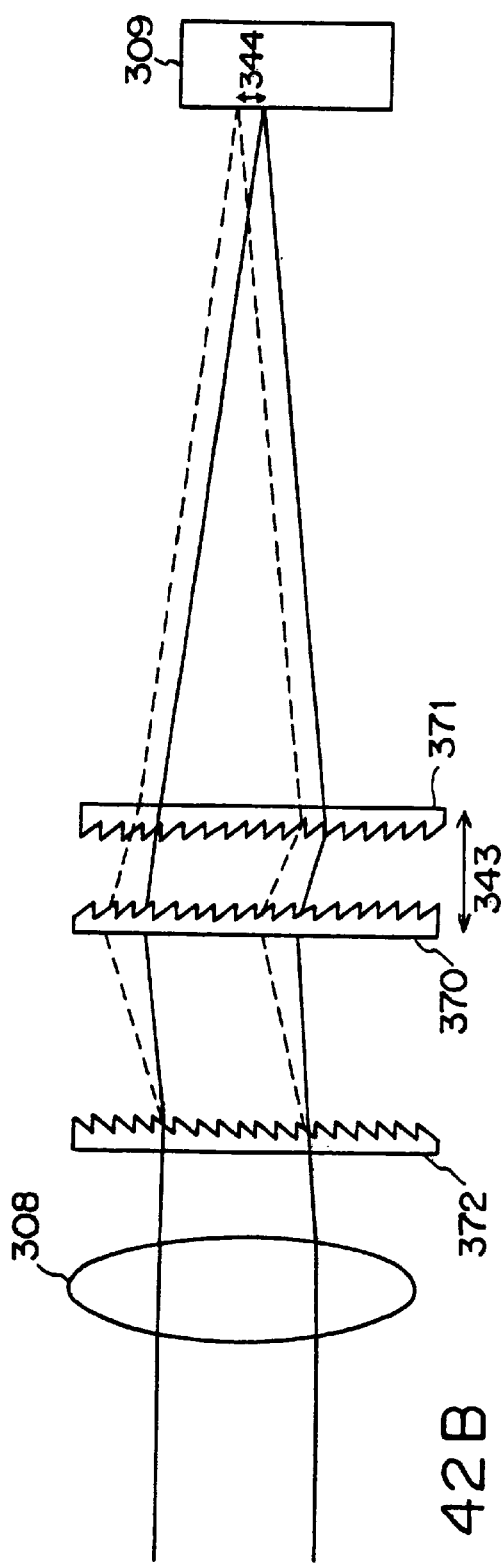

Using a grating 370, shown in FIGS. 42A and 42B, having the functions of gratings 361 and 340 shown in FIGS. 41A and 41B, by assigning an offset to the variable range of a wavelength dispersion slope by, for example, three gratings, the function of continuously varying from the negative wavelength dispersion slope to the positive wavelength dispersion slope can be realized. The principle of the operations is the same as in the case shown in FIG. 41. That is, by the offset of each wavelength provided from gratings 372 and 370, the space 343 in the gratings 371 and 370 can be varied, a point 344 on the three-dimensional mirror 309 on which a ray having each wavelength can be varied, and the amount of wavelength dispersion of each wavelength is varied, thereby varying a wavelength dispersion slope.

Figure 43:
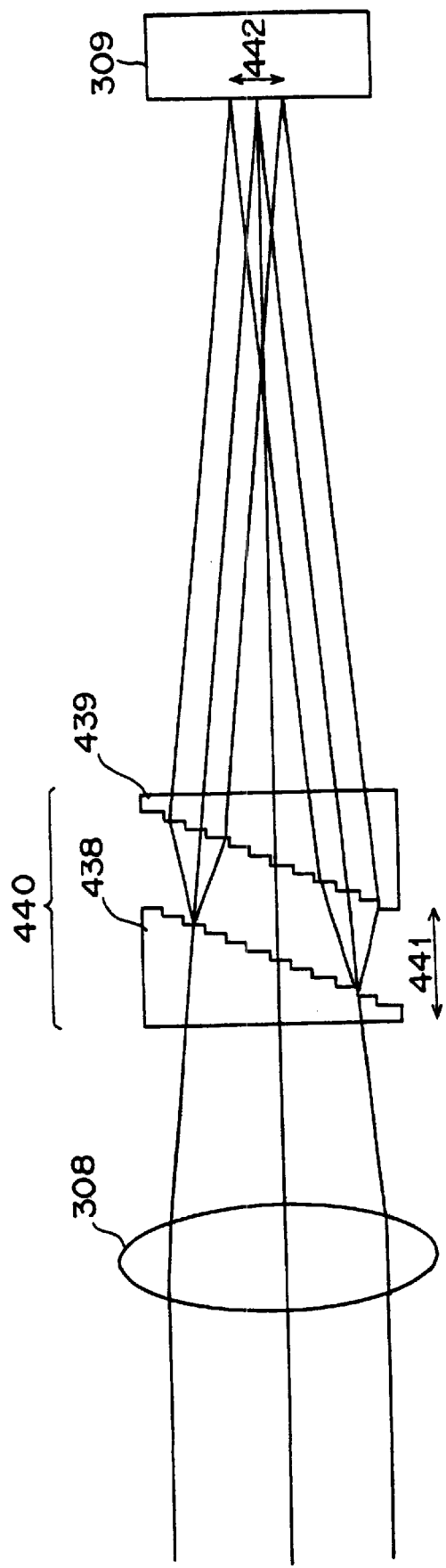
FIG. 43 is a top view of a part of the apparatus for independently varying the wavelength dispersion and the wavelength dispersion slope according to another embodiment of the present invention.

FIG. 43 shows another embodiment of the present invention.

According to the present embodiment, a transmitting echelon grating (or referred to as a grism) is used as a diffraction grating. The transmitting echelon grating is a step type diffraction grating, and generates a phase difference by a difference in steps in forward transmission rays. Therefore, forward rays can have the highest diffraction efficiency by setting the condition such that rays having predetermined wavelengths can mutually have the phase difference as expressed by the equation (9).

When the echelon grating is used, the output ray from the lens 308 is diffracted by the first diffraction grating 438 in the direction satisfying the equation (9), and the optical path is curved. At this time, in the diffraction gratings 438 and 439, the step difference is appropriately selected such that the central wavelength of an available wavelength band can corresponds to a forward ray. The diffracted and curved ray is also diffracted and curved again by the second diffraction grating 439 arranged in the position parallel and point-symmetric with the first diffraction grating 438 basically as in the case of the blazed grating. Therefore, the rays travel in the same direction after passing through a diffraction grating pair 440. If the rays travel in the direction vertical to the angular dispersion direction of the VIPA, the rays reflected by the three-dimensional mirror 309 returns through the similar optical path, thereby causing no losses.

As is clearly expressed by the equation (9), the diffraction angle depends on a wavelength, a ray having each wavelength has a different diffraction angle depending on the first diffraction grating 438, and the diffraction takes place again in the opposite direction by the second diffraction grating 439. As a result, an optical path shift 442 takes place by each wavelength in parallel in the direction vertical to the angular dispersion direction of the VIPA.

$$nt - (t \times \cos \theta + d \times \sin \theta) = m \times \lambda \quad (9)$$

where n indicates a refractive index, t indicates a step difference, θ indicates a rotation angle, d indicates the space in a diffraction grating, m indicates an order, and λ indicates a wavelength.

Furthermore, an amount of optical path shift 442 can be varied by changing the space 441 in the diffraction grating pair 440 by moving one diffraction grating 439 while maintaining the parallelism.

In the case of the echelon grating, the diffraction direction is substantially forward. Therefore, the amount of optical path shift 442 changes by changing the space 441 in the diffraction grating pair 440. As a result, although a wavelength dispersion slope is changed, no shift is made in the optical path and no change is made in the wavelength dispersion. Therefore, it is not necessary to move the three-dimensional mirror 309 such that the appropriate wavelength dispersion can take place as in the case of the blazed grating. In addition, in the case of the blazed grating, such a large diffraction angle may cause the problem that the focal position of the rays on the three-dimensional mirror 309 is shifted in the optical path direction. However, since the diffraction direction is substantially forward in the case of the echelon grating, There occurs no problems of a shift of the focal position.

According to the present embodiment, for example, when the space in the diffraction grating is 1 $\mu$m, the step difference of the diffraction grating is 3.44 $\mu$m, and the refractive index of the diffraction grating is 1.45, the wavelengths of intensifying forward rays are 1,546 nm. For example, although the space in the diffraction grating pair is as small as 25 mm, the amount of the optical path shift is up to 940 $\mu$m for the wavelengths 1,528 nm and 1,563 nm, and the amount of the change in the wavelength dispersion up to 750 ps/nm can be assigned although the above mentioned three-dimensional non-spherical mirror shows a change of 800 ps/nm per mm. This amount of compensation of a dispersion slope corresponds to 360 km for the common SMF having the wavelength dispersion slope of 0.06 ps/nm2/km, which is a sufficient amount of compensation.

In the embodiment shown in FIG. 43, the blazed grating shown in FIGS. 41 and 42 can be replaced with the echelon grating.

In some of the above mentioned embodiments of the present invention, a transmitting blazed grating is used as a diffraction grating. However, other diffraction gratings can also be used.

In the above mentioned embodiment of the present invention, the VIPA has a reflecting film for reflecting rays. For example, FIG. 7 shows the VIPA 76 having the reflecting surfaces 122 and 124 for reflecting rays. However, the VIPA is not limited to be used with a film for providing a reflecting surface. Instead, the VIPA has to be provided with an appropriate reflecting surface, but it is not limited to a film.

Furthermore, according to the above mentioned embodiment of the present invention, the VIPA includes a transparent glass plate generating multiple reflection. For example, FIG. 7 shows the VIPA 76 provided with the plate 120 having a reflecting surface. However, to isolate the reflecting surface, the VIPA is not limited to a glass material or any type of plate. Instead, the reflecting surfaces have to be isolated from each other by a spacer. For example, the reflecting surface of the VIPA can be isolated by air without a glass plate. Therefore, for example, the reflecting surface can be described as being isolated by a transparent material such as an optical glass, air, etc.

The operation of the VIPA depends on the thickness and the refractive index of the material between the reflecting surfaces of the VIPA. Furthermore, the operation and the wavelength of the VIPA can be correctly adjusted by controlling the temperature of the VIPA.

As described above, the above mentioned embodiment of the present invention can provide an apparatus for generating an arbitrary wavelength dispersion and a wavelength dispersion slope, and simultaneously dispersion-compensating the wavelength dispersion and wavelength dispersion slope actually accumulated in an optical fiber in a multichannel multiwavelength regime. Therefore, according to the embodiments of the present invention, the VIPA is not limited to a specific configuration. For example, the VIPA can have a radiation window, and the reflection on each surface of the VIPA is not limited to a specific example.

The present invention can provide an apparatus for individually controlling the wavelength dispersion and the wavelength dispersion slope, which has not been realized by the conventional technology.

What is claimed is:

1. An apparatus for individually varying a wavelength dispersion slope and a wavelength dispersion depending on a shift of an optical path, comprising:

a virtually imaged phased array (VIPA) having a plurality of transmission areas of a wavelength for receiving and outputting light, receiving an input light having a plurality of wavelengths within a continuous wavelength range in the transmission areas, generating a multiple reflection of the input light, forming an output light which is spatially distinguishable from another output light formed for another input light having another wavelength in the continuous wavelength range, generating self-interference, and dispersing the output light in a substantially linear dispersion direction at an output angle depending on each wavelength;

a lens converging the output lights formed by the VIPA;

a mirror reflecting the converged lights back to the lens, the lens returning a reflected light to the VIPA where the reflected light undergoes a multiple reflection in the VIPA through the transmission areas, the mirror having a shape where a substantially constant wavelength dispersion for each wavelength is given to the output lights from the VIPA and different dispersion is given to the output lights traveling in a direction substantially perpendicular to a plane including directions of lights angular-dispersed by the VIPA;

a dispersive unit provided between the lens and the mirror, generating optical path shifts which are substantially parallel to each other for respective wavelengths, in a direction substantially perpendicular to a plane including the directions of the lights angular-dispersed by the VIPA; and a unit varying an amount of the shift of the optical path.

2. The apparatus according to claim 1, further comprising:

a moving unit capable of moving said mirror in a direction substantially perpendicular to the plane including the directions of the lights angular-dispersed by the VIPA, and giving different wavelength dispersion to an output light from the VIPA.

3. The apparatus according to claim 1, wherein:

said dispersive unit generating the optical path shift is at least one diffraction grating pair configured by arranging two diffraction gratings, which have angular dispersion in a direction substantially perpendicular to the plane including the directions of the lights angular-dispersed by the VIPA, parallel and point-symmetric with each other; and said unit varying the amount of an optical path shift is a unit varying space in the diffraction grating pair.

4. The apparatus according to claim 1, wherein:

said dispersive unit generating the optical path shift is at least one diffraction grating pair configured by arranging two diffraction gratings, which have angular dispersion in a direction substantially perpendicular to the plane including the directions of the lights angular-dispersed by the VIPA, parallel and point-symmetric with each other; and a direction in which a wavelength generates an optical path shift is inverted by 180°-rotating the diffraction grating pair based on an optical path, a positive/negative state of a slope of wavelength dispersion (wavelength dispersion slope) is changed, and an amount of an optical path shift is varied by changing space in the diffraction grating pair.

5. The apparatus according to claim 1, wherein:

said dispersive unit generating the optical path shift is at least one diffraction grating pair configured by arranging two diffraction gratings, which have angular dispersion in a direction substantially perpendicular to the plane including the directions of the lights angular-dispersed by the VIPA and at least two areas having angular dispersion in opposite directions, parallel and point-symmetric with each other; and angular dispersion is generated in an opposite direction by receiving a light on a different area by moving the diffraction grating pair, where a positive/negative state of a wavelength dispersion slope is changed by changing a direction that an optical path shift is generated according to a wavelength, and an amount of an optical path shift can be varied by changing space in a diffraction grating pair.

6. The apparatus according to claim 1, wherein:

said dispersive unit generating the optical path shift is at least one diffraction grating pair configured by arranging two diffraction gratings, which have angular dispersion in a direction substantially perpendicular to the plane including the directions of the lights angular-dispersed by the VIPA and a plurality of areas having different angular dispersion, parallel and point-symmetric with each other; and different wavelength dispersion is generated by receiving a light on a different area by moving the diffraction grating pair, and an amount of an optical path shift is varied.

7. The apparatus according to any of claims 3 through 6, further comprising a control device controlling a temperature of a diffraction grating to stabilize the angular dispersion.

8. The apparatus according to any of claims 3 through 6, wherein a diffraction grating is a high diffraction efficiency blazed grating with a specific degree and wavelength.

9. The apparatus according to claim 8, wherein said diffraction grating is a transmitting blazed grating.

10. The apparatus according to claim 8, wherein said diffraction grating is a reflecting blazed grating.

11. The apparatus according to any of claims 3 through 6, wherein a diffraction grating is a transmitting echelon grating.

12. The apparatus according to claim 1, wherein:

said dispersive unit generating the optical path shift is at least one set of parallel plates of a transparent material having refractive index wavelength dispersion; and an amount of the optical path shift and a direction of the optical path shift are varied by changing an angle of the parallel plates with respect to the output light from the lens into the direction perpendicular to the plane including the directions of the lights angular-dispersed by the VIPA.

13. The apparatus according to claim 12, further comprising a control device controlling a temperature of the parallel plates to stabilize the amount of the optical path shift.

14. The apparatus according to claim 1, wherein said dispersive unit generating the optical path shift is at least one prism pair configured by two prisms of transparent materials having refractive index wavelength dispersion, and arranged parallel and point-symmetric with each other, and said unit varying an amount of an optical path shift is a unit for varying space in the prism pair.

15. The apparatus according to claim 1, wherein said dispersive unit generating the optical path shift is at least one prism pair configured by two prisms of transparent materials having refractive index wavelength dispersion, and arranged parallel and point-symmetric with each other, and a direction in which an optical path shift takes place according to a wavelength is inverted by 180°-rotating the prism pair from an optical path where a positive/negative state of a wavelength dispersion slope is changed, and an amount of an optical path shift is varied by changing the space in a diffraction grating pair.

16. The apparatus according to claim 14 or 15, further comprising a control device controlling the temperature of a prism to stabilize the amount of the optical path shift.

17. The apparatus according to claim 14 or 15, wherein a transparent material of parallel plates or a prism is Si, Ge, or GaAs.

18. The apparatus according to claim 1, further comprising a polarization rotation element to compensate for a polarized-wave-dependent loss generated by said unit generating the optical path shift.

19. The apparatus according to claim 1, further comprising:

a unit generating an optical path shift by having at least three gratings, and continuously varying a negative wavelength dispersion slope into a positive wavelength dispersion slope or vice versa.

20. A wavelength division-multiplexed light transmission apparatus, comprising:

a virtually imaged phased array (VIPA) having a plurality of transmission areas of a wavelength for receiving and outputting light, receiving an input light having a plurality of wavelengths within a continuous wavelength range in the transmission areas, generating a multiple reflection of the input light, forming an output light which is spatially distinguishable from another output light formed for another input light having another wavelength in the continuous wavelength range, generating self-interference, and dispersing the output light in a substantially linear dispersion direction at an output angle depending on each wavelength;

a lens converging the output lights formed by the VIPA;

a mirror reflecting the converged lights back to the lens, the lens returning a reflected light to the VIPA where the reflected light undergoes a multiple reflection in the VIPA through the transmission areas, the mirror having a shape where a substantially constant wavelength dispersion for each wavelength is given to the output lights from the VIPA and different dispersion is given to the output lights traveling in a direction substantially perpendicular to a plane including directions of lights angular-dispersed by the VIPA;

a dispersive unit provided between the lens and the mirror, generating optical path shifts which are substantially parallel to each other for respective wavelengths, in a direction substantially perpendicular to a plane including the directions of the lights angular-dispersed by the VIPA; and a unit varying an amount of an optical path shift, wherein a signal having multiple wavelengths can be simultaneously dispersion-compensated.

\* \* \* \* \*